United States Patent
Bito et al.

(10) Patent No.: US 8,339,501 B2
(45) Date of Patent: Dec. 25, 2012

(54) ZOOM LENS SYSTEM, IMAGING DEVICE AND CAMERA

(75) Inventors: Takakazu Bito, Osaka (JP); Yoshito Miyatake, Osaka (JP); Mamoru Honjo, Osaka (JP)

(73) Assignee: Panasonic Corporation, Osaka (JP)

( * ) Notice: Subject to any disclaimer, the term of this patent is extended or adjusted under 35 U.S.C. 154(b) by 354 days.

(21) Appl. No.: 12/879,535

(22) Filed: Sep. 10, 2010

(65) Prior Publication Data
US 2011/0063479 A1 Mar. 17, 2011

(30) Foreign Application Priority Data

| Sep. 11, 2009 | (JP) | 2009-210060 |
| Sep. 11, 2009 | (JP) | 2009-210061 |
| Sep. 11, 2009 | (JP) | 2009-210062 |
| Sep. 11, 2009 | (JP) | 2009-210063 |
| Sep. 17, 2009 | (JP) | 2009-215344 |

(51) Int. Cl.
*H04N 5/225* (2006.01)
(52) U.S. Cl. .......... 348/335; 348/360; 359/676
(58) Field of Classification Search .......... 348/335, 348/360; 359/670, 672, 675, 676
See application file for complete search history.

(56) References Cited

U.S. PATENT DOCUMENTS

| 8,169,528 | B2 * | 5/2012 | Chen et al. | 348/335 |
| 8,212,913 | B2 * | 7/2012 | Yoshitsugu et al. | 348/335 |
| 2006/0132928 | A1 | 6/2006 | Nakatani et al. | |
| 2008/0291547 | A1 | 11/2008 | Saruwatari | |
| 2009/0040604 | A1 | 2/2009 | Obu et al. | |

FOREIGN PATENT DOCUMENTS

| JP | 2006-171655 A | 6/2006 |
| JP | 2006-171655 A | 8/2006 |
| JP | 2007-003554 A | 1/2007 |
| JP | 2008-292733 A | 12/2008 |
| JP | 2009-042271 A | 2/2009 |
| JP | 2009-047903 A | 3/2009 |

* cited by examiner

*Primary Examiner* — Tuan Ho
(74) *Attorney, Agent, or Firm* — Pearne & Gordon LLP

(57) ABSTRACT

A zoom lens system comprising a plurality of lens units each composed of at least one lens element, wherein the zoom lens system, in order from the object side to the image side, comprises: a first lens unit having positive optical power and comprising four lens elements; a second lens unit having negative optical power; and a third lens unit having positive optical power; wherein in zooming from a wide-angle limit to a telephoto limit at the time of image taking, at least the first lens unit is moved along an optical axis direction so as to achieve variable magnification, and wherein the conditions are satisfied: $0.30 < f_1/f_T < 0.70$ and $Z = f_T/f_W > 20.5$ ($f_1$ is a composite focal length of the first lens unit, $f_W$ is a focal length of the entire system at a wide-angle limit, and $f_T$ is a focal length of the entire system at a telephoto limit), an imaging device and a camera are provided.

6 Claims, 34 Drawing Sheets

ZOOM LENS SYSTEM, IMAGING DEVICE AND CAMERA

CROSS-REFERENCE TO RELATED APPLICATION

This application is based on application Nos. 2009-210060, 2009-210061, 2009-210062 and 2009-210063 filed in Japan on Sep. 11, 2009, and 2009-215344 filed in Japan on Sep. 17, 2009, the contents of which are hereby incorporated by reference.

BACKGROUND OF THE INVENTION

1. Field of the Invention

The present invention relates to a zoom lens system, an imaging device, and a camera. In particular, the present invention relates to: a zoom lens system having, in addition to a high resolution, a small size and still having a view angle of about 80° at a wide-angle limit, which is satisfactorily adaptable for wide-angle image taking, and further having a very high variable magnification ratio of about 30; an imaging device employing this zoom lens system; and a compact camera employing this imaging device.

2. Description of the Background Art

With recent progress in the development of solid-state image sensors such as a CCD (Charge Coupled Device) and a CMOS (Complementary Metal-Oxide Semiconductor) having a high pixel density, digital still cameras and digital video cameras (simply referred to as digital cameras, hereinafter) are rapidly spreading that employ an imaging device including an imaging optical system of high optical performance corresponding to the above-mentioned solid-state image sensors of a high pixel density. Among the digital cameras of high optical performance, in particular, from a convenience point of view, digital cameras are strongly requested that employ a zoom lens system having a very high variable magnification ratio and still being able to cover a wide focal-length range from a wide angle condition to a highly telephoto condition in its own right. On the other hand, in recent years, zoom lens systems are also desired that have a wide angle range where the photographing field is large.

Various kinds of zoom lens system as follows are proposed for the above-mentioned compact digital cameras.

Japanese Laid-Open Patent Publication No. 2009-047903 discloses a zoom lens that, in order from the object side to the image side, comprises five lens units of positive, negative, positive, positive and positive, wherein, at a telephoto limit in comparison with a wide-angle limit, the interval between the first lens unit and the second lens unit increases, the interval between the second lens unit and the third lens unit decreases, the interval between the third lens unit and the fourth lens unit varies, the interval between the fourth lens unit and the fifth lens unit varies, the fifth lens unit is fixed at the time of magnification change, the second lens unit is located on the image side at a telephoto limit, and wherein the focal lengths of the entire system at a wide-angle limit and at a telephoto limit, the focal lengths of the respective lens units, and the amounts of movement of the first and the second lens units satisfy a particular relation.

Japanese Laid-Open Patent Publication No. 2009-042271 discloses a zoom lens that, in order from the object side to the image side, comprises four lens units of positive, negative, positive and positive, wherein the intervals between the individual lens units vary at the time of magnification change, the first lens unit moves with locus of a convex to the image side, and is located on the object side relatively at a telephoto limit than at a wide-angle limit, and wherein the focal length of the entire system at a wide-angle limit and the amount of movement of the first lens unit satisfy a particular relation.

Japanese Laid-Open Patent Publication No. 2008-292733 discloses a zoom lens that, in order from the object side to the image side, comprises four lens units of positive, negative, positive and positive, wherein the respective lens units move at the time of magnification change, the first lens unit is located on the object side relatively at a telephoto limit than at a wide-angle limit, the fourth lens unit moves with locus of a convex to the object side, and wherein the imaging magnifications of the third and the fourth lens units at a wide-angle limit and the imaging magnifications of the third and the fourth lens units at a telephoto limit satisfy a particular relation.

Japanese Laid-Open Patent Publication No. 2007-003554 discloses a zoom lens that, in order from the object side to the image side, comprises four lens units of positive, negative, positive and positive, wherein at least the first and the third lens units move at the time of magnification change, the first lens unit moves to the object side at the time of magnification change from a wide-angle limit to a telephoto limit, and wherein the focal lengths of the entire system at a wide-angle limit and at a telephoto limit, the focal lengths of the first and the third lens units, and the amount of movement of the second lens unit satisfy a particular relation.

Japanese Laid-Open Patent Publication No. 2006-171655 discloses a zoom lens that, in order from the object side to the image side, comprises four lens units of positive, negative, positive and positive, wherein the interval of any lens units is varied to achieve variable magnification, and wherein the focal lengths of the entire system at a wide-angle limit and at a telephoto limit and the focal lengths of the respective lens units satisfy a particular relation.

However, each of the zoom lenses disclosed in the above-mentioned patent documents has a low variable magnification ratio relative to the number of lenses being used, and has a small view angle at a wide-angle limit, and hence does not satisfy the request for digital cameras in recent years.

SUMMARY OF THE INVENTION

An object of the present invention is to provide: a zoom lens system having, in addition to a high resolution, a small size and still having a view angle of about 80° at a wide-angle limit, which is satisfactorily adaptable for wide-angle image taking, and further having a very high variable magnification ratio of about 30; an imaging device employing this zoom lens system; and a compact camera employing this imaging device.

The novel concepts disclosed herein were achieved in order to solve the foregoing problems in the conventional art, and herein is disclosed:

a zoom lens system comprising a plurality of lens units each composed of at least one lens element, wherein the zoom lens system, in order from the object side to the image side, comprises:

a first lens unit having positive optical power and comprising four lens elements;

a second lens unit having negative optical power; and a third lens unit having positive optical power; wherein in zooming from a wide-angle limit to a telephoto limit at the time of image taking, at least the first lens unit is moved along an optical axis direction so as to achieve variable magnification, and wherein the following conditions (1) and (a-1) are satisfied:

$$0.30 < f_1/f_T < 0.70 \tag{1}$$

$$Z = f_T/f_W > 20.5 \tag{a-1}$$

where, $f_1$ is a composite focal length of the first lens unit, $f_W$ is a focal length of the entire system at a wide-angle limit, and $f_T$ is a focal length of the entire system at a telephoto limit.

The novel concepts disclosed herein were achieved in order to solve the foregoing problems in the conventional art, and herein is disclosed:

an imaging device capable of outputting an optical image of an object as an electric image signal, comprising:

a zoom lens system that forms the optical image of the object; and an image sensor that converts the optical image formed by the zoom lens system into the electric image signal, wherein the zoom lens system comprises a plurality of lens units each composed of at least one lens element, wherein the zoom lens system, in order from the object side to the image side, comprises:

a first lens unit having positive optical power and comprising four lens elements;

a second lens unit having negative optical power; and a third lens unit having positive optical power; wherein in zooming from a wide-angle limit to a telephoto limit at the time of image taking, at least the first lens unit is moved along an optical axis direction so as to achieve variable magnification, and wherein the following conditions (1) and (a-1) are satisfied:

$$0.30 < f_1/f_T < 0.70 \quad (1)$$

$$Z = f_T/f_W > 20.5 \quad (a\text{-}1)$$

where, $f_1$ is a composite focal length of the first lens unit, $f_W$ is a focal length of the entire system at a wide-angle limit, and $f_T$ is a focal length of the entire system at a telephoto limit.

The novel concepts disclosed herein were achieved in order to solve the foregoing problems in the conventional art, and herein is disclosed:

a camera for converting an optical image of an object into an electric image signal and then performing at least one of displaying and storing of the converted image signal, comprising:

an imaging device including a zoom lens system that forms the optical image of the object, and an image sensor that converts the optical image formed by the zoom lens system into the electric image signal, wherein the zoom lens system comprises a plurality of lens units each composed of at least one lens element, wherein the zoom lens system, in order from the object side to the image side, comprises:

a first lens unit having positive optical power and comprising four lens elements;

a second lens unit having negative optical power; and a third lens unit having positive optical power; wherein in zooming from a wide-angle limit to a telephoto limit at the time of image taking, at least the first lens unit is moved along an optical axis direction so as to achieve variable magnification, and wherein the following conditions (1) and (a-1) are satisfied:

$$0.30 < f_1/f_T < 0.70 \quad (1)$$

$$Z = f_T/f_W > 20.5 \quad (a\text{-}1)$$

where, $f_1$ is a composite focal length of the first lens unit, $f_W$ is a focal length of the entire system at a wide-angle limit, and $f_T$ is a focal length of the entire system at a telephoto limit.

According to the present invention, a zoom lens system can be provided that has, in addition to a high resolution, a small size and still has a view angle of about 80° at a wide-angle limit, which is satisfactorily adaptable for wide-angle image taking, and that further has a very high variable magnification ratio of about 30. Further, according to the present invention, an imaging device employing this zoom lens system and a thin and very compact camera employing this imaging device can be provided.

BRIEF DESCRIPTION OF THE DRAWINGS

This and other objects and features of this invention will become clear from the following description, taken in conjunction with the preferred embodiments with reference to the accompanied drawings in which.

DESCRIPTION OF THE PREFERRED EMBODIMENTS

Embodiments 1 to 11

FIGS. 1, 4, 7, 10, 13, 16, 19, 22, 25, 28, and 31 are lens arrangement diagrams of zoom lens systems according to Embodiments 1 to 11, respectively.

Each of FIGS. 1, 4, 7, 10, 13, 16, 19, 22, 25, 28, and 31 shows a zoom lens system in an infinity in-focus condition. In each Fig., part (a) shows a lens configuration at a wide-angle limit (in the minimum focal length condition: focal length $f_W$), part (b) shows a lens configuration at a middle position (in an intermediate focal length condition: focal length $f_M = \sqrt{(f_W * f_T)}$), and part (c) shows a lens configuration at a telephoto limit (in the maximum focal length condition: focal length $f_T$). Further, in each Fig., an arrow of straight or curved line provided between part (a) and part (b) indicates the movement of each lens unit from a wide-angle limit through a middle position to a telephoto limit. Moreover, in each Fig., an arrow imparted to a lens unit indicates focusing from an infinity in-focus condition to a close-object in-focus condition. That is, the arrow indicates the moving direction at the time of focusing from an infinity in-focus condition to a close-object in-focus condition.

Further, in FIGS. 1, 4, 7, 10, 13, 16, 19, 22, 25, 28, and 31, an asterisk "*" imparted to a particular surface indicates that the surface is aspheric. In each Fig., symbol (+) or (−) imparted to the symbol of each lens unit corresponds to the sign of the optical power of the lens unit. In each Fig., the straight line located on the most right-hand side indicates the position of the image surface S. On the object side relative to the image surface S (that is, between the image surface S and the most image side lens surface of the fourth lens unit G4 in Embodiments 1 to 4 and 6 to 11; and between the image surface S and the most image side lens surface of the fifth lens unit G5 in Embodiment 5), a plane parallel plate P such as an optical low-pass filter and a face plate of an image sensor is provided.

Further, in FIGS. 1, 4, 7, 10, 13, 16, 19, 22, 25, 28, and 31, an aperture diaphragm A is provided between the second lens unit G2 and the third lens unit G3. In zooming from a wide-angle limit to a telephoto limit at the time of image taking, the aperture diaphragm A moves along an optical axis independently from the respective lens units in Embodiments 1 to 4, 6, 7, and 9 to 11, and moves along the optical axis integrally with the third lens unit G3 in Embodiments 5 and 8.

Figure 1:
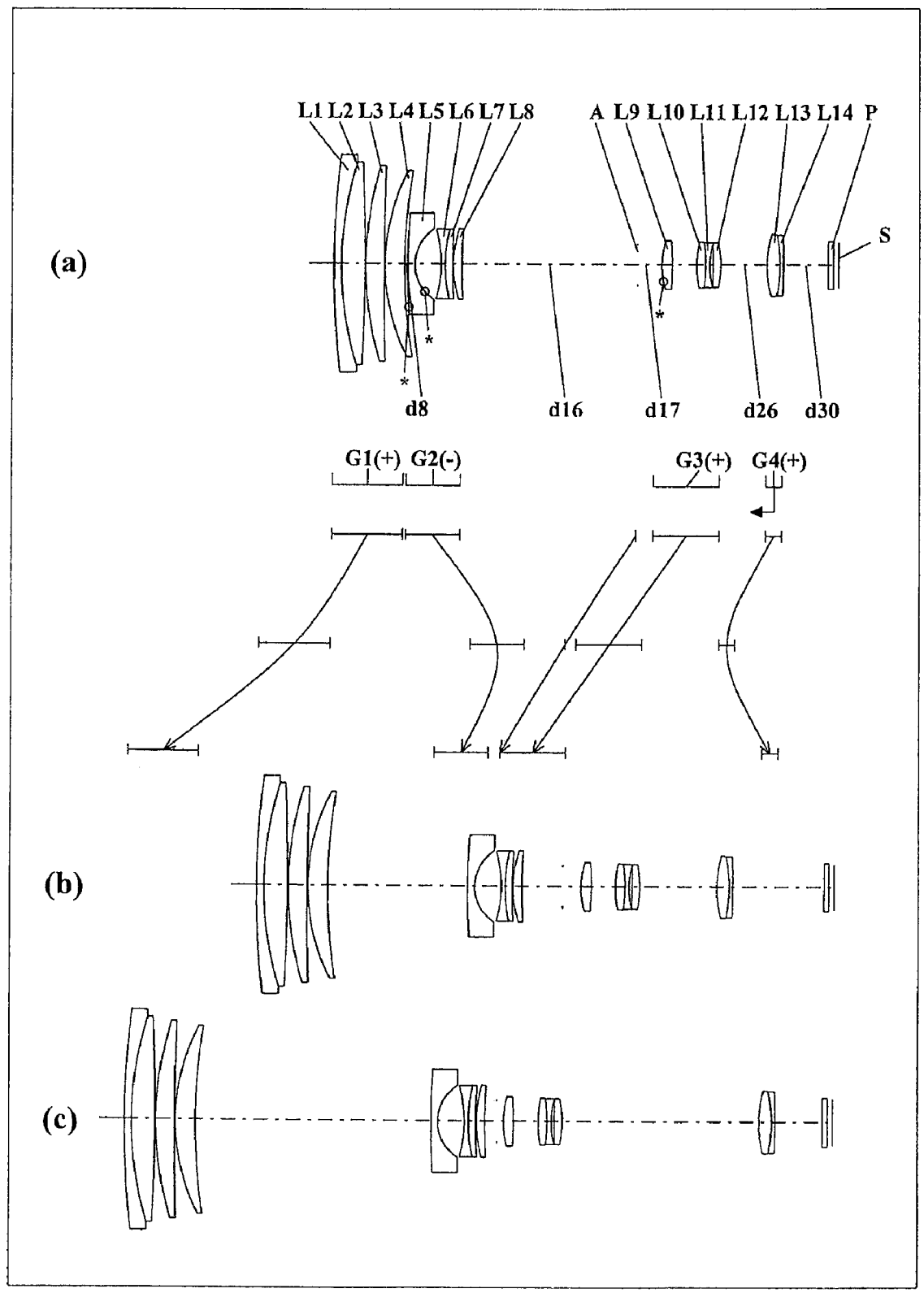
FIG. 1 is a lens arrangement diagram showing an infinity in-focus condition of a zoom lens system according to Embodiment 1 (Example 1)
Figure 2:
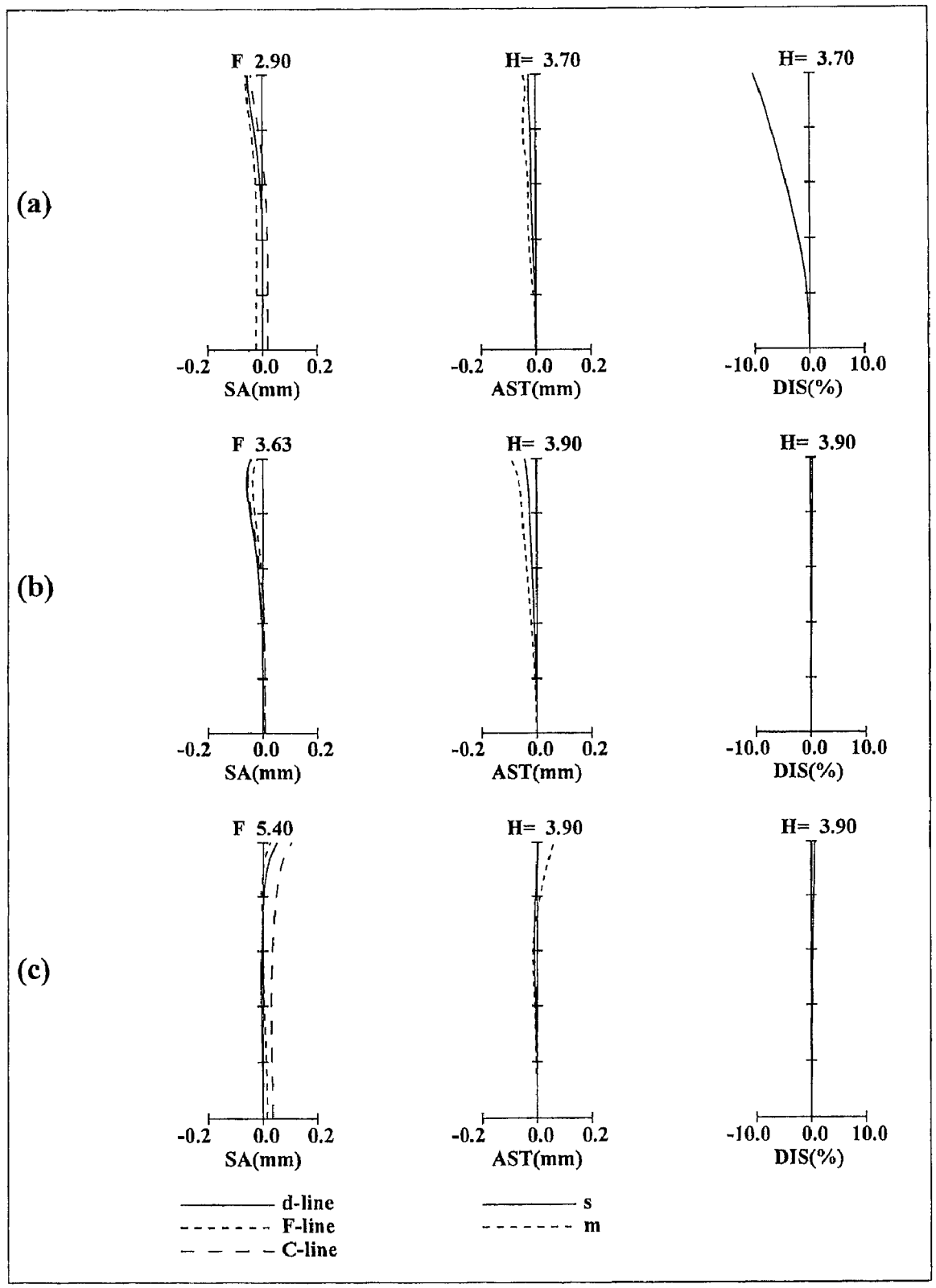
FIG. 2 is a longitudinal aberration diagram of an infinity in-focus condition of a zoom lens system according to Example 1.
Figure 3:
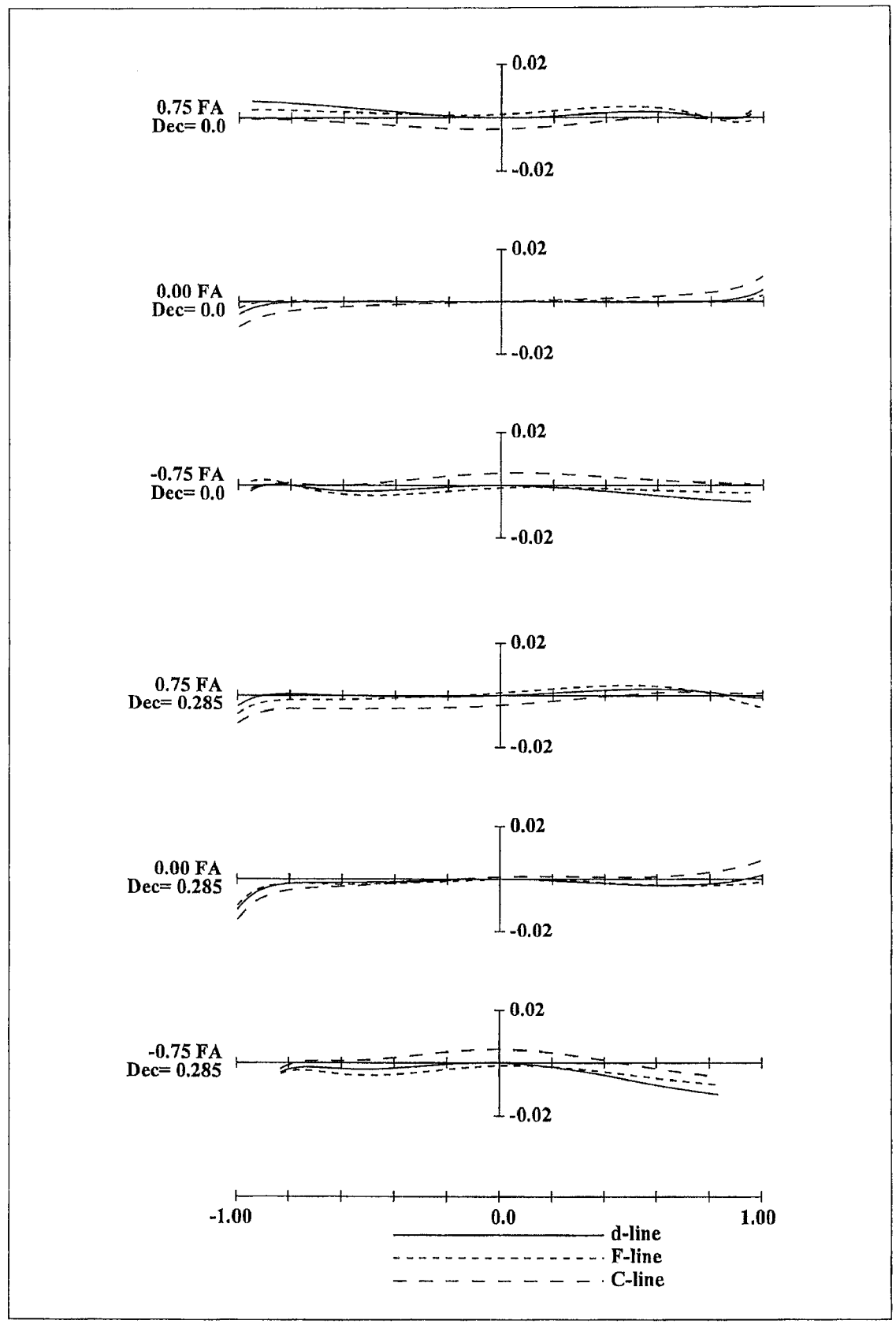
FIG. 3 is a lateral aberration diagram of a zoom lens system according to Example 1 at a telephoto limit in a basic state where image blur compensation is not performed and in a blur compensation state.

As shown in FIG. 1, in the zoom lens system according to Embodiment 1, the first lens unit G1, in order from the object side to the image side, comprises: a negative meniscus first lens element L1 with the convex surface facing the object side; a bi-convex second lens element L2; a positive meniscus third lens element L3 with the convex surface facing the object side; and a positive meniscus fourth lens element L4 with the convex surface facing the object side. Among these, the first lens element L1 and the second lens element L2 are cemented with each other. In the surface data in the corresponding numerical example described later, surface number 2 indicates the cement layer between the first lens element L1 and the second lens element L2.

In the zoom lens system according to Embodiment 1, the second lens unit G2, in order from the object side to the image side, comprises: a negative meniscus fifth lens element L5 with the convex surface facing the object side; a bi-concave sixth lens element L6; a positive meniscus seventh lens element L7 with the convex surface facing the object side; and a positive meniscus eighth lens element L8 with the convex surface facing the object side. Among these, the sixth lens element L6 and the seventh lens element L7 are cemented with each other. In the surface data in the corresponding numerical example described later, surface number 12 indicates the cement layer between the sixth lens element L6 and the seventh lens element L7. Further, the fifth lens element L5 has two aspheric surfaces.

In the zoom lens system according to Embodiment 1, the third lens unit G3, in order from the object side to the image side, comprises: a bi-convex ninth lens element L9; a bi-convex tenth lens element L10; a bi-concave eleventh lens element L11; and a bi-convex twelfth lens element L12. Among these, the tenth lens element L10 and the eleventh lens element L11 are cemented with each other. In the surface data in the corresponding numerical example described later, surface number 22 indicates the cement layer between the tenth lens element L10 and the eleventh lens element L11. Further, the ninth lens element L9 has an aspheric object side surface.

In the zoom lens system according to Embodiment 1, the fourth lens unit G4, in order from the object side to the image side, comprises: a bi-convex thirteenth lens element L13; and a negative meniscus fourteenth lens element L14 with the convex surface facing the image side. The thirteenth lens element L13 and the fourteenth lens element L14 are cemented with each other. In the surface data in the corresponding numerical example described later, surface number 28 indicates the cement layer between the thirteenth lens element L13 and the fourteenth lens element L14.

In the zoom lens system according to Embodiment 1, a plane parallel plate P is provided on the object side relative to the image surface S (between the image surface S and the fourteenth lens element L14).

In the zoom lens system according to Embodiment 1, in zooming from a wide-angle limit to a telephoto limit at the time of image taking, the first lens unit G1 moves to the object side. The second lens unit G2 moves to the image side with locus of a convex to the image side. The aperture diaphragm A moves to the object side. The third lens unit G3 moves to the object side. The fourth lens unit G4 moves to the object side with locus of a convex to the object side. That is, in zooming, the individual lens units are moved along the optical axis such that the interval between the first lens unit G1 and the second lens unit G2 should increase, that the interval between the second lens unit G2 and the aperture diaphragm A should decrease, that the interval between the aperture diaphragm A and the third lens unit G3 should decrease, and that the interval between the third lens unit G3 and the fourth lens unit G4 should increase.

On the other hand, in focusing from the infinity in-focus condition to the close-object in-focus condition, the fourth lens unit G4 moves to the object side along the optical axis.

Figure 4:
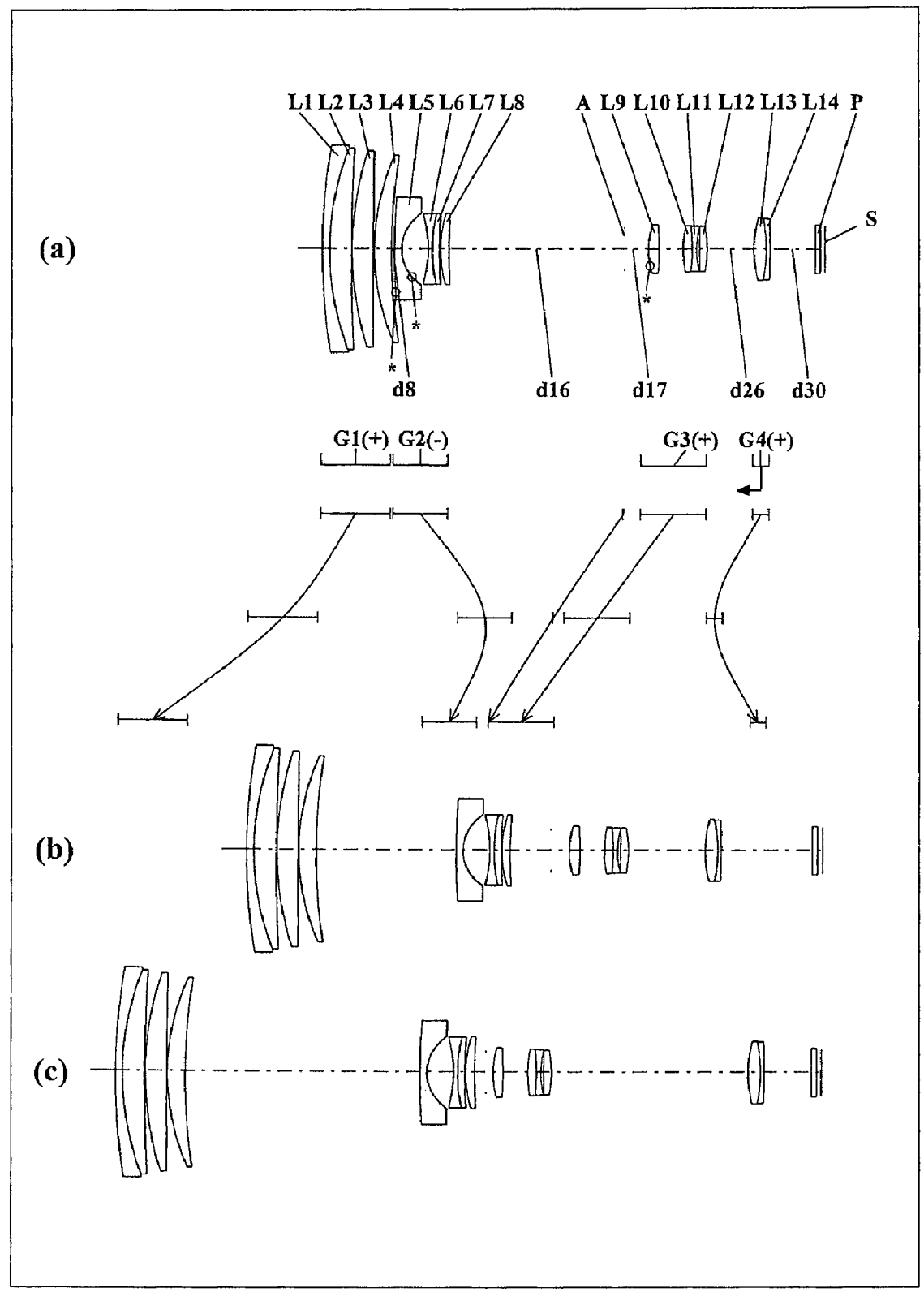
FIG. 4 is a lens arrangement diagram showing an infinity in-focus condition of a zoom lens system according to Embodiment 2 (Example 2)
Figure 5:
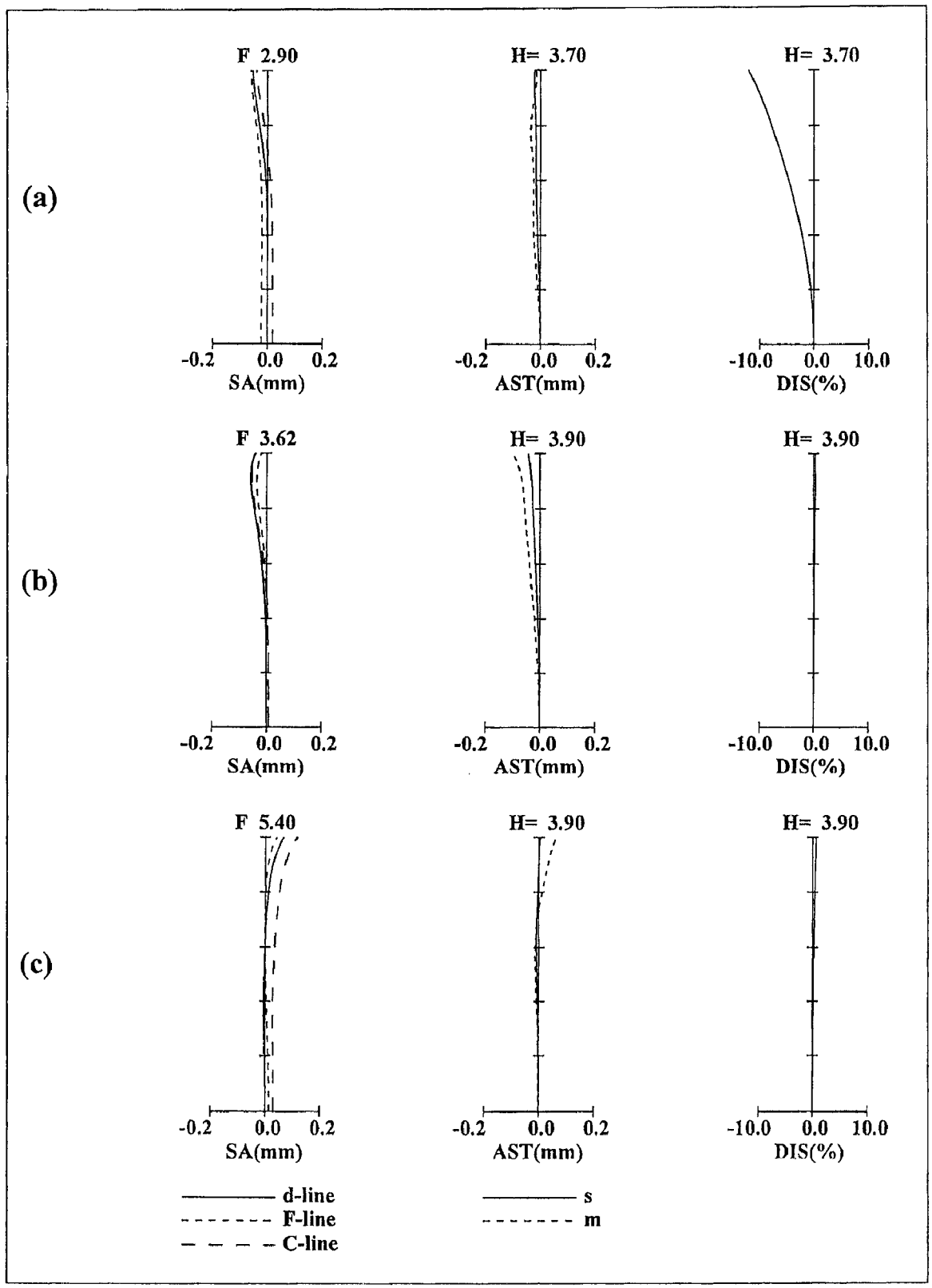
FIG. 5 is a longitudinal aberration diagram of an infinity in-focus condition of a zoom lens system according to Example 2.
Figure 6:
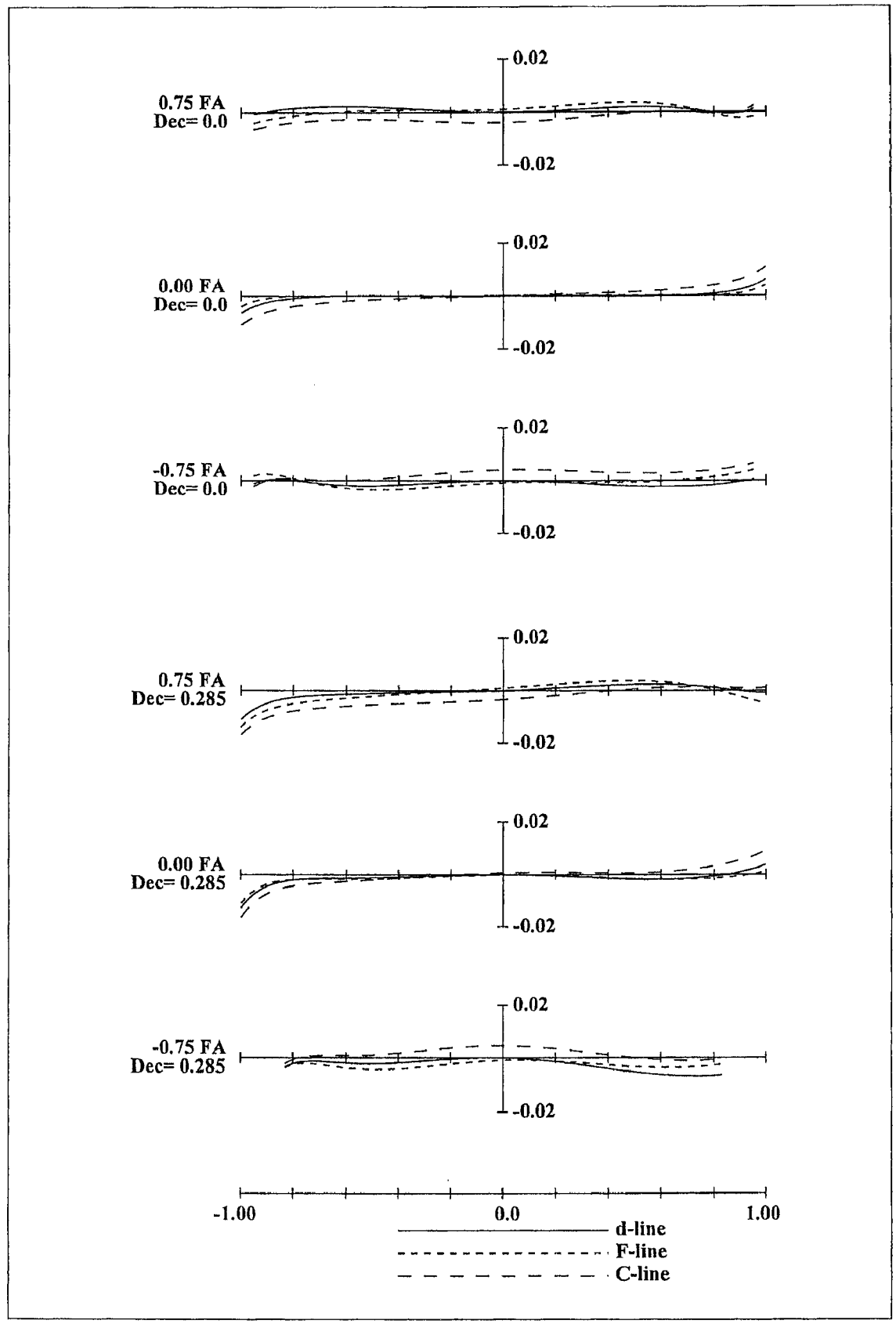
FIG. 6 is a lateral aberration diagram of a zoom lens system according to Example 2 at a telephoto limit in a basic state where image blur compensation is not performed and in a blur compensation state.

As shown in FIG. 4, in the zoom lens system according to Embodiment 2, the first lens unit G1, in order from the object side to the image side, comprises: a negative meniscus first lens element L1 with the convex surface facing the object side; a positive meniscus second lens element L2 with the convex surface facing the object side; a positive meniscus third lens element L3 with the convex surface facing the object side; and a positive meniscus fourth lens element L4 with the convex surface facing the object side. Among these, the first lens element L1 and the second lens element L2 are cemented with each other. In the surface data in the corresponding numerical example described later, surface number 2 indicates the cement layer between the first lens element L1 and the second lens element L2.

In the zoom lens system according to Embodiment 2, the second lens unit G2, in order from the object side to the image side, comprises: a negative meniscus fifth lens element L5 with the convex surface facing the object side; a bi-concave sixth lens element L6; a positive meniscus seventh lens element L7 with the convex surface facing the object side; and a positive meniscus eighth lens element L8 with the convex surface facing the object side. Among these, the sixth lens element L6 and the seventh lens element L7 are cemented with each other. In the surface data in the corresponding numerical example described later, surface number 12 indicates the cement layer between the sixth lens element L6 and the seventh lens element L7. Further, the fifth lens element L5 has two aspheric surfaces.

In the zoom lens system according to Embodiment 2, the third lens unit G3, in order from the object side to the image side, comprises: a bi-convex ninth lens element L9; a bi-convex tenth lens element L10; a bi-concave eleventh lens element L11; and a bi-convex twelfth lens element L12. Among these, the tenth lens element L10 and the eleventh lens element L11 are cemented with each other. In the surface data in the corresponding numerical example described later, surface number 22 indicates the cement layer between the tenth lens element L10 and the eleventh lens element L11. Further, the ninth lens element L9 has an aspheric object side surface.

In the zoom lens system according to Embodiment 2, the fourth lens unit G4, in order from the object side to the image side, comprises: a bi-convex thirteenth lens element L13; and a negative meniscus fourteenth lens element L14 with the convex surface facing the image side. The thirteenth lens element L13 and the fourteenth lens element L14 are cemented with each other. In the surface data in the corresponding numerical example described later, surface number 28 indicates the cement layer between the thirteenth lens element L13 and the fourteenth lens element L14.

In the zoom lens system according to Embodiment 2, a plane parallel plate P is provided on the object side relative to the image surface S (between the image surface S and the fourteenth lens element L14).

In the zoom lens system according to Embodiment 2, in zooming from a wide-angle limit to a telephoto limit at the time of image taking, the first lens unit G1 moves to the object side. The second lens unit G2 moves to the image side with locus of a convex to the image side. The aperture diaphragm A moves to the object side. The third lens unit G3 moves to the object side. The fourth lens unit G4 moves to the object side with locus of a convex to the object side. That is, in zooming, the individual lens units are moved along the optical axis such that the interval between the first lens unit G1 and the second lens unit G2 should increase, that the interval between the second lens unit G2 and the aperture diaphragm A should decrease, that the interval between the aperture diaphragm A and the third lens unit G3 should decrease, and that the interval between the third lens unit G3 and the fourth lens unit G4 should increase.

On the other hand, in focusing from the infinity in-focus condition to the close-object in-focus condition, the fourth lens unit G4 moves to the object side along the optical axis.

Figure 7:
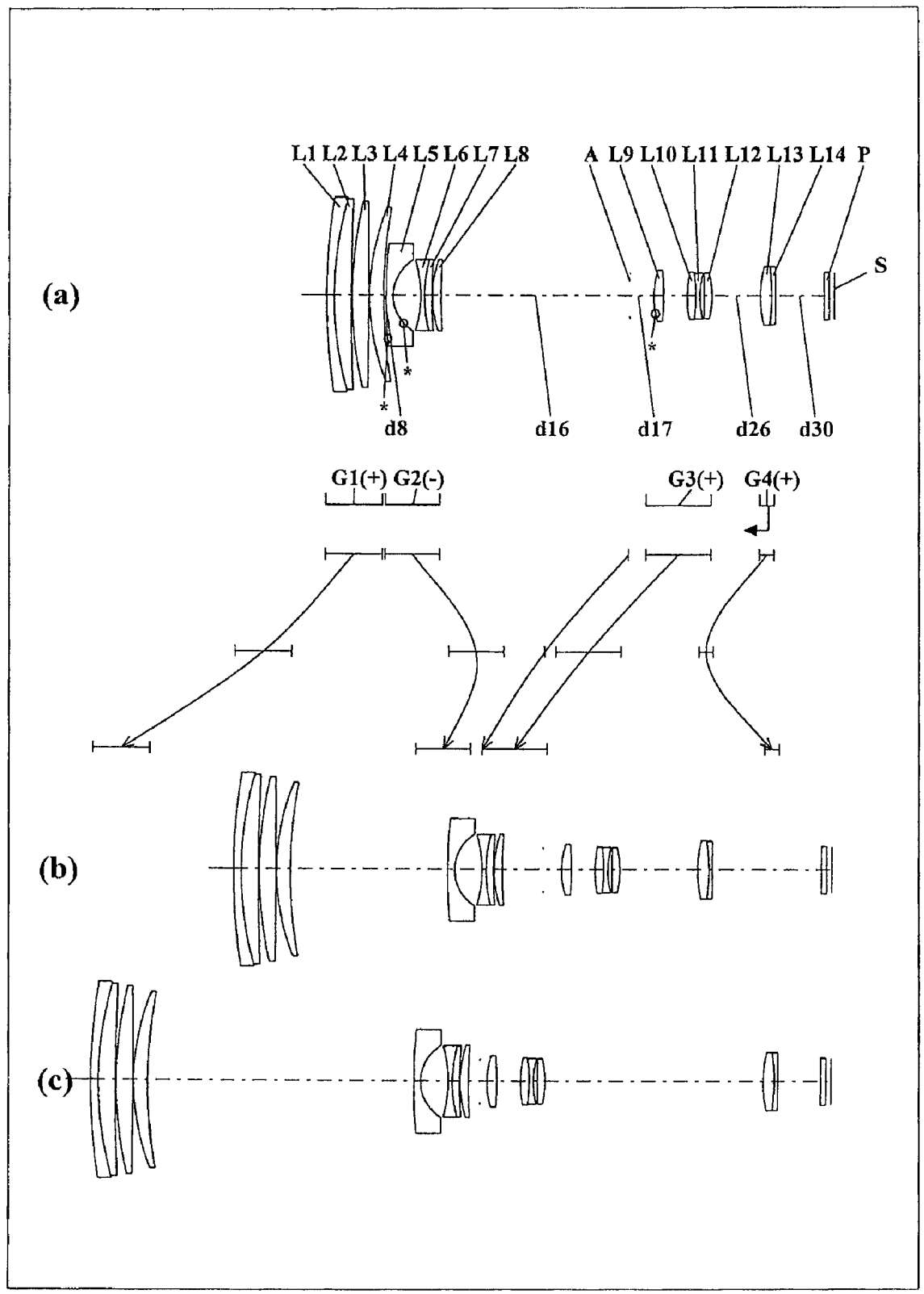
FIG. 7 is a lens arrangement diagram showing an infinity in-focus condition of a zoom lens system according to Embodiment 3 (Example 3)
Figure 8:
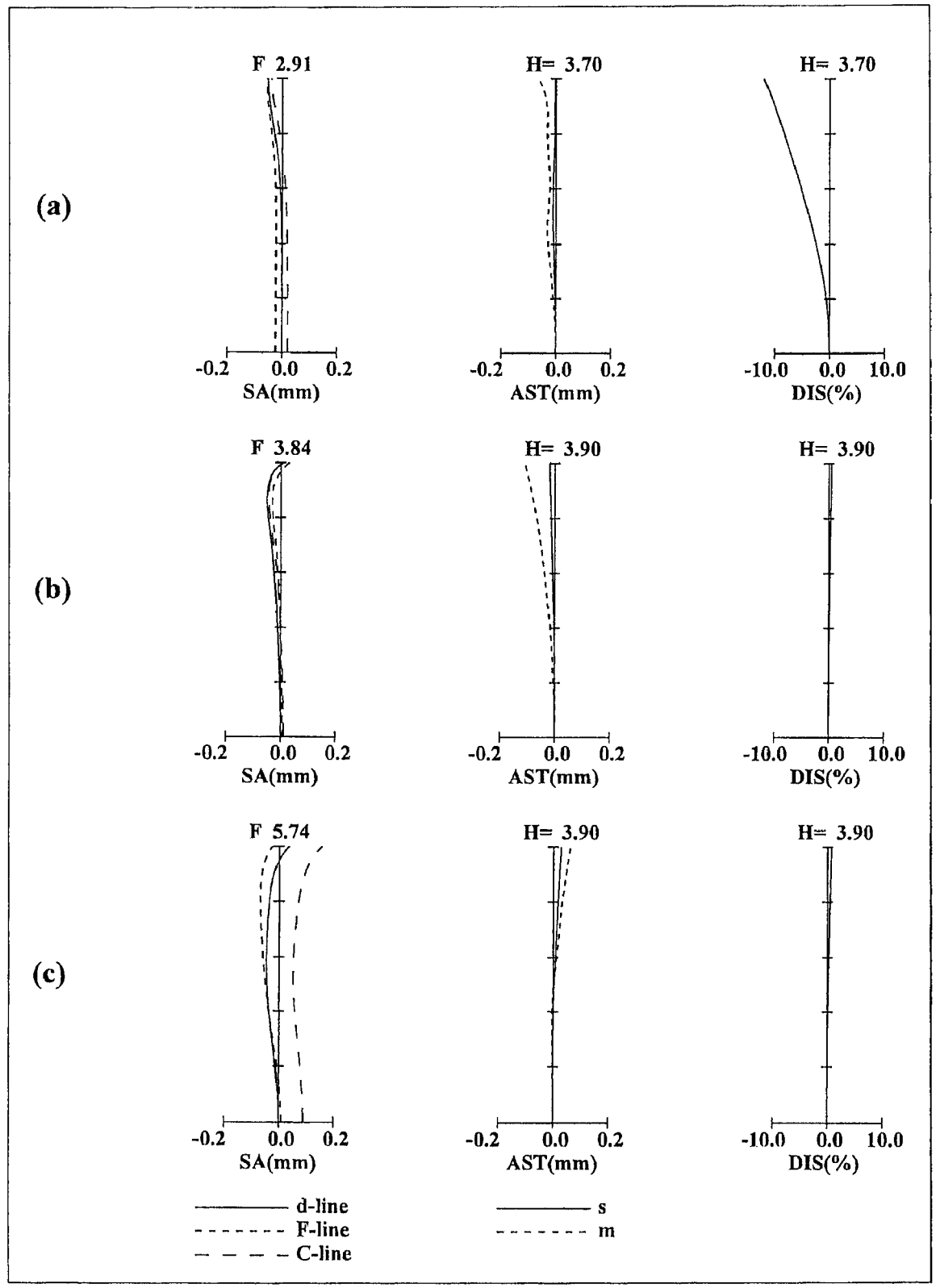
FIG. 8 is a longitudinal aberration diagram of an infinity in-focus condition of a zoom lens system according to Example 3.
Figure 9:
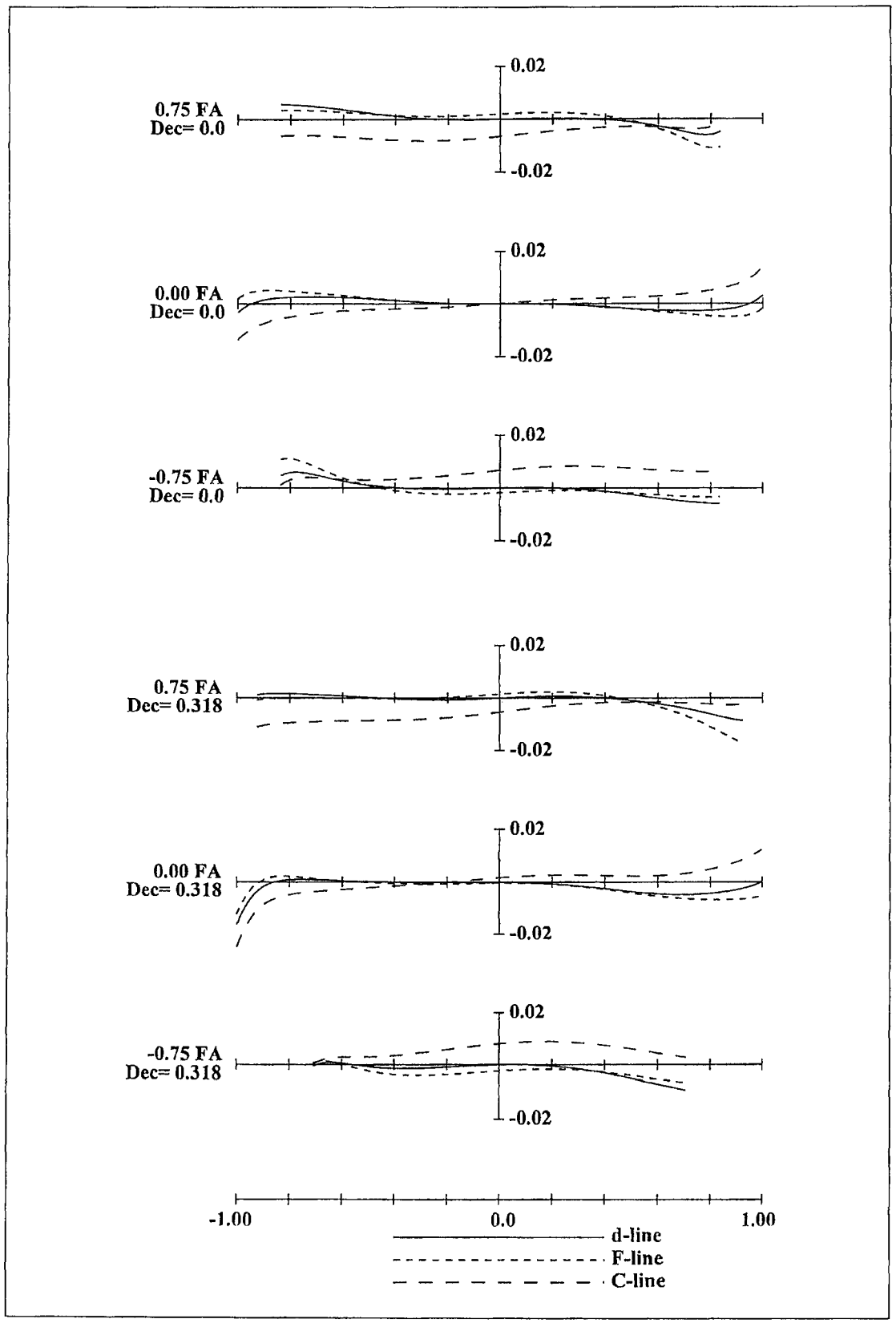
FIG. 9 is a lateral aberration diagram of a zoom lens system according to Example 3 at a telephoto limit in a basic state where image blur compensation is not performed and in a blur compensation state.

As shown in FIG. 7, in the zoom lens system according to Embodiment 3, the first lens unit G1, in order from the object side to the image side, comprises: a negative meniscus first lens element L1 with the convex surface facing the object side; a positive meniscus second lens element L2 with the convex surface facing the object side; a bi-convex third lens element L3; and a positive meniscus fourth lens element L4 with the convex surface facing the object side. Among these, the first lens element L1 and the second lens element L2 are cemented with each other. In the surface data in the corresponding numerical example described later, surface number 2 indicates the cement layer between the first lens element L1 and the second lens element L2.

In the zoom lens system according to Embodiment 3, the second lens unit G2, in order from the object side to the image side, comprises: a negative meniscus fifth lens element L5 with the convex surface facing the object side; a bi-concave sixth lens element L6; a positive meniscus seventh lens element L7 with the convex surface facing the object side; and a positive meniscus eighth lens element L8 with the convex surface facing the object side. Among these, the sixth lens element L6 and the seventh lens element L7 are cemented with each other. In the surface data in the corresponding numerical example described later, surface number 12 indicates the cement layer between the sixth lens element L6 and the seventh lens element L7. Further, the fifth lens element L5 has two aspheric surfaces.

In the zoom lens system according to Embodiment 3, the third lens unit G3, in order from the object side to the image side, comprises: a bi-convex ninth lens element L9; a bi-convex tenth lens element L10; a bi-concave eleventh lens element L11; and a bi-convex twelfth lens element L12. Among these, the tenth lens element L10 and the eleventh lens element L11 are cemented with each other. In the surface data in the corresponding numerical example described later, surface number 22 indicates the cement layer between the tenth lens element L10 and the eleventh lens element L11. Further, the ninth lens element L9 has an aspheric object side surface.

In the zoom lens system according to Embodiment 3, the fourth lens unit G4, in order from the object side to the image side, comprises: a bi-convex thirteenth lens element L13; and a negative meniscus fourteenth lens element L14 with the convex surface facing the image side. The thirteenth lens element L13 and the fourteenth lens element L14 are cemented with each other. In the surface data in the corresponding numerical example described later, surface number 28 indicates the cement layer between the thirteenth lens element L13 and the fourteenth lens element L14.

In the zoom lens system according to Embodiment 3, a plane parallel plate P is provided on the object side relative to the image surface S (between the image surface S and the fourteenth lens element L14).

In the zoom lens system according to Embodiment 3, in zooming from a wide-angle limit to a telephoto limit at the time of image taking, the first lens unit G1 moves to the object side. The second lens unit G2 moves to the image side with locus of a convex to the image side. The aperture diaphragm A moves to the object side. The third lens unit G3 moves to the object side. The fourth lens unit G4 moves to the object side with locus of a convex to the object side. That is, in zooming, the individual lens units are moved along the optical axis such that the interval between the first lens unit G1 and the second lens unit G2 should increase, that the interval between the second lens unit G2 and the aperture diaphragm A should decrease, that the interval between the aperture diaphragm A and the third lens unit G3 should decrease, and that the interval between the third lens unit G3 and the fourth lens unit G4 should increase.

On the other hand, in focusing from the infinity in-focus condition to the close-object in-focus condition, the fourth lens unit G4 moves to the object side along the optical axis.

Figure 10:
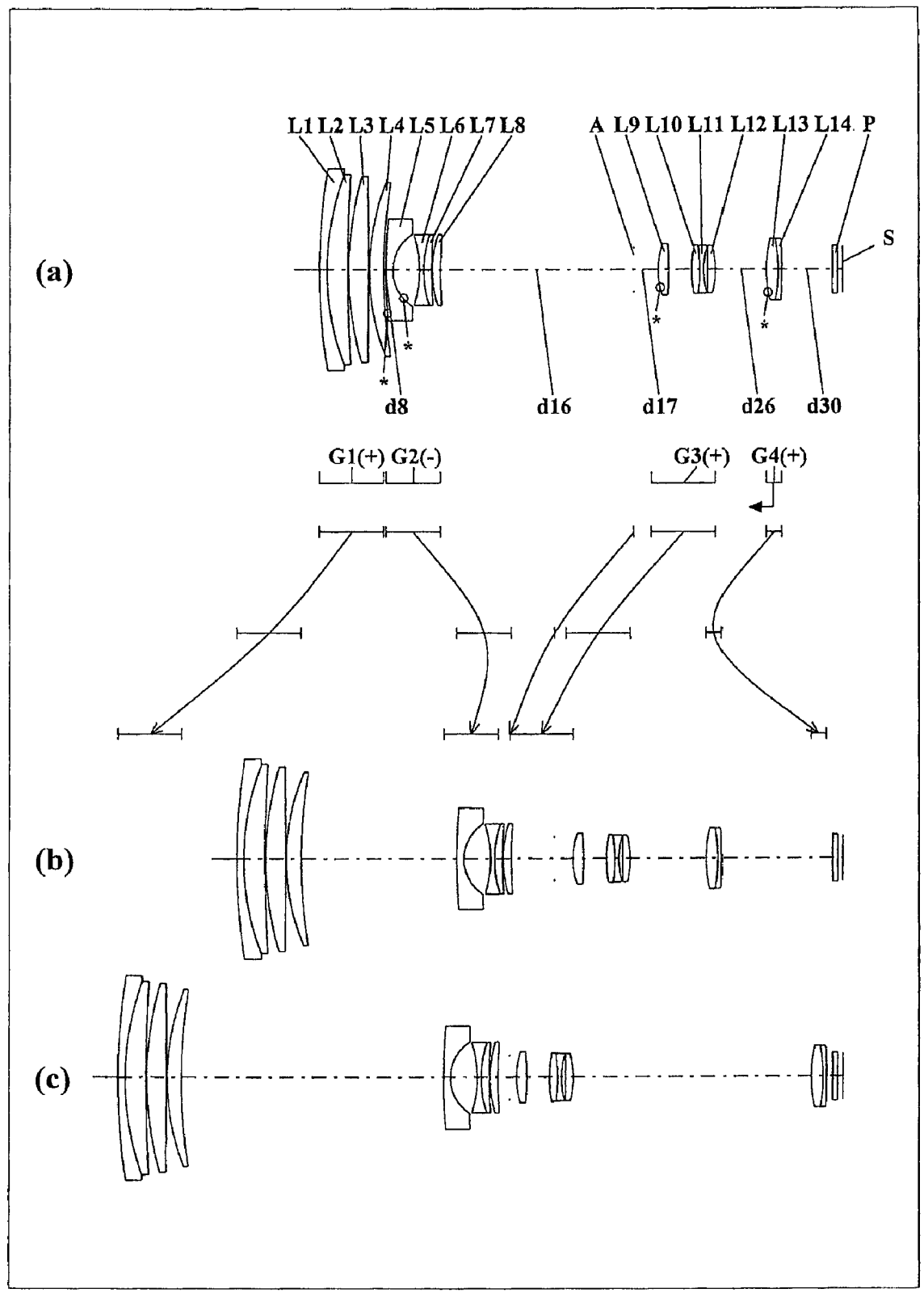
FIG. 10 is a lens arrangement diagram showing an infinity in-focus condition of a zoom lens system according to Embodiment 4 (Example 4)
Figure 11:
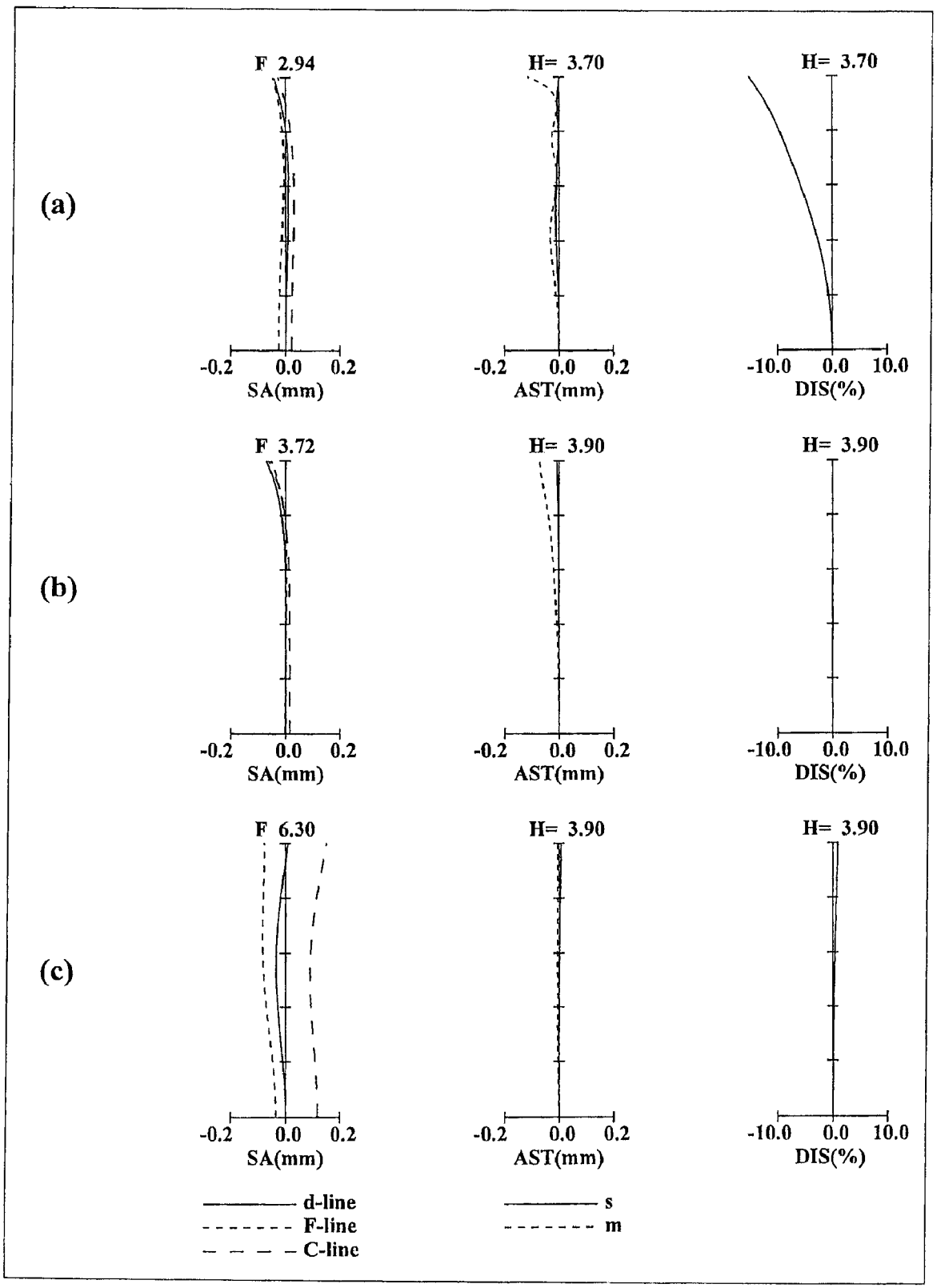
FIG. 11 is a longitudinal aberration diagram of an infinity in-focus condition of a zoom lens system according to Example 4.
Figure 12:
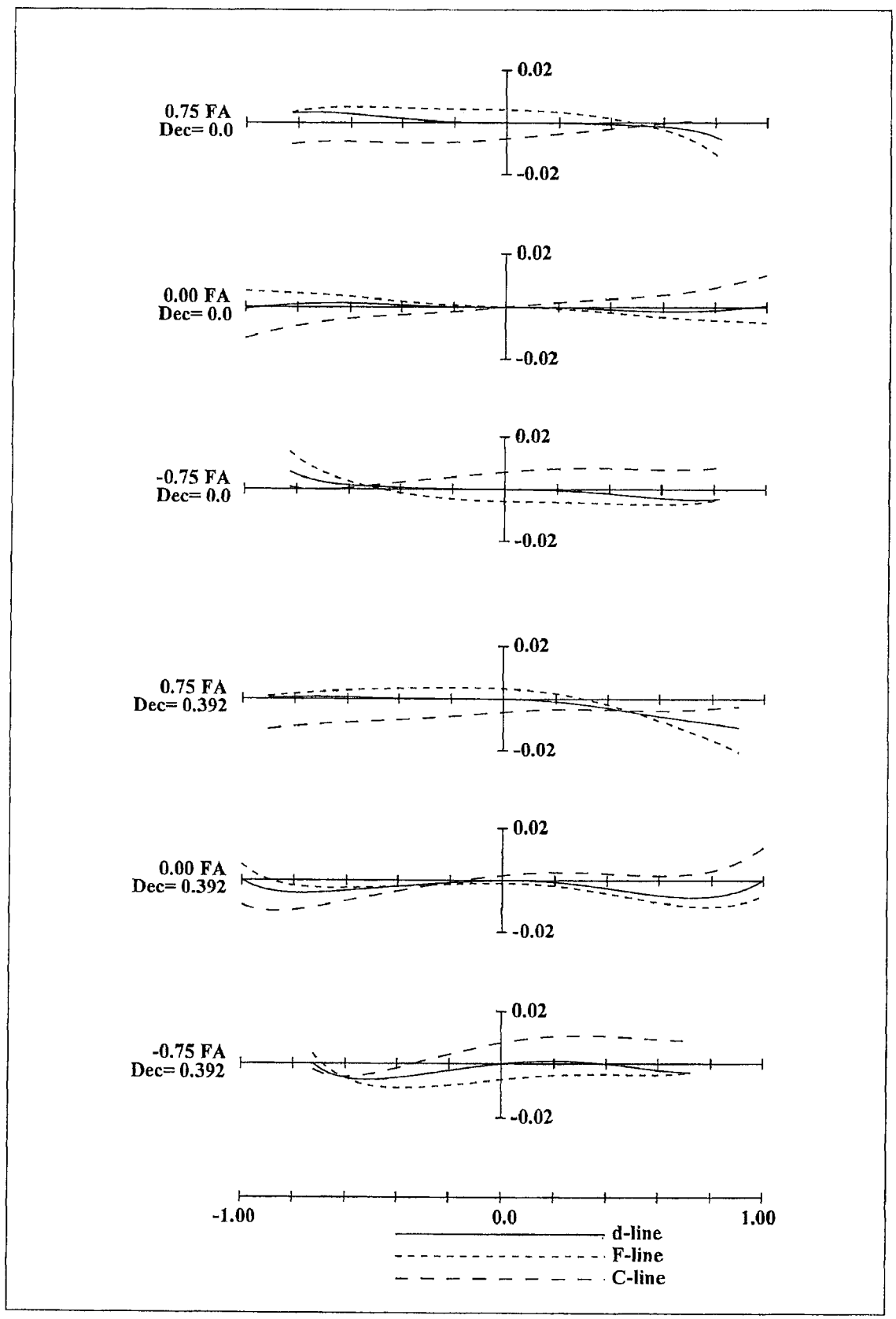
FIG. 12 is a lateral aberration diagram of a zoom lens system according to Example 4 at a telephoto limit in a basic state where image blur compensation is not performed and in a blur compensation state.

As shown in FIG. 10, in the zoom lens system according to Embodiment 4, the first lens unit G1, in order from the object side to the image side, comprises: a negative meniscus first lens element L1 with the convex surface facing the object side; a positive meniscus second lens element L2 with the convex surface facing the object side; a bi-convex third lens element L3; and a positive meniscus fourth lens element L4 with the convex surface facing the object side. Among these, the first lens element L1 and the second lens element L2 are cemented with each other. In the surface data in the corresponding numerical example described later, surface number 2 indicates the cement layer between the first lens element L1 and the second lens element L2.

In the zoom lens system according to Embodiment 4, the second lens unit G2, in order from the object side to the image side, comprises: a negative meniscus fifth lens element L5 with the convex surface facing the object side; a bi-concave sixth lens element L6; a positive meniscus seventh lens element L7 with the convex surface facing the object side; and a positive meniscus eighth lens element L8 with the convex surface facing the object side. Among these, the sixth lens element L6 and the seventh lens element L7 are cemented with each other. In the surface data in the corresponding numerical example described later, surface number 12 indicates the cement layer between the sixth lens element L6 and the seventh lens element L7. Further, the fifth lens element L5 has two aspheric surfaces.

In the zoom lens system according to Embodiment 4, the third lens unit G3, in order from the object side to the image side, comprises: a bi-convex ninth lens element L9; a bi-convex tenth lens element L10; a bi-concave eleventh lens element L11; and a bi-convex twelfth lens element L12. Among these, the tenth lens element L10 and the eleventh lens element L11 are cemented with each other. In the surface data in the corresponding numerical example described later, surface number 22 indicates the cement layer between the tenth lens element L10 and the eleventh lens element L11. Further, the ninth lens element L9 has an aspheric object side surface.

In the zoom lens system according to Embodiment 4, the fourth lens unit G4, in order from the object side to the image side, comprises: a bi-convex thirteenth lens element L13; and a negative meniscus fourteenth lens element L14 with the convex surface facing the image side. The thirteenth lens element L13 and the fourteenth lens element L14 are cemented with each other. In the surface data in the corresponding numerical example described later, surface number 28 indicates the cement layer between the thirteenth lens element L13 and the fourteenth lens element L14.

In the zoom lens system according to Embodiment 4, a plane parallel plate P is provided on the object side relative to the image surface S (between the image surface S and the fourteenth lens element L14).

In the zoom lens system according to Embodiment 4, in zooming from a wide-angle limit to a telephoto limit at the time of image taking, the first lens unit G1 moves to the object side. The second lens unit G2 moves to the image side with locus of a convex to the image side. The aperture diaphragm A moves to the object side. The third lens unit G3 moves to the object side. The fourth lens unit G4 moves to the image side with locus of a convex to the object side. That is, in zooming, the individual lens units are moved along the optical axis such that the interval between the first lens unit G1 and the second lens unit G2 should increase, that the interval between the second lens unit G2 and the aperture diaphragm A should decrease, that the interval between the aperture diaphragm A and the third lens unit G3 should decrease, and that the interval between the third lens unit G3 and the fourth lens unit G4 should increase.

On the other hand, in focusing from the infinity in-focus condition to the close-object in-focus condition, the fourth lens unit G4 moves to the object side along the optical axis.

Figure 13:
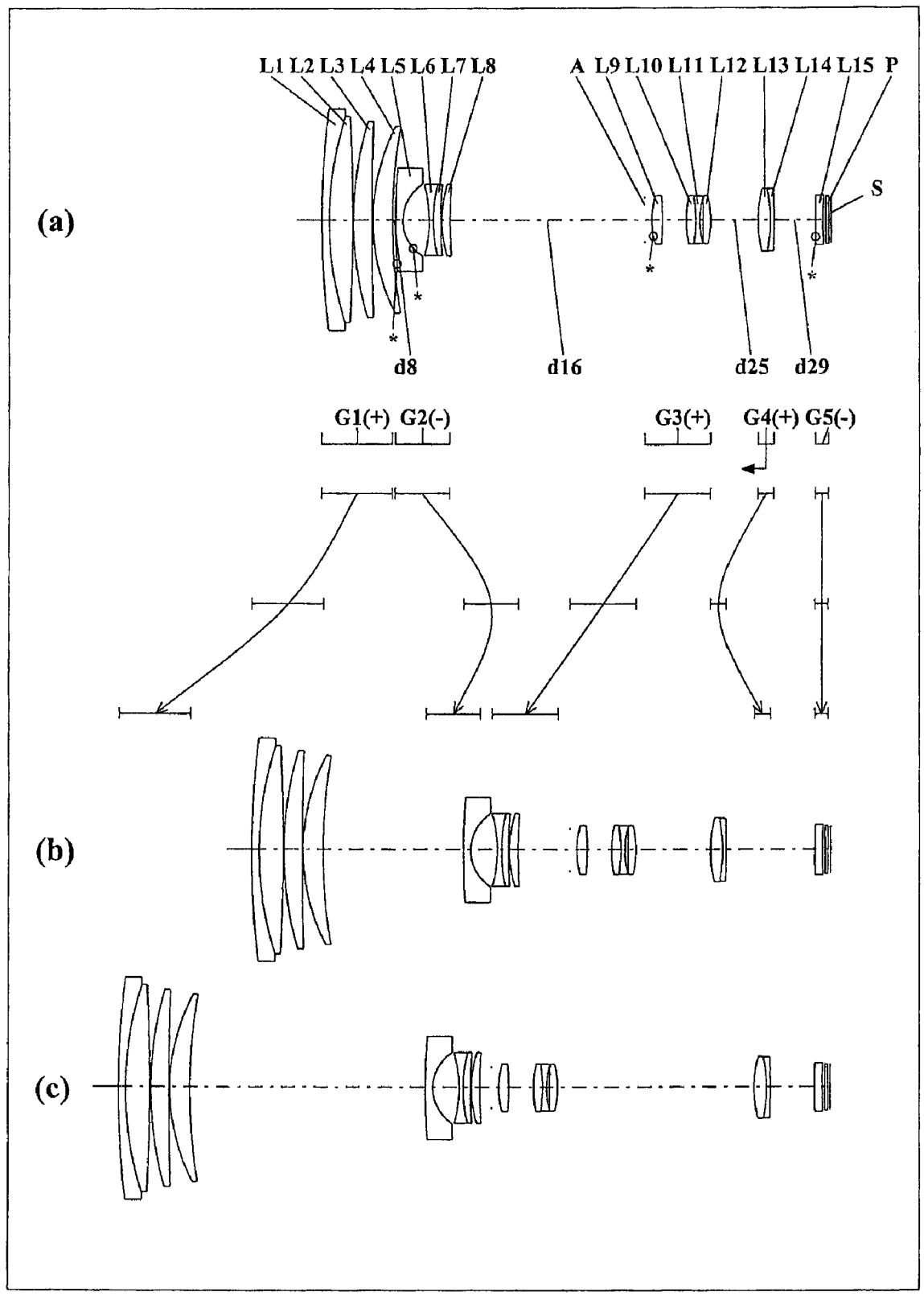
FIG. 13 is a lens arrangement diagram showing an infinity in-focus condition of a zoom lens system according to Embodiment 5 (Example 5)
Figure 14:
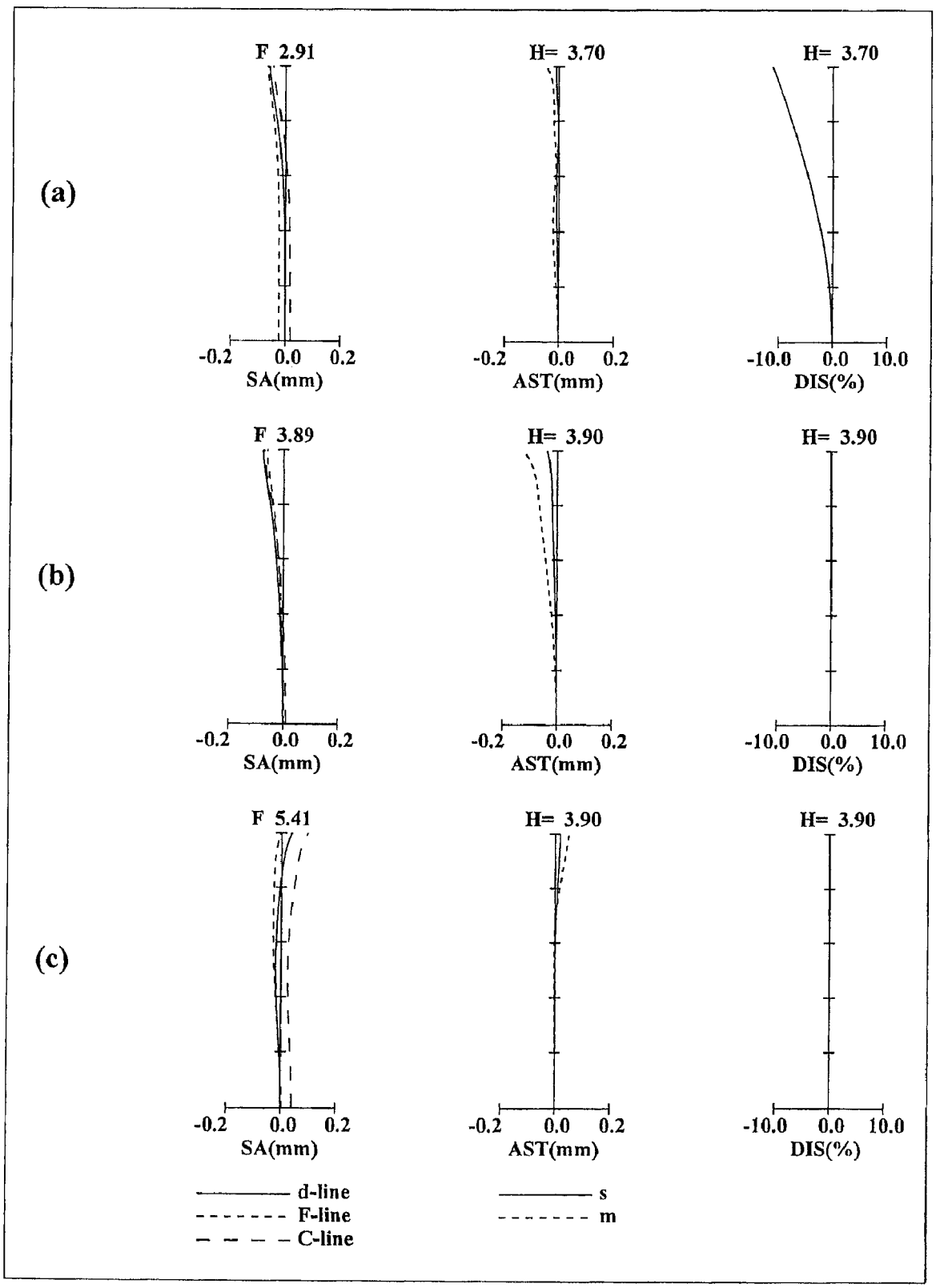
FIG. 14 is a longitudinal aberration diagram of an infinity in-focus condition of a zoom lens system according to Example 5.
Figure 15:
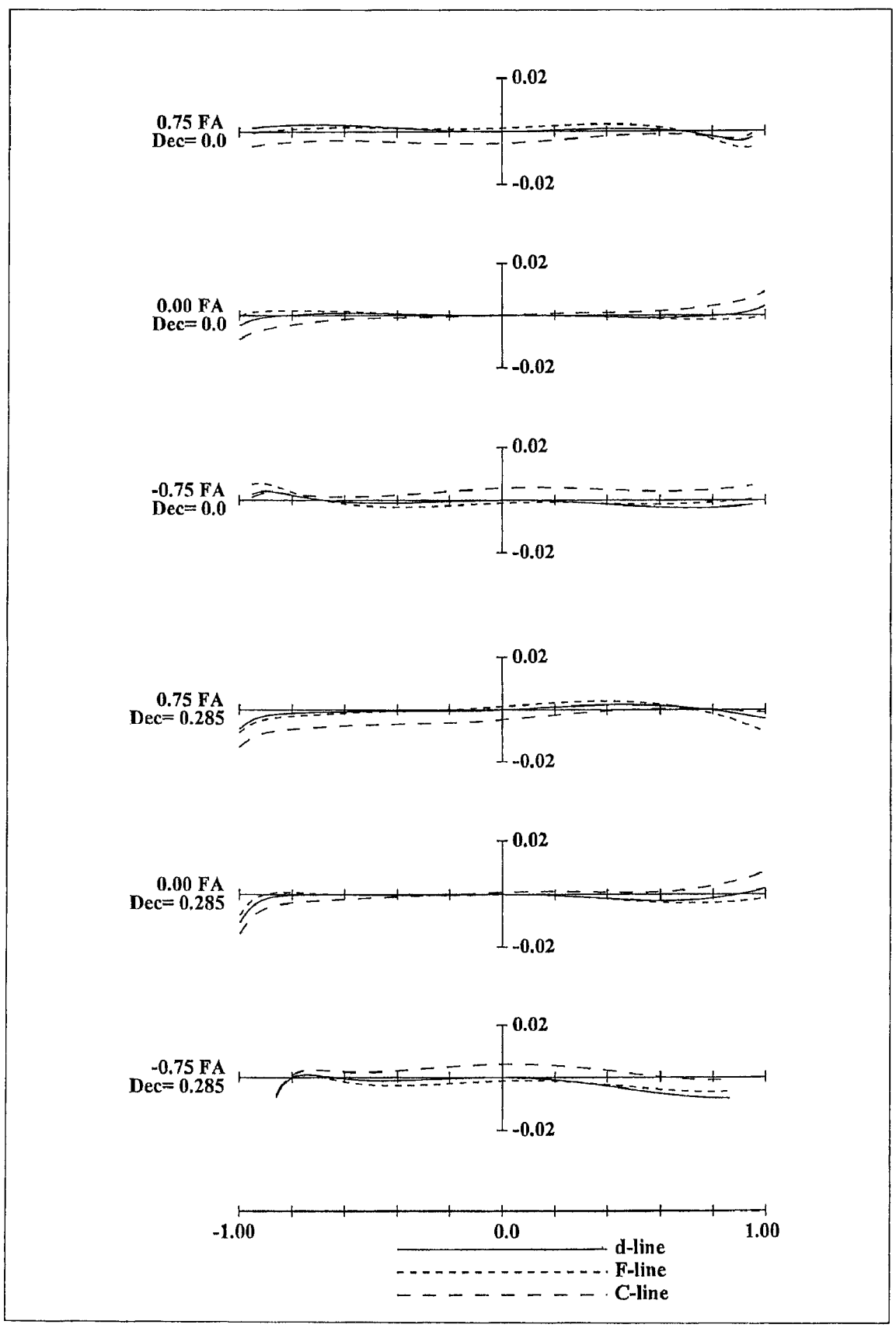
FIG. 15 is a lateral aberration diagram of a zoom lens system according to Example 5 at a telephoto limit in a basic state where image blur compensation is not performed and in a blur compensation state.

As shown in FIG. 13, in the zoom lens system according to Embodiment 5, the first lens unit G1, in order from the object side to the image side, comprises: a negative meniscus first lens element L1 with the convex surface facing the object side; a bi-convex second lens element L2; a positive meniscus third lens element L3 with the convex surface facing the object side; and a positive meniscus fourth lens element L4 with the convex surface facing the object side. Among these, the first lens element L1 and the second lens element L2 are cemented with each other. In the surface data in the corresponding numerical example described later, surface number 2 indicates the cement layer between the first lens element L1 and the second lens element L2.

In the zoom lens system according to Embodiment 5, the second lens unit G2, in order from the object side to the image side, comprises: a negative meniscus fifth lens element L5 with the convex surface facing the object side; a bi-concave sixth lens element L6; a positive meniscus seventh lens element L7 with the convex surface facing the object side; and a positive meniscus eighth lens element L8 with the convex surface facing the object side. Among these, the sixth lens element L6 and the seventh lens element L7 are cemented with each other. In the surface data in the corresponding numerical example described later, surface number 12 indicates the cement layer between the sixth lens element L6 and the seventh lens element L7. Further, the fifth lens element L5 has two aspheric surfaces.

In the zoom lens system according to Embodiment 5, the third lens unit G3, in order from the object side to the image side, comprises: a bi-convex ninth lens element L9; a bi-convex tenth lens element L10; a bi-concave eleventh lens element L11; and a bi-convex twelfth lens element L12. Among these, the tenth lens element L10 and the eleventh lens element L11 are cemented with each other. In the surface data in the corresponding numerical example described later, surface number 21 indicates the cement layer between the tenth lens element L10 and the eleventh lens element L11. Further, the ninth lens element L9 has an aspheric object side surface.

In the zoom lens system according to Embodiment 5, the fourth lens unit G4, in order from the object side to the image side, comprises: a bi-convex thirteenth lens element L13; and a negative meniscus fourteenth lens element L14 with the convex surface facing the image side. The thirteenth lens element L13 and the fourteenth lens element L14 are cemented with each other. In the surface data in the corresponding numerical example described later, surface number 27 indicates the cement layer between the thirteenth lens element L13 and the fourteenth lens element L14.

In the zoom lens system according to Embodiment 5, the fifth lens unit G5 comprises solely a negative meniscus fifteenth lens element L15 with the convex surface facing the object side. The fifteenth lens element L15 has an aspheric object side surface.

In the zoom lens system according to Embodiment 5, a plane parallel plate P is provided on the object side relative to the image surface S (between the image surface S and the fifteenth lens element L15).

In the zoom lens system according to Embodiment 5, in zooming from a wide-angle limit to a telephoto limit at the time of image taking, the first lens unit G1 moves to the object side. The second lens unit G2 moves to the image side with locus of a convex to the image side. The aperture diaphragm A and the third lens unit G3 move to the object side integrally with each other. The fourth lens unit G4 moves to the object side with locus of a convex to the object side. The fifth lens unit G5 does not move. That is, in zooming, the individual lens units are moved along the optical axis such that the interval between the first lens unit G1 and the second lens unit G2 should increase, that the interval between the second lens unit G2 and the third lens unit G3 should decrease, that the interval between the third lens unit G3 and the fourth lens unit G4 should increase, and that the interval between the fourth lens unit G4 and the fifth lens unit G5 should vary.

On the other hand, in focusing from the infinity in-focus condition to the close-object in-focus condition, the fourth lens unit G4 moves to the object side along the optical axis.

Figure 16:
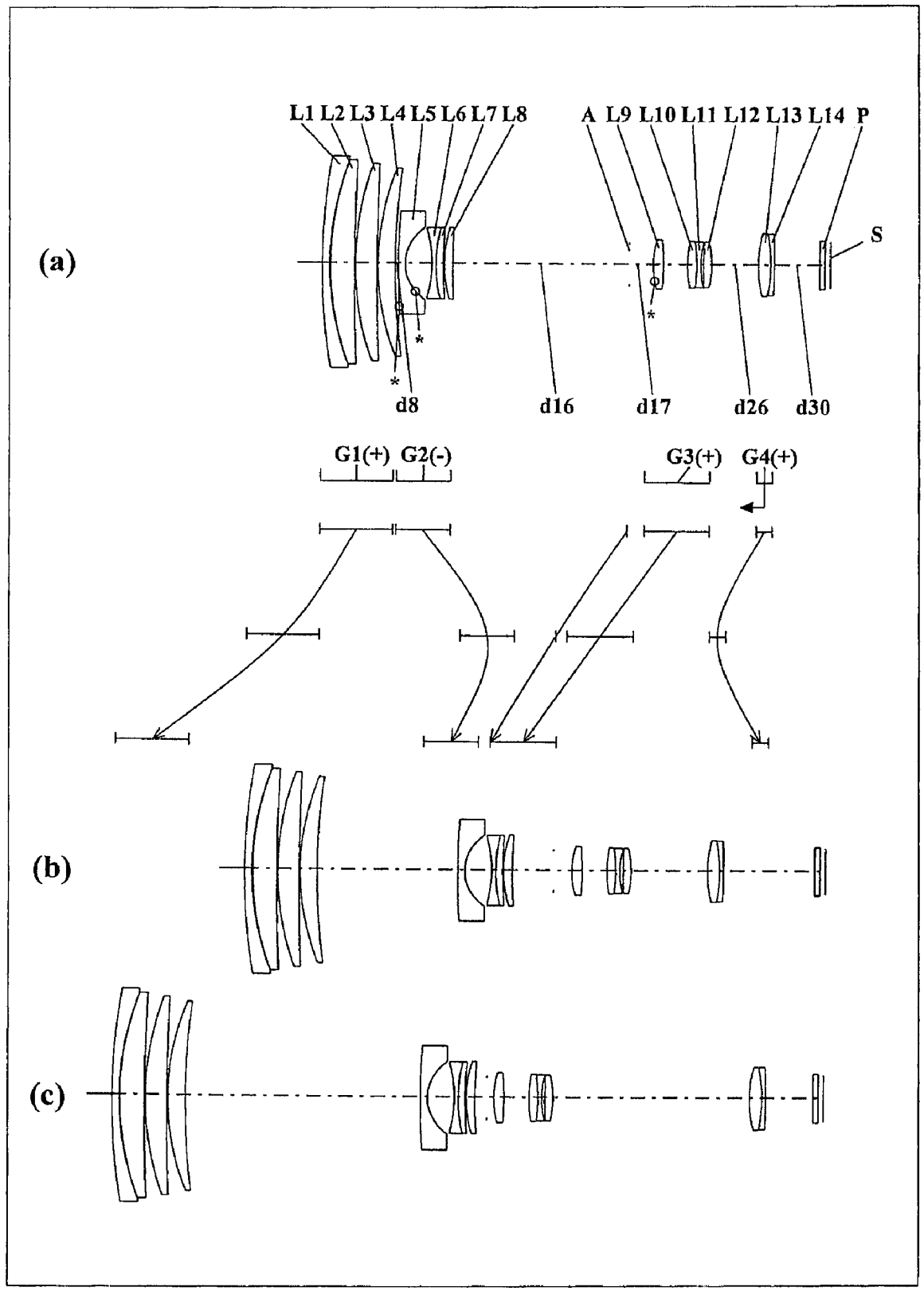
FIG. 16 is a lens arrangement diagram showing an infinity in-focus condition of a zoom lens system according to Embodiment 6 (Example 6)
Figure 17:
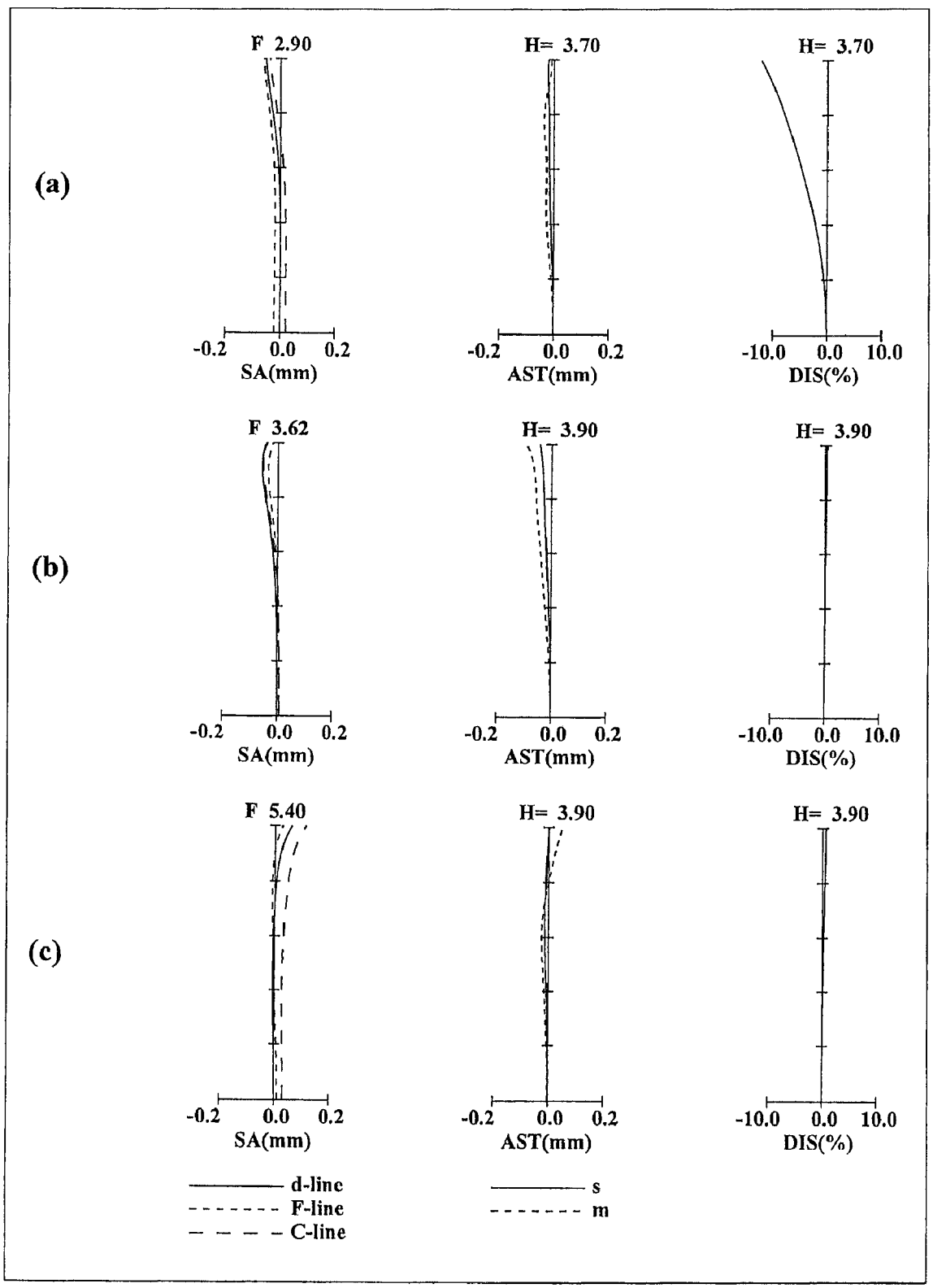
FIG. 17 is a longitudinal aberration diagram of an infinity in-focus condition of a zoom lens system according to Example 6.
Figure 18:
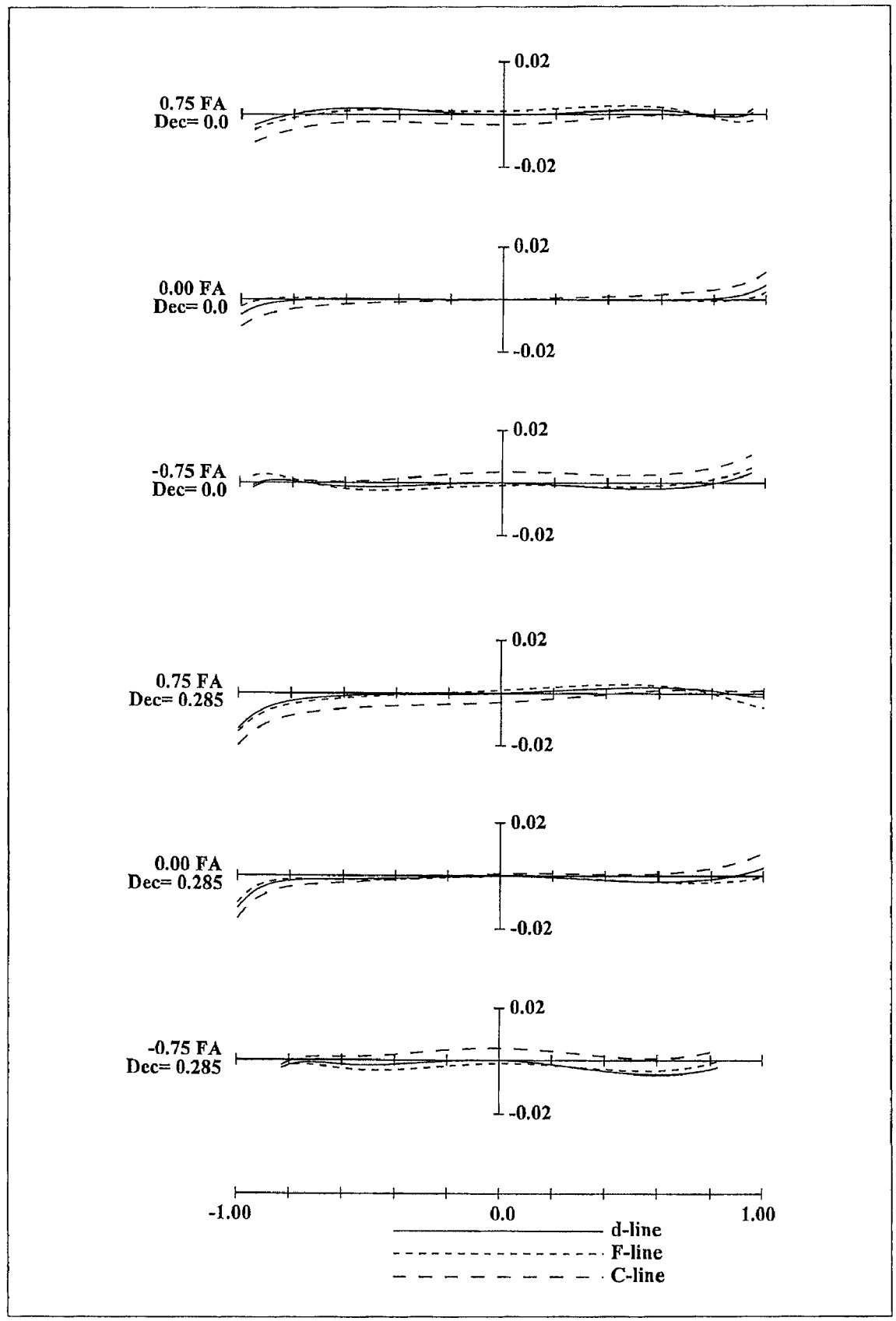
FIG. 18 is a lateral aberration diagram of a zoom lens system according to Example 6 at a telephoto limit in a basic state where image blur compensation is not performed and in a blur compensation state.

As shown in FIG. 16, in the zoom lens system according to Embodiment 6, the first lens unit G1, in order from the object side to the image side, comprises: a negative meniscus first lens element L1 with the convex surface facing the object side; a positive meniscus second lens element L2 with the convex surface facing the object side; a positive meniscus third lens element L3 with the convex surface facing the object side; and a positive meniscus fourth lens element L4 with the convex surface facing the object side.

In the zoom lens system according to Embodiment 6, the second lens unit G2, in order from the object side to the image side, comprises: a negative meniscus fifth lens element L5 with the convex surface facing the object side; a bi-concave sixth lens element L6; a positive meniscus seventh lens element L7 with the convex surface facing the object side; and a positive meniscus eighth lens element L8 with the convex surface facing the object side. Among these, the sixth lens element L6 and the seventh lens element L7 are cemented with each other. In the surface data in the corresponding numerical example described later, surface number 12 indicates the cement layer between the sixth lens element L6 and the seventh lens element L7. Further, the fifth lens element L5 has two aspheric surfaces.

In the zoom lens system according to Embodiment 6, the third lens unit G3, in order from the object side to the image side, comprises: a bi-convex ninth lens element L9; a bi-convex tenth lens element L10; a bi-concave eleventh lens element L11; and a bi-convex twelfth lens element L12. Among these, the tenth lens element L10 and the eleventh lens element L11 are cemented with each other. In the surface data in the corresponding numerical example described later, surface number 22 indicates the cement layer between the tenth lens element L10 and the eleventh lens element L11. Further, the ninth lens element L9 has an aspheric object side surface.

In the zoom lens system according to Embodiment 6, the fourth lens unit G4, in order from the object side to the image side, comprises: a bi-convex thirteenth lens element L13; and a negative meniscus fourteenth lens element L14 with the convex surface facing the image side. The thirteenth lens element L13 and the fourteenth lens element L14 are cemented with each other. In the surface data in the corresponding numerical example described later, surface number 28 indicates the cement layer between the thirteenth lens element L13 and the fourteenth lens element L14.

In the zoom lens system according to Embodiment 6, a plane parallel plate P is provided on the object side relative to the image surface S (between the image surface S and the fourteenth lens element L14).

In the zoom lens system according to Embodiment 6, in zooming from a wide-angle limit to a telephoto limit at the time of image taking, the first lens unit G1 moves to the object side. The second lens unit G2 moves to the image side with locus of a convex to the image side. The aperture diaphragm A moves to the object side. The third lens unit G3 moves to the object side. The fourth lens unit G4 moves to the object side with locus of a convex to the object side. That is, in zooming, the individual lens units are moved along the optical axis such that the interval between the first lens unit G1 and the second lens unit G2 should increase, that the interval between the second lens unit G2 and the aperture diaphragm A should decrease, that the interval between the aperture diaphragm A and the third lens unit G3 should decrease, and that the interval between the third lens unit G3 and the fourth lens unit G4 should increase.

On the other hand, in focusing from the infinity in-focus condition to the close-object in-focus condition, the fourth lens unit G4 moves to the object side along the optical axis.

Figure 19:
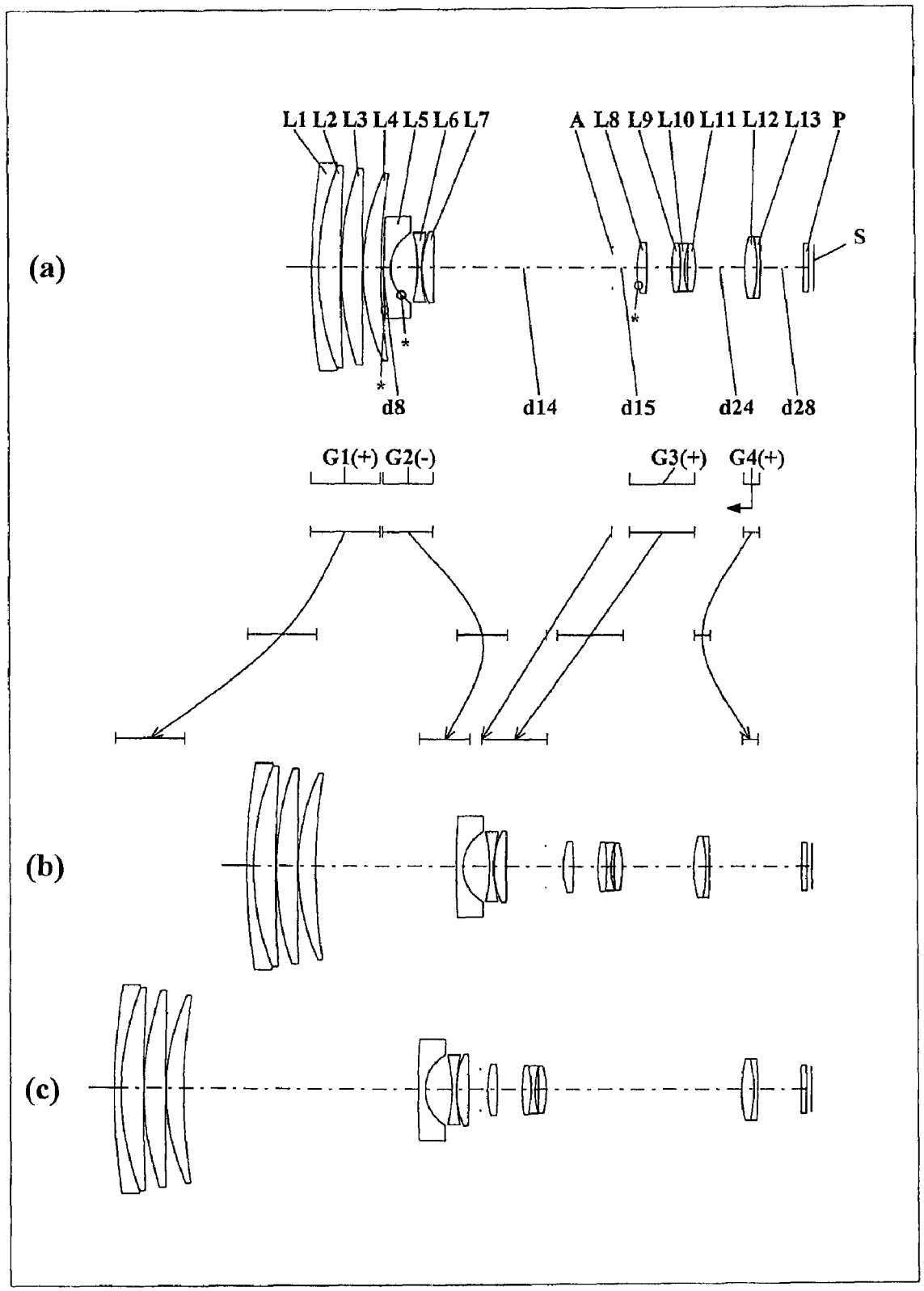
FIG. 19 is a lens arrangement diagram showing an infinity in-focus condition of a zoom lens system according to Embodiment 7 (Example 7)
Figure 20:
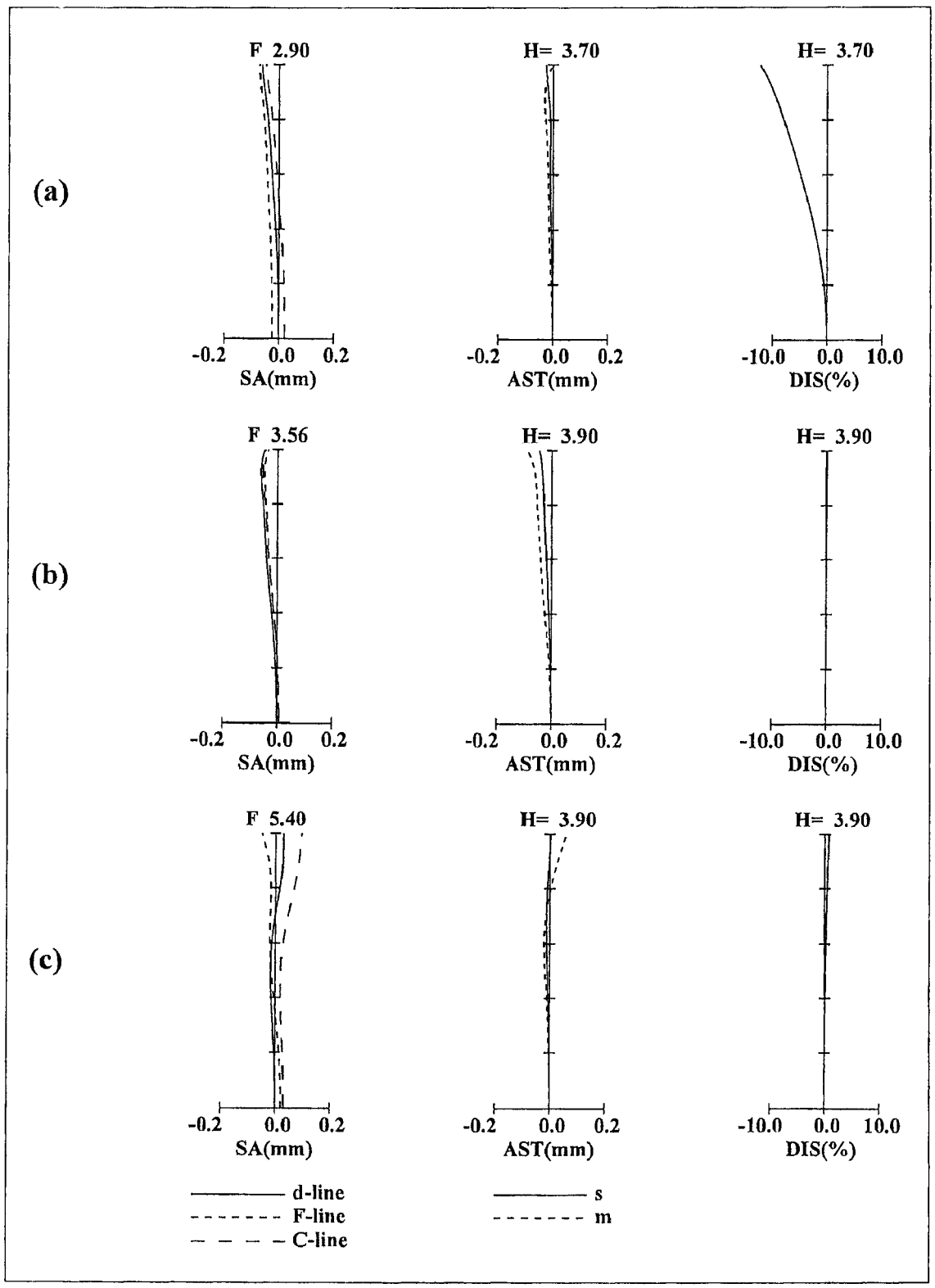
FIG. 20 is a longitudinal aberration diagram of an infinity in-focus condition of a zoom lens system according to Example 7.
Figure 21:
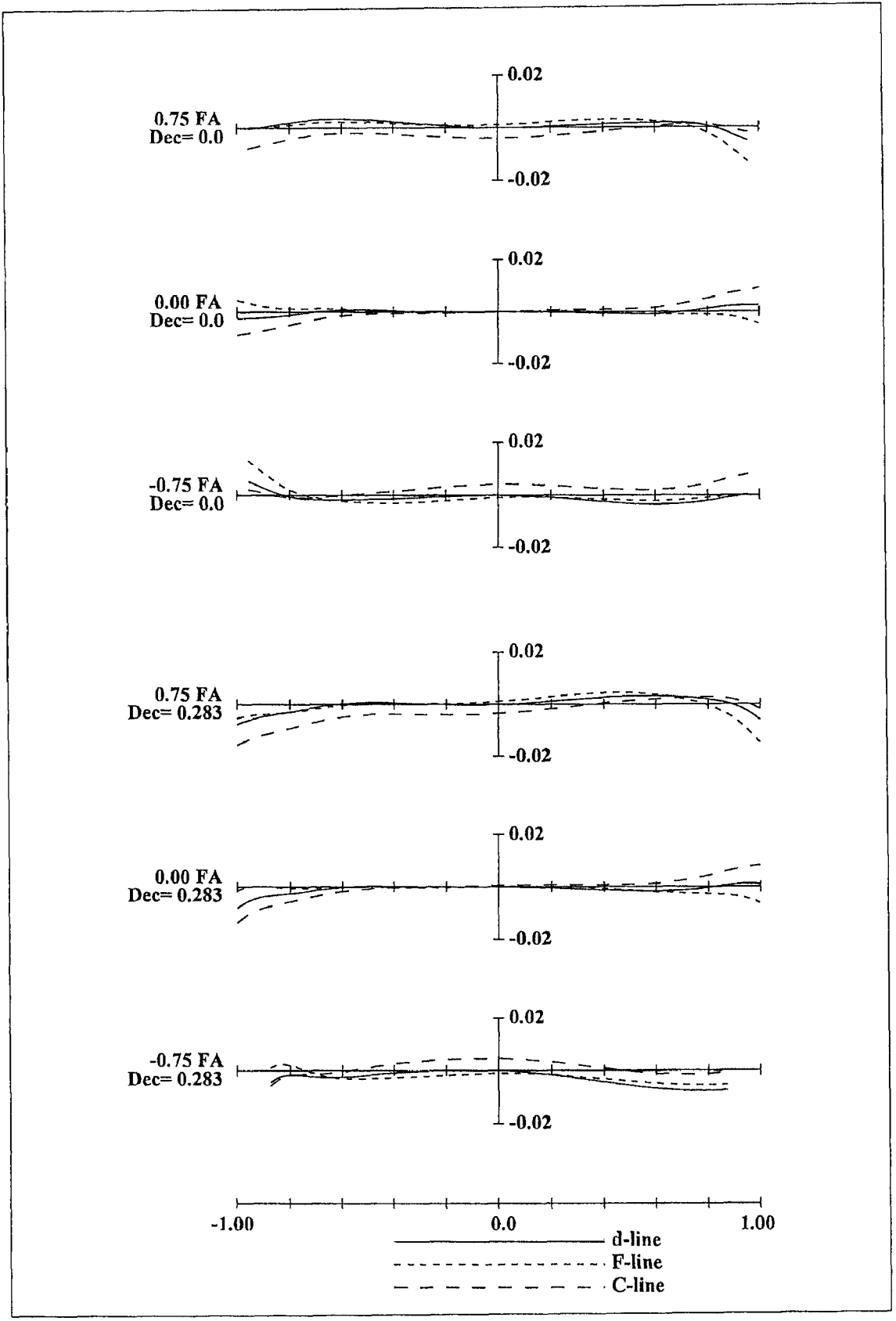
FIG. 21 is a lateral aberration diagram of a zoom lens system according to Example 7 at a telephoto limit in a basic state where image blur compensation is not performed and in a blur compensation state.

As shown in FIG. 19, in the zoom lens system according to Embodiment 7, the first lens unit G1, in order from the object side to the image side, comprises: a negative meniscus first lens element L1 with the convex surface facing the object side; a positive meniscus second lens element L2 with the convex surface facing the object side; a positive meniscus third lens element L3 with the convex surface facing the object side; and a positive meniscus fourth lens element L4 with the convex surface facing the object side. Among these, the first lens element L1 and the second lens element L2 are cemented with each other. In the surface data in the corresponding numerical example described later, surface number 2 indicates the cement layer between the first lens element L1 and the second lens element L2.

In the zoom lens system according to Embodiment 7, the second lens unit G2, in order from the object side to the image side, comprises: a negative meniscus fifth lens element L5 with the convex surface facing the object side; a bi-concave sixth lens element L6; and a bi-convex seventh lens element L7. Among these, the fifth lens element L5 has two aspheric surfaces.

In the zoom lens system according to Embodiment 7, the third lens unit G3, in order from the object side to the image side, comprises: a bi-convex eighth lens element L8; a bi-convex ninth lens element L9; a bi-concave tenth lens element L10; and a bi-convex eleventh lens element L11. Among these, the ninth lens element L9 and the tenth lens element L10 are cemented with each other. In the surface data in the corresponding numerical example described later, surface number 20 indicates the cement layer between the ninth lens element L9 and the tenth lens element L10. Further, the eighth lens element L8 has an aspheric object side surface.

In the zoom lens system according to Embodiment 7, the fourth lens unit G4, in order from the object side to the image side, comprises: a bi-convex twelfth lens element L12; and a negative meniscus thirteenth lens element L13 with the convex surface facing the image side. The twelfth lens element L12 and the thirteenth lens element L13 are cemented with each other. In the surface data in the corresponding numerical example described later, surface number 26 indicates the cement layer between the twelfth lens element L12 and the thirteenth lens element L13.

In the zoom lens system according to Embodiment 7, a plane parallel plate P is provided on the object side relative to the image surface S (between the image surface S and the thirteenth lens element L13).

In the zoom lens system according to Embodiment 7, in zooming from a wide-angle limit to a telephoto limit at the time of image taking, the first lens unit G1 moves to the object side. The second lens unit G2 moves to the image side with locus of a convex to the image side. The aperture diaphragm A moves to the object side. The third lens unit G3 moves to the object side. The fourth lens unit G4 moves to the object side with locus of a convex to the object side. That is, in zooming, the individual lens units are moved along the optical axis such that the interval between the first lens unit G1 and the second lens unit G2 should increase, that the interval between the second lens unit G2 and the aperture diaphragm A should decrease, that the interval between the aperture diaphragm A and the third lens unit G3 should decrease, and that the interval between the third lens unit G3 and the fourth lens unit G4 should increase.

On the other hand, in focusing from the infinity in-focus condition to the close-object in-focus condition, the fourth lens unit G4 moves to the object side along the optical axis.

Figure 22:
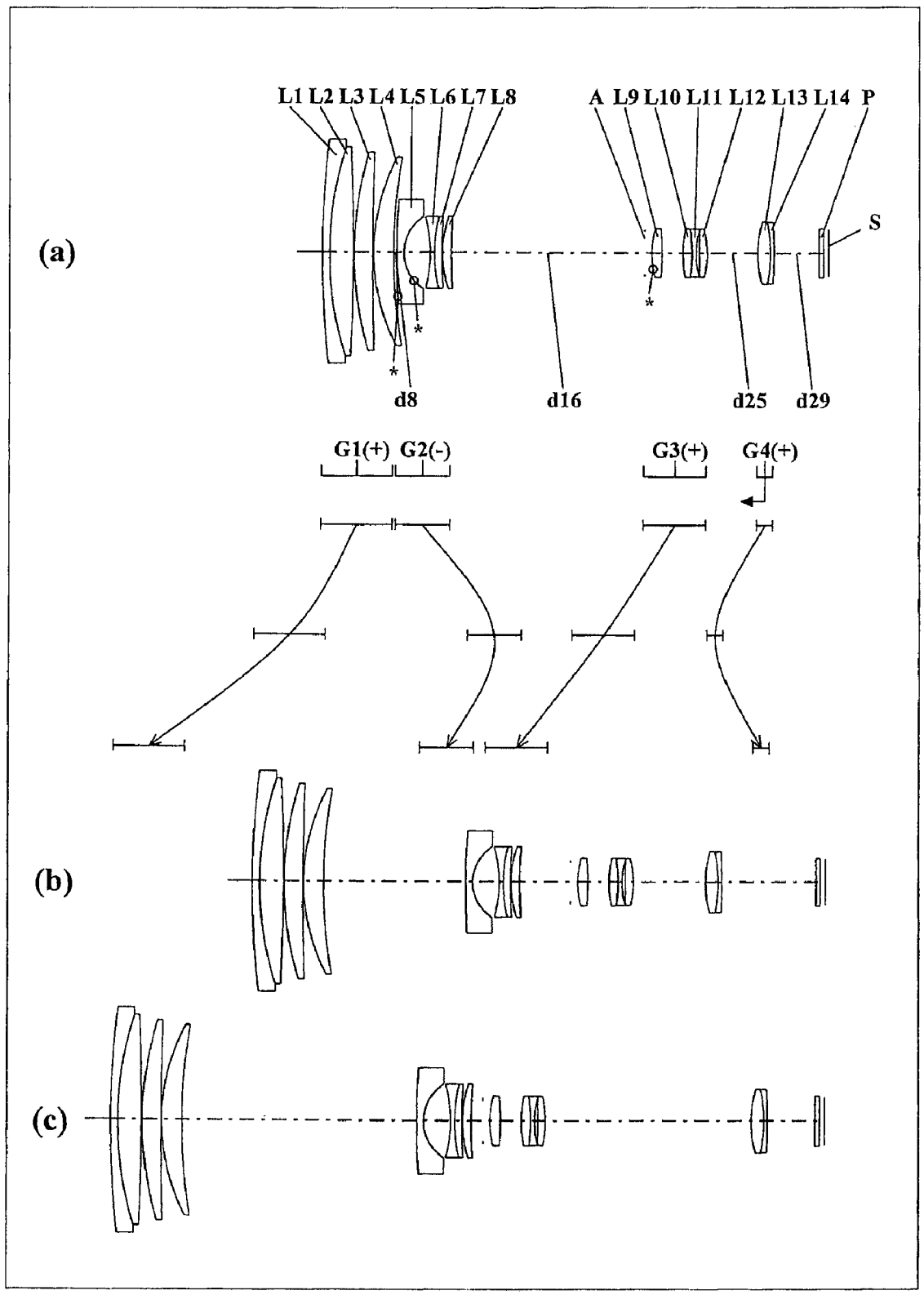
FIG. 22 is a lens arrangement diagram showing an infinity in-focus condition of a zoom lens system according to Embodiment 8 (Example 8)
Figure 23:
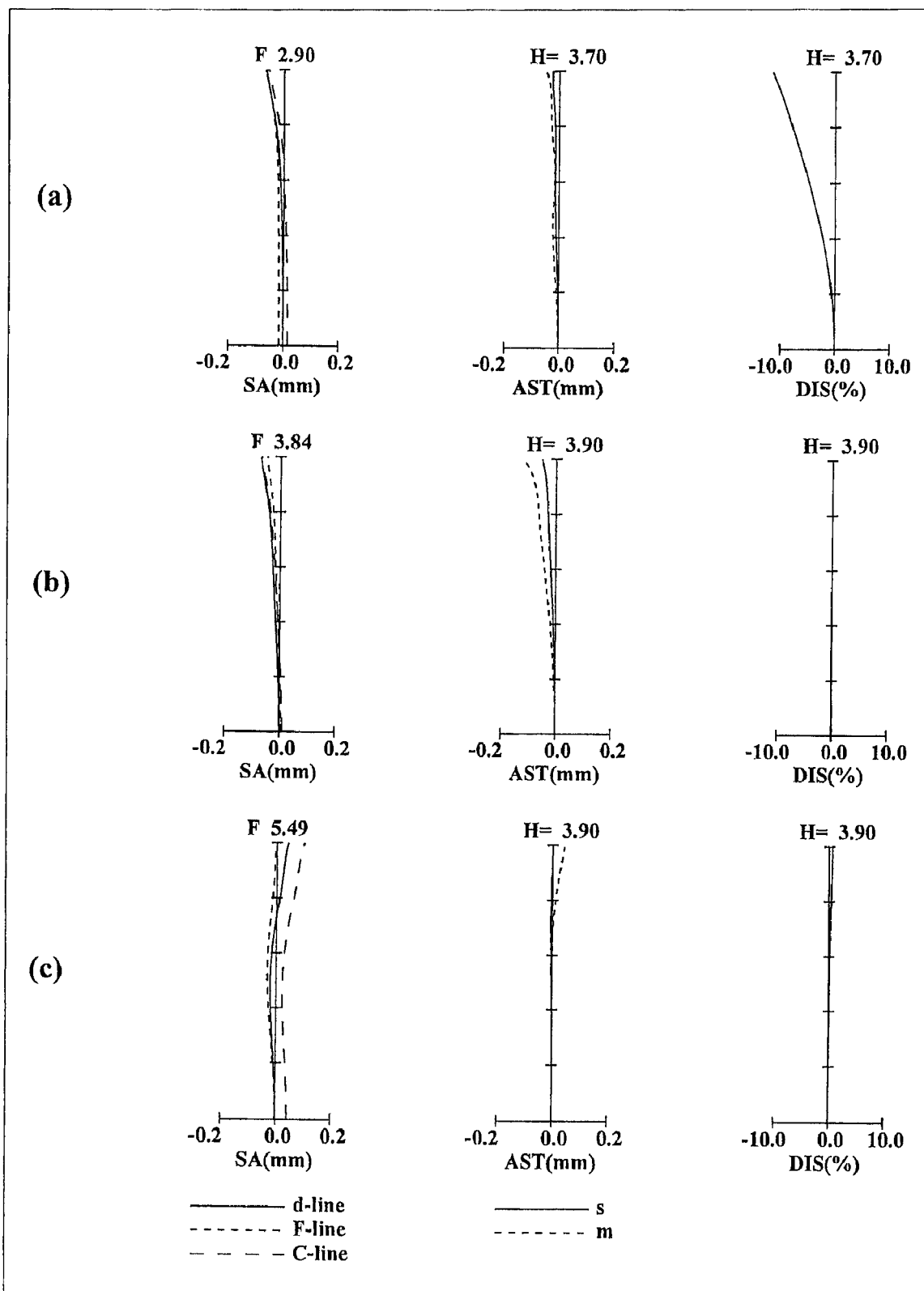
FIG. 23 is a longitudinal aberration diagram of an infinity in-focus condition of a zoom lens system according to Example 8.
Figure 24:
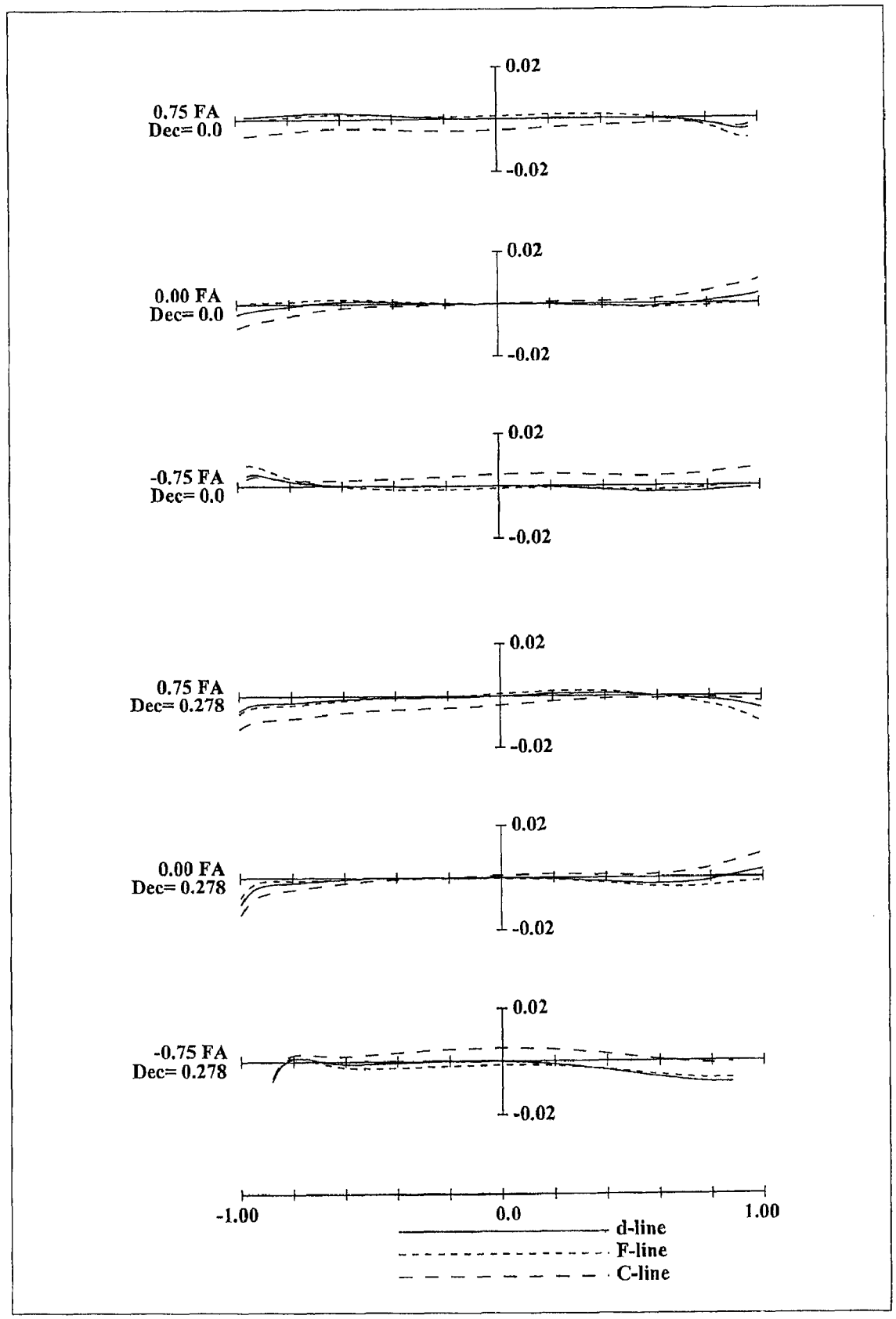
FIG. 24 is a lateral aberration diagram of a zoom lens system according to Example 8 at a telephoto limit in a basic state where image blur compensation is not performed and in a blur compensation state.

As shown in FIG. 22, in the zoom lens system according to Embodiment 8, the first lens unit G1, in order from the object side to the image side, comprises: a negative meniscus first lens element L1 with the convex surface facing the object side; a bi-convex second lens element L2; a positive meniscus third lens element L3 with the convex surface facing the object side; and a positive meniscus fourth lens element L4 with the convex surface facing the object side. Among these, the first lens element L1 and the second lens element L2 are cemented with each other. In the surface data in the corresponding numerical example described later, surface number 2 indicates the cement layer between the first lens element L1 and the second lens element L2.

In the zoom lens system according to Embodiment 8, the second lens unit G2, in order from the object side to the image side, comprises: a negative meniscus fifth lens element L5 with the convex surface facing the object side; a bi-concave sixth lens element L6; a positive meniscus seventh lens element L7 with the convex surface facing the object side; and a positive meniscus eighth lens element L8 with the convex surface facing the object side. Among these, the sixth lens element L6 and the seventh lens element L7 are cemented with each other. In the surface data in the corresponding numerical example described later, surface number 12 indicates the cement layer between the sixth lens element L6 and the seventh lens element L7. Further, the fifth lens element L5 has two aspheric surfaces.

In the zoom lens system according to Embodiment 8, the third lens unit G3, in order from the object side to the image side, comprises: a bi-convex ninth lens element L9; a bi-convex tenth lens element L10; a bi-concave eleventh lens element L11; and a bi-convex twelfth lens element L12. Among these, the tenth lens element L10 and the eleventh lens element L11 are cemented with each other. In the surface data in the corresponding numerical example described later, surface number 21 indicates the cement layer between the tenth lens element L10 and the eleventh lens element L11. Further, the ninth lens element L9 has an aspheric object side surface.

In the zoom lens system according to Embodiment 8, the fourth lens unit G4, in order from the object side to the image side, comprises: a bi-convex thirteenth lens element L13; and a negative meniscus fourteenth lens element L14 with the convex surface facing the image side. The thirteenth lens element L13 and the fourteenth lens element L14 are cemented with each other. In the surface data in the corresponding numerical example described later, surface number 27 indicates the cement layer between the thirteenth lens element L13 and the fourteenth lens element L14.

In the zoom lens system according to Embodiment 8, a plane parallel plate P is provided on the object side relative to the image surface S (between the image surface S and the fourteenth lens element L14).

In the zoom lens system according to Embodiment 8, in zooming from a wide-angle limit to a telephoto limit at the time of image taking, the first lens unit G1 moves to the object side. The second lens unit G2 moves to the image side with locus of a convex to the image side. The aperture diaphragm A and the third lens group G3 move to the object side integrally with each other. The fourth lens unit G4 moves to the object side with locus of a convex to the object side. That is, in zooming, the individual lens units are moved along the optical axis such that the interval between the first lens unit G1 and the second lens unit G2 should increase, that the interval between the second lens unit G2 and the third lens unit G3 should decrease, and that the interval between the third lens unit G3 and the fourth lens unit G4 should increase.

On the other hand, in focusing from the infinity in-focus condition to the close-object in-focus condition, the fourth lens unit G4 moves to the object side along the optical axis.

Figure 25:
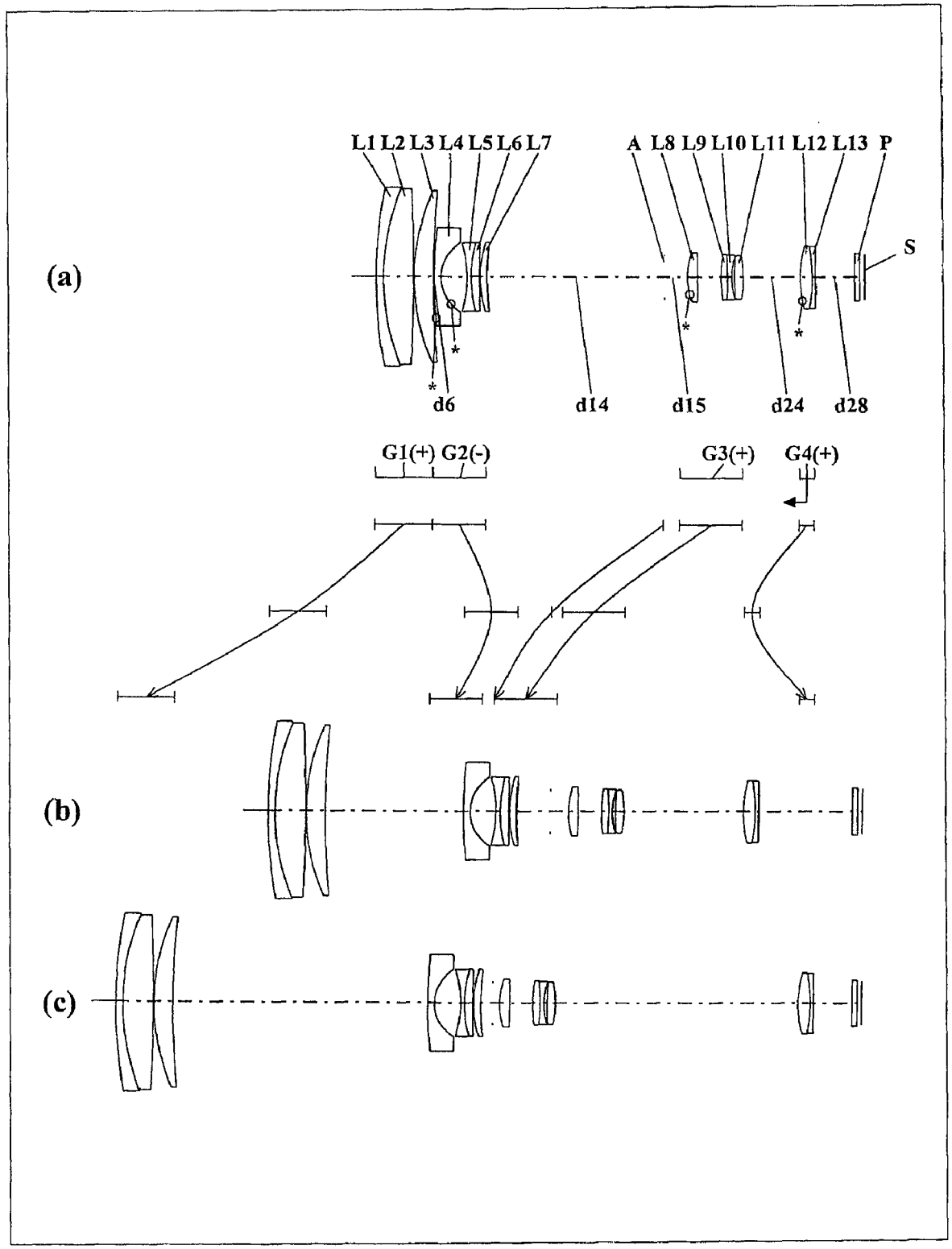
FIG. 25 is a lens arrangement diagram showing an infinity in-focus condition of a zoom lens system according to Embodiment 9 (Example 9)
Figure 26:
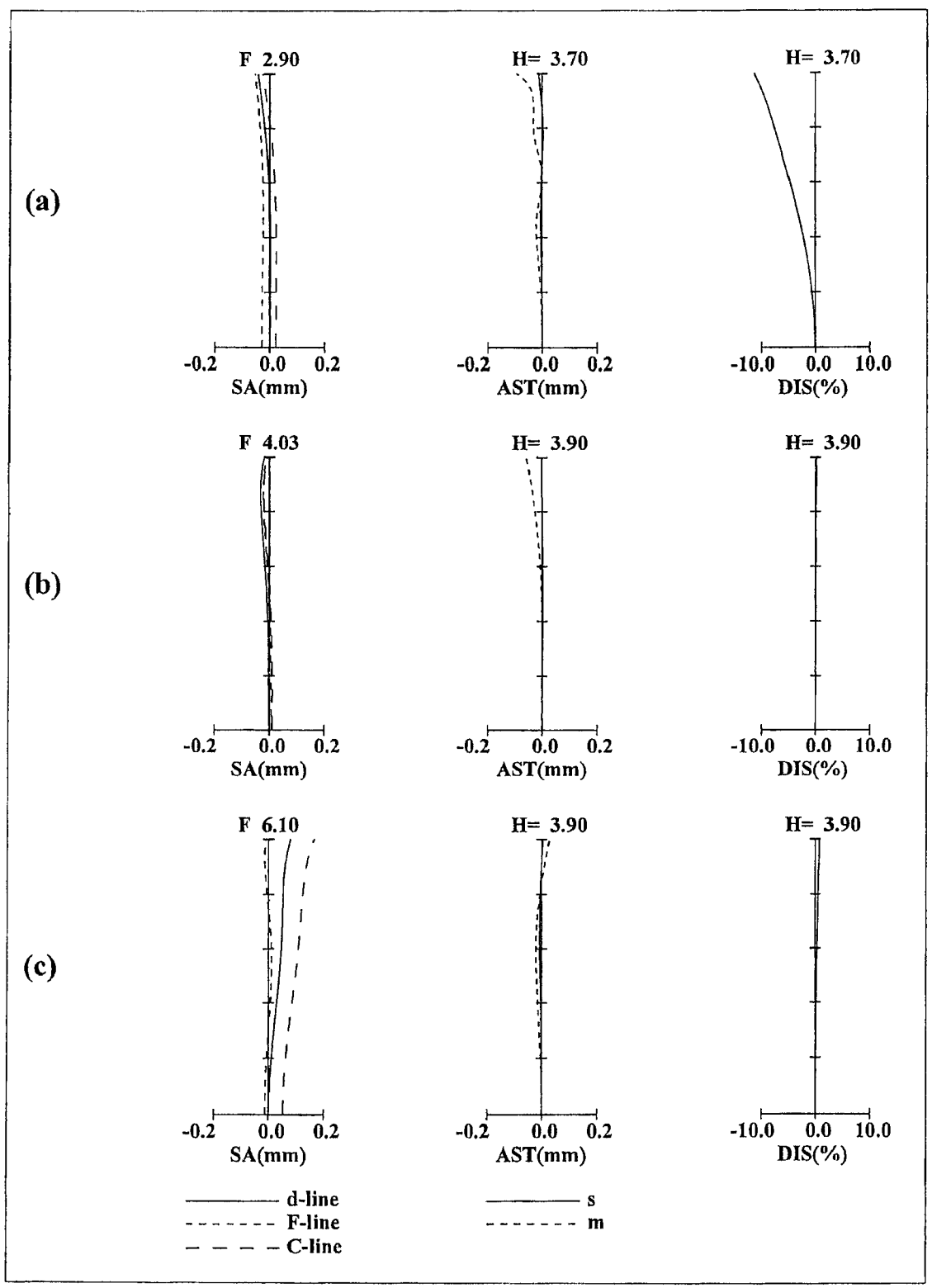
FIG. 26 is a longitudinal aberration diagram of an infinity in-focus condition of a zoom lens system according to Example 9.
Figure 27:
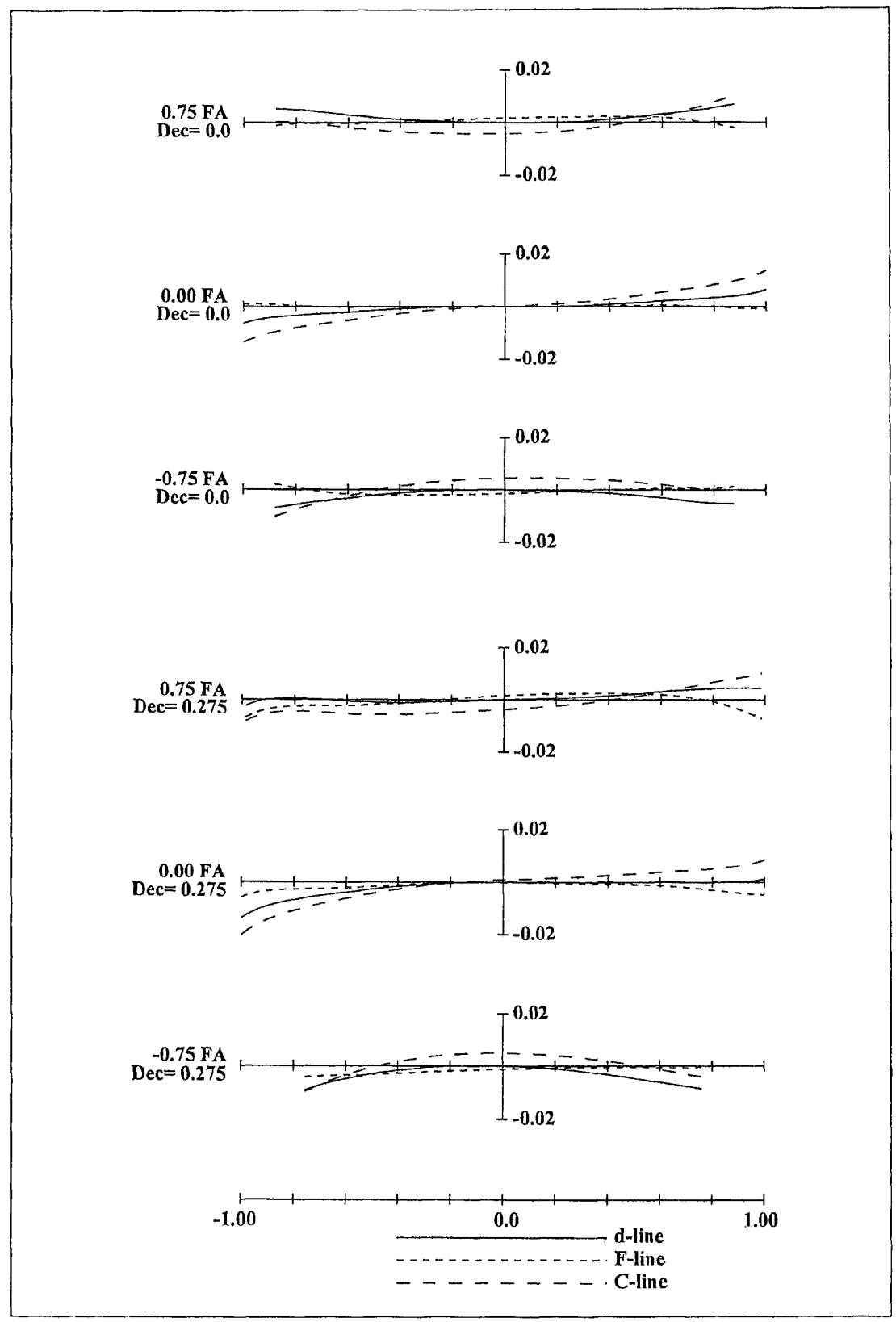
FIG. 27 is a lateral aberration diagram of a zoom lens system according to Example 9 at a telephoto limit in a basic state where image blur compensation is not performed and in a blur compensation state.

As shown in FIG. 25, in the zoom lens system according to Embodiment 9, the first lens unit G1, in order from the object side to the image side, comprises: a negative meniscus first lens element L1 with the convex surface facing the object side; a bi-convex second lens element L2; and a positive meniscus third lens element L3 with the convex surface facing the object side. Among these, the first lens element L1 and the second lens element L2 are cemented with each other. In the surface data in the corresponding numerical example described later, surface number 2 indicates the cement layer between the first lens element L1 and the second lens element L2.

In the zoom lens system according to Embodiment 9, the second lens unit G2, in order from the object side to the image side, comprises: a negative meniscus fourth lens element L4 with the convex surface facing the object side; a bi-concave fifth lens element L5; a positive meniscus sixth lens element L6 with the convex surface facing the object side; and a positive meniscus seventh lens element L7 with the convex surface facing the object side. Among these, the fifth lens element L5 and the sixth lens element L6 are cemented with each other. In the surface data in the corresponding numerical example described later, surface number 10 indicates the cement layer between the fifth lens element L5 and the sixth lens element L6. Further, the fourth lens element L4 has two aspheric surfaces.

In the zoom lens system according to Embodiment 9, the third lens unit G3, in order from the object side to the image side, comprises: a bi-convex eighth lens element L8; a bi-convex ninth lens element L9; a bi-concave tenth lens element L10; and a bi-convex eleventh lens element L11. Among these, the ninth lens element L9 and the tenth lens element L10 are cemented with each other. In the surface data in the corresponding numerical example described later, surface number 20 indicates the cement layer between the ninth lens element L9 and the tenth lens element L10. Further, the eighth lens element L8 has an aspheric object side surface.

In the zoom lens system according to Embodiment 9, the fourth lens unit G4, in order from the object side to the image side, comprises: a bi-convex twelfth lens element L12; and a negative meniscus thirteenth lens element L13 with the convex surface facing the image side. The twelfth lens element L12 and the thirteenth lens element L13 are cemented with each other. In the surface data in the corresponding numerical example described later, surface number 26 indicates the cement layer between the twelfth lens element L12 and the thirteenth lens element L13. Further, the twelfth lens element L12 has an aspheric object side surface.

In the zoom lens system according to Embodiment 9, a plane parallel plate P is provided on the object side relative to the image surface S (between the image surface S and the thirteenth lens element L13).

In the zoom lens system according to Embodiment 9, in zooming from a wide-angle limit to a telephoto limit at the time of image taking, the first lens unit G1 moves to the object side. The second lens unit G2 moves to the image side with locus of a convex to the image side. The aperture diaphragm A moves to the object side. The third lens unit G3 moves to the object side. The fourth lens unit G4 moves to the image side with locus of a convex to the object side. That is, in zooming, the individual lens units are moved along the optical axis such that the interval between the first lens unit G1 and the second lens unit G2 should increase, that the interval between the second lens unit G2 and the aperture diaphragm A should decrease, that the interval between the aperture diaphragm A and the third lens unit G3 should decrease, and that the interval between the third lens unit G3 and the fourth lens unit G4 should increase.

On the other hand, in focusing from the infinity in-focus condition to the close-object in-focus condition, the fourth lens unit G4 moves to the object side along the optical axis.

Figure 28:
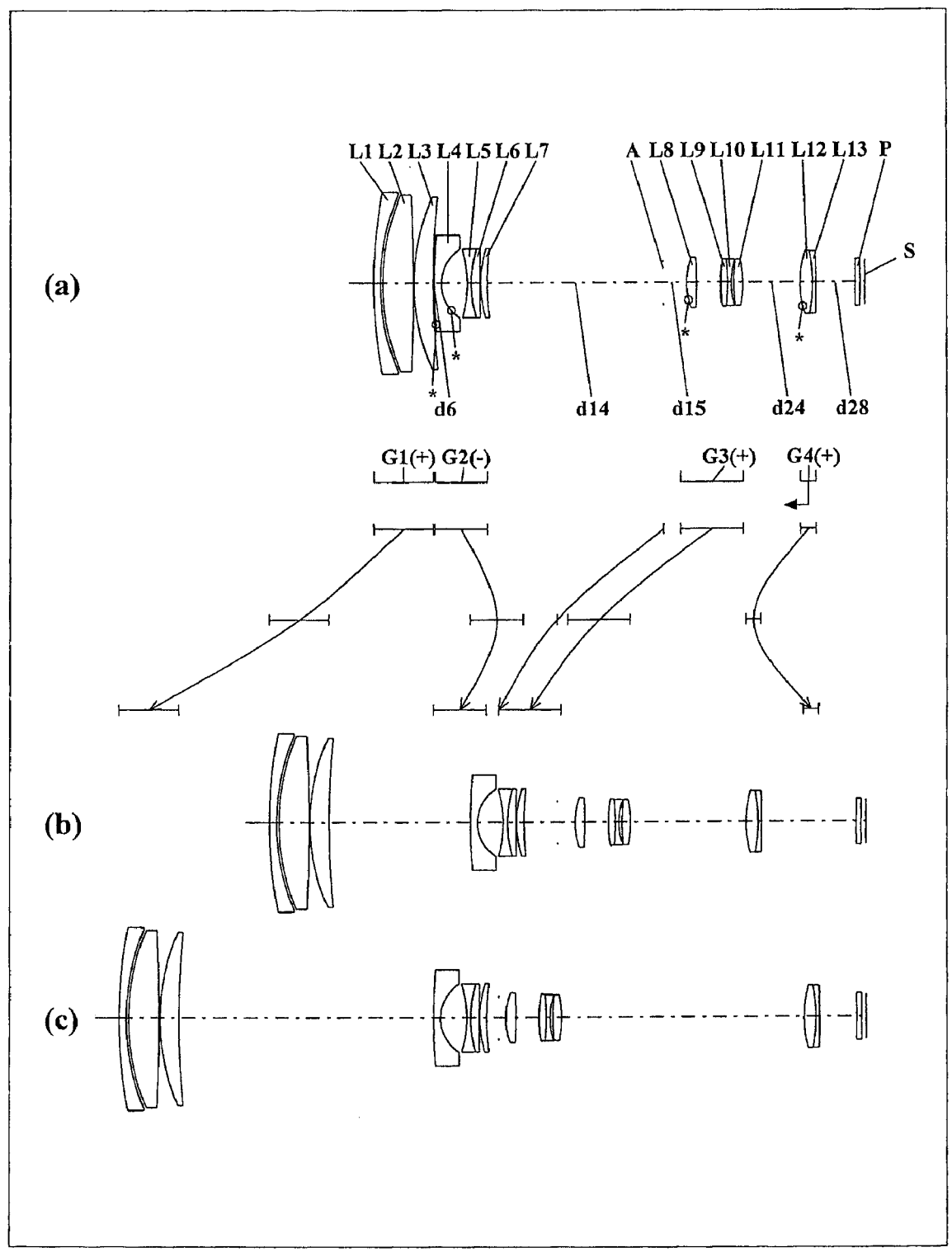
FIG. 28 is a lens arrangement diagram showing an infinity in-focus condition of a zoom lens system according to Embodiment 10 (Example 10)
Figure 29:
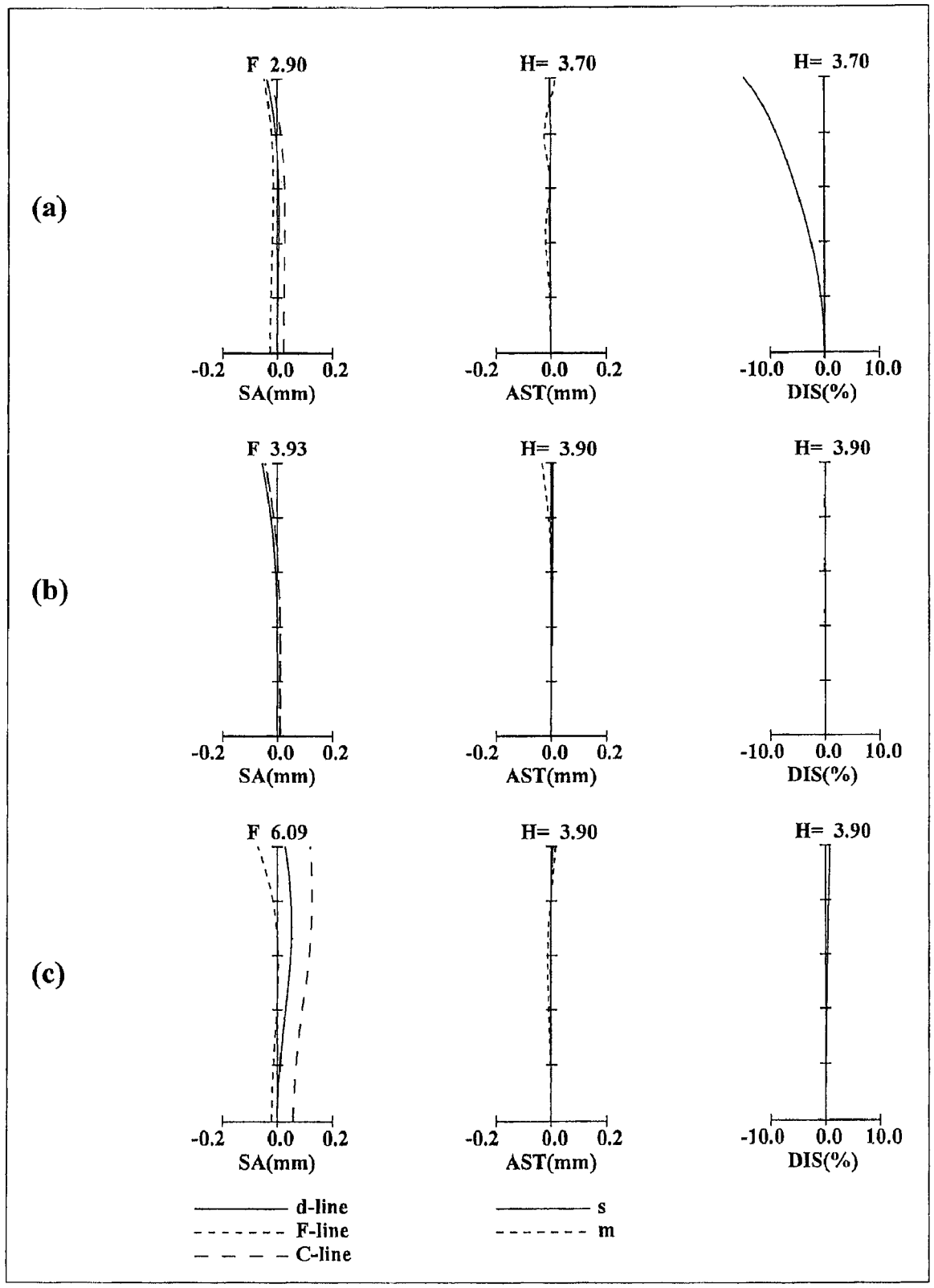
FIG. 29 is a longitudinal aberration diagram of an infinity in-focus condition of a zoom lens system according to Example 10.
Figure 30:
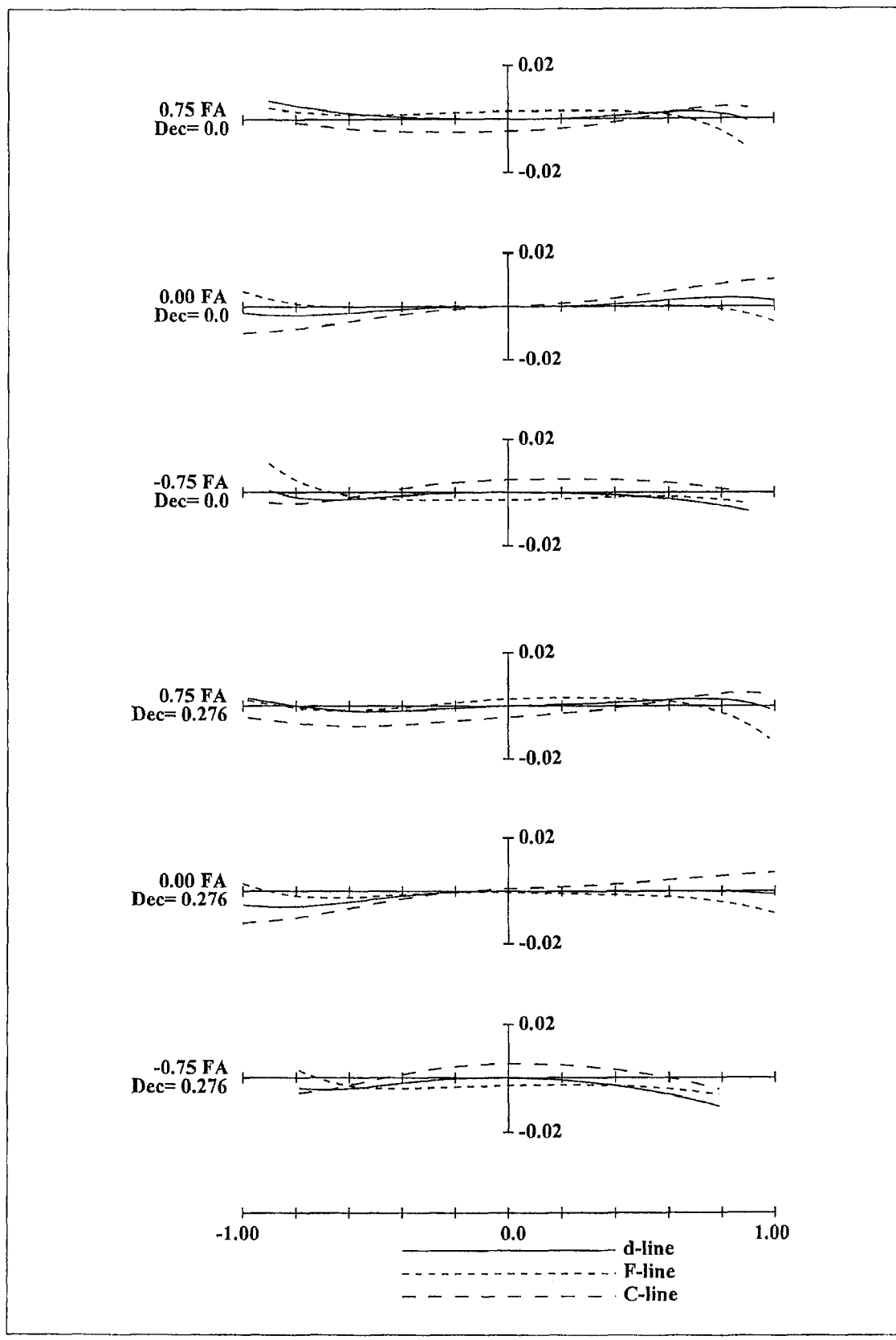
FIG. 30 is a lateral aberration diagram of a zoom lens system according to Example 10 at a telephoto limit in a basic state where image blur compensation is not performed and in a blur compensation state.

As shown in FIG. 28, in the zoom lens system according to Embodiment 10, the first lens unit G1, in order from the object side to the image side, comprises: a negative meniscus first lens element L1 with the convex surface facing the object side; a bi-convex second lens element L2; and a positive meniscus third lens element L3 with the convex surface facing the object side.

In the zoom lens system according to Embodiment 10, the second lens unit G2, in order from the object side to the image side, comprises: a negative meniscus fourth lens element L4 with the convex surface facing the object side; a bi-concave fifth lens element L5; a positive meniscus sixth lens element L6 with the convex surface facing the object side; and a positive meniscus seventh lens element L7 with the convex surface facing the object side. Among these, the fifth lens element L5 and the sixth lens element L6 are cemented with each other. In the surface data in the corresponding numerical example described later, surface number 10 indicates the cement layer between the fifth lens element L5 and the sixth lens element L6. Further, the fourth lens element L4 has two aspheric surfaces.

In the zoom lens system according to Embodiment 10, the third lens unit G3, in order from the object side to the image side, comprises: a bi-convex eighth lens element L8; a bi-convex ninth lens element L9; a bi-concave tenth lens element L10; and a bi-convex eleventh lens element L11. Among these, the ninth lens element L9 and the tenth lens element L10 are cemented with each other. In the surface data in the corresponding numerical example described later, surface number 20 indicates the cement layer between the ninth lens element L9 and the tenth lens element L10. Further, the eighth lens element L8 has an aspheric object side surface.

In the zoom lens system according to Embodiment 10, the fourth lens unit G4, in order from the object side to the image side, comprises: a bi-convex twelfth lens element L12; and a negative meniscus thirteenth lens element L13 with the convex surface facing the image side. The twelfth lens element L12 and the thirteenth lens element L13 are cemented with each other. In the surface data in the corresponding numerical example described later, surface number 26 indicates the cement layer between the twelfth lens element L12 and the thirteenth lens element L13. Further, the twelfth lens element L12 has an aspheric object side surface.

In the zoom lens system according to Embodiment 10, a plane parallel plate P is provided on the object side relative to the image surface S (between the image surface S and the thirteenth lens element L13).

In the zoom lens system according to Embodiment 10, in zooming from a wide-angle limit to a telephoto limit at the time of image taking, the first lens unit G1 moves to the object side. The second lens unit G2 moves to the image side with locus of a convex to the image side. The aperture diaphragm A moves to the object side. The third lens unit G3 moves to the object side. The fourth lens unit G4 moves to the image side with locus of a convex to the object side. That is, in zooming, the individual lens units are moved along the optical axis such that the interval between the first lens unit G1 and the second lens unit G2 should increase, that the interval between the second lens unit G2 and the aperture diaphragm A should decrease, that the interval between the aperture diaphragm A and the third lens unit G3 should decrease, and that the interval between the third lens unit G3 and the fourth lens unit G4 should increase.

On the other hand, in focusing from the infinity in-focus condition to the close-object in-focus condition, the fourth lens unit G4 moves to the object side along the optical axis.

Figure 31:
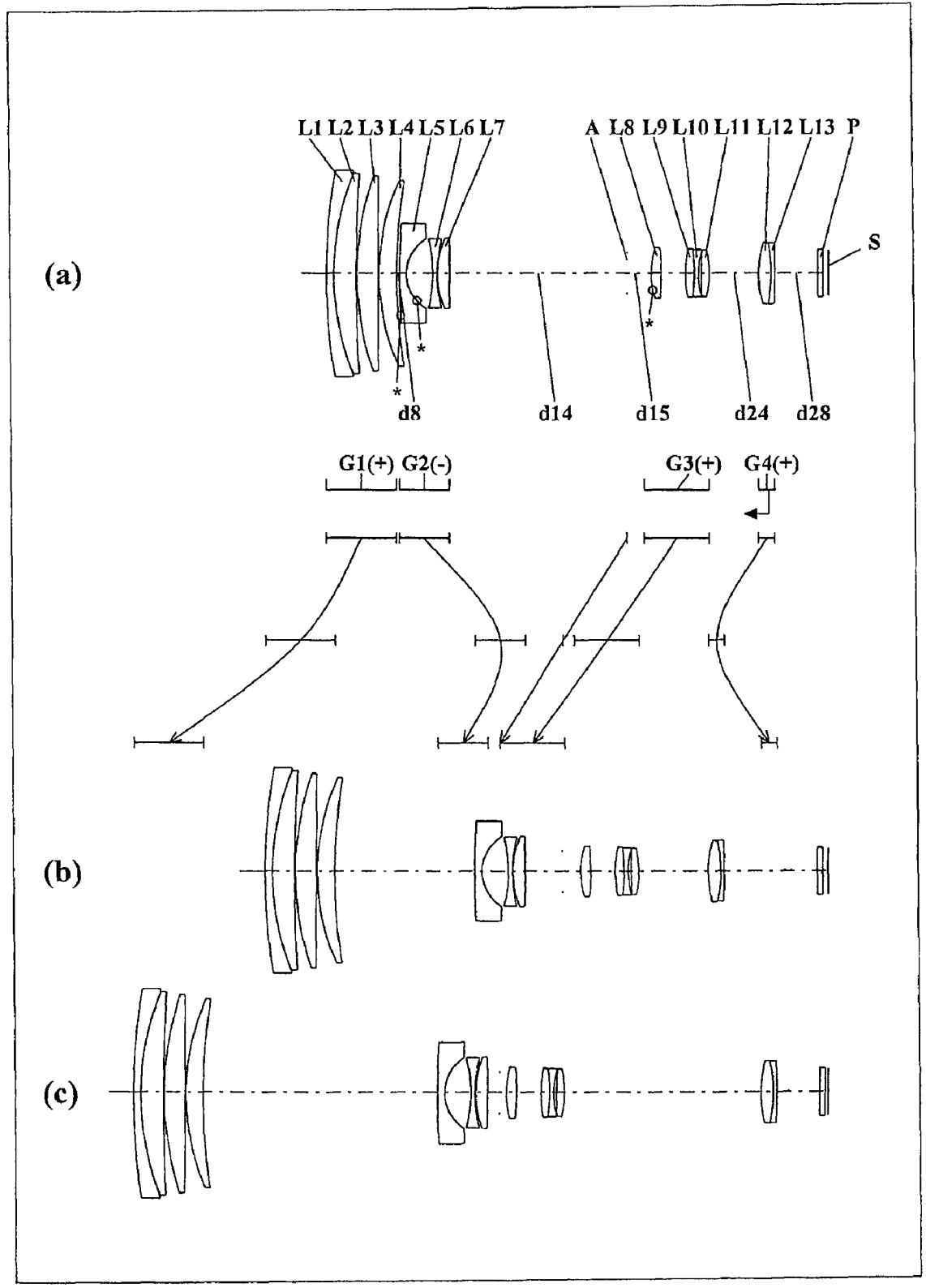
FIG. 31 is a lens arrangement diagram showing an infinity in-focus condition of a zoom lens system according to Embodiment 11 (Example 11)
Figure 32:
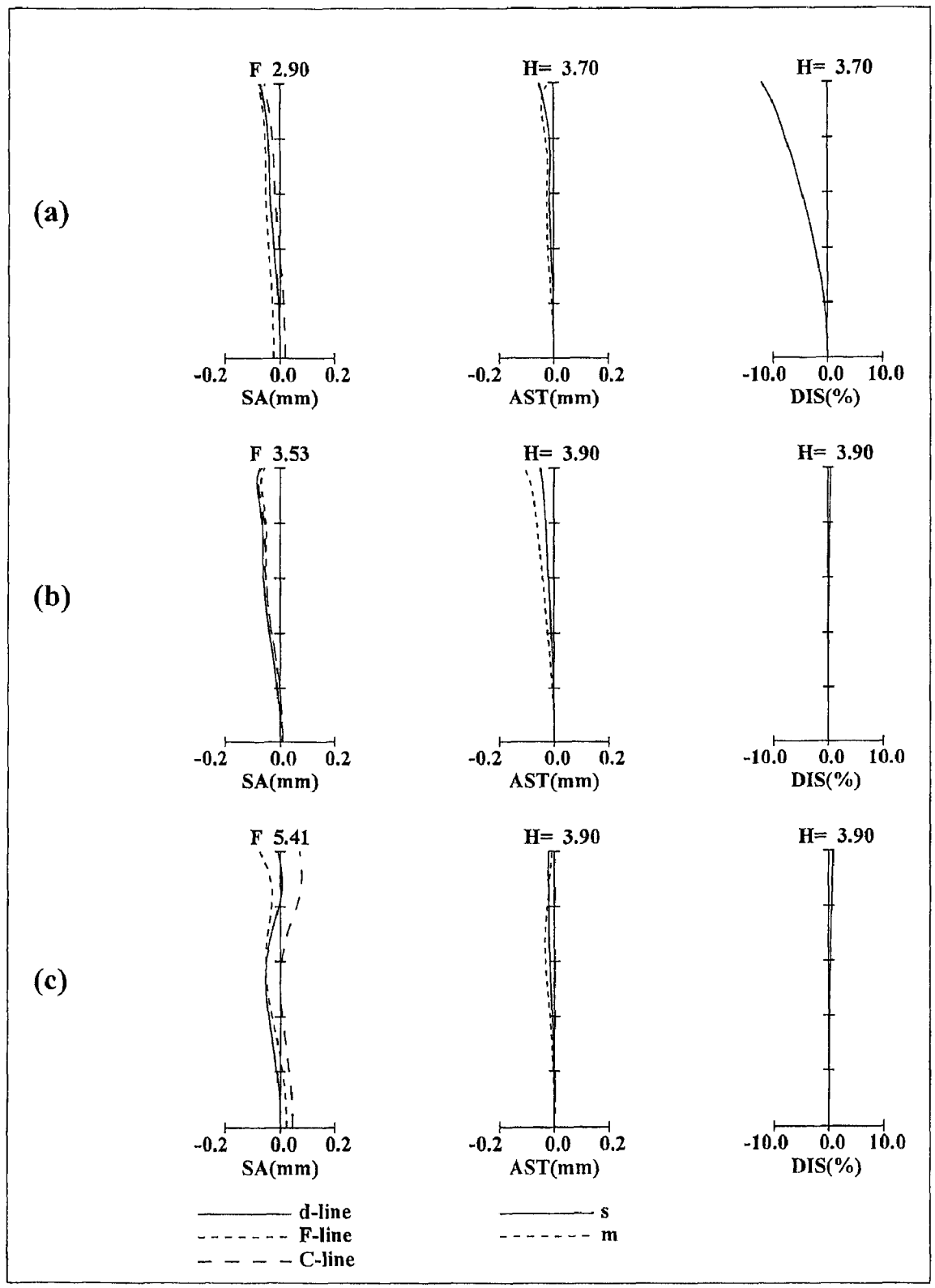
FIG. 32 is a longitudinal aberration diagram of an infinity in-focus condition of a zoom lens system according to Example 11.
Figure 33:
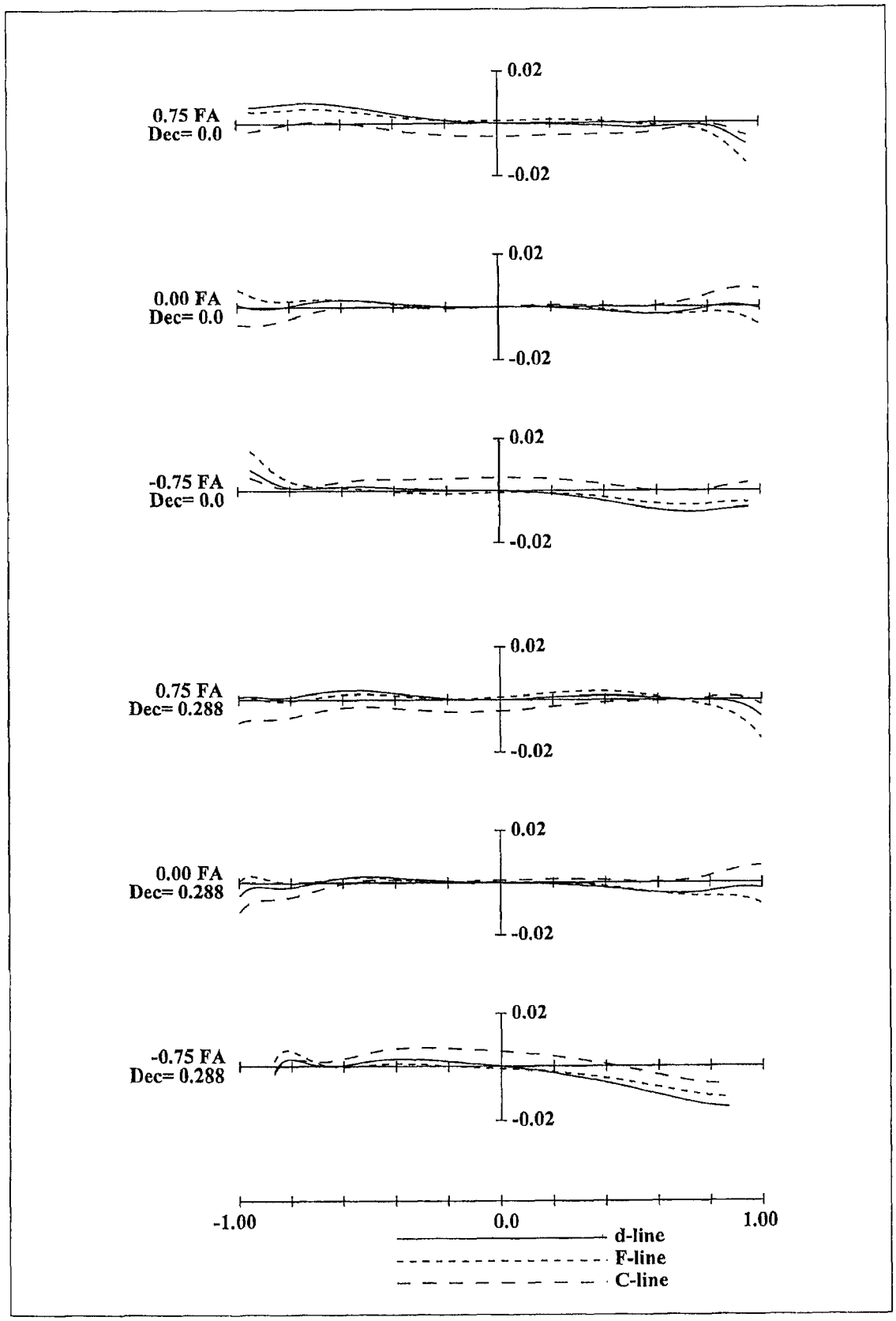
FIG. 33 is a lateral aberration diagram of a zoom lens system according to Example 11 at a telephoto limit in a basic state where image blur compensation is not performed and in a blur compensation state.

As shown in FIG. 31, in the zoom lens system according to Embodiment 11, the first lens unit G1, in order from the object side to the image side, comprises: a negative meniscus first lens element L1 with the convex surface facing the object side; a bi-convex second lens element L2; a positive meniscus third lens element L3 with the convex surface facing the object side; and a positive meniscus fourth lens element L4 with the convex surface facing the object side. Among these, the first lens element L1 and the second lens element L2 are cemented with each other. In the surface data in the corresponding numerical example described later, surface number 2 indicates the cement layer between the first lens element L1 and the second lens element L2.

In the zoom lens system according to Embodiment 11, the second lens unit G2, in order from the object side to the image side, comprises: a negative meniscus fifth lens element L5 with the convex surface facing the object side; a bi-concave sixth lens element L6; and a bi-convex seventh lens element L7. Among these, the fifth lens element L5 has two aspheric surfaces.

In the zoom lens system according to Embodiment 11, the third lens unit G3, in order from the object side to the image side, comprises: a bi-convex eighth lens element L8; a bi-convex ninth lens element L9; a bi-concave tenth lens element L10; and a bi-convex eleventh lens element L11. Among these, the ninth lens element L9 and the tenth lens element L10 are cemented with each other. In the surface data in the corresponding numerical example described later, surface number 20 indicates the cement layer between the ninth lens element L9 and the tenth lens element L10. Further, the eighth lens element L8 has an aspheric object side surface.

In the zoom lens system according to Embodiment 11, the fourth lens unit G4, in order from the object side to the image side, comprises: a bi-convex twelfth lens element L12; and a negative meniscus thirteenth lens element L13 with the convex surface facing the image side. The twelfth lens element L12 and the thirteenth lens element L13 are cemented with each other. In the surface data in the corresponding numerical example described later, surface number 26 indicates the cement layer between the twelfth lens element L12 and the thirteenth lens element L13.

In the zoom lens system according to Embodiment 11, a plane parallel plate P is provided on the object side relative to the image surface S (between the image surface S and the thirteenth lens element L13).

In the zoom lens system according to Embodiment 11, in zooming from a wide-angle limit to a telephoto limit at the time of image taking, the first lens unit G1 moves to the object side. The second lens unit G2 moves to the image side with locus of a convex to the image side. The aperture diaphragm A moves to the object side. The third lens group G3 moves to the object side. The fourth lens unit G4 moves to the object side with locus of a convex to the object side. That is, in zooming, the individual lens units are moved along the optical axis such that the interval between the first lens unit G1 and the second lens unit G2 should increase, that the interval between the second lens unit G2 and the aperture diaphragm A should decrease, that the interval between the aperture diaphragm A and the third lens unit G3 should decrease, and that the interval between the third lens unit G3 and the fourth lens unit G4 should increase.

On the other hand, in focusing from the infinity in-focus condition to the close-object in-focus condition, the fourth lens unit G4 moves to the object side along the optical axis.

In the zoom lens system according to Embodiments 1 to 8 and 11, the first lens unit G1, in order from the object side to the image side, comprises a lens element having negative optical power, a lens element having positive optical power, a lens element having positive optical power, and a lens element having positive optical power. Therefore, it is possible to realize a very high variable magnification ratio while favorably compensating various aberrations, particularly, chromatic aberration at a telephoto limit.

In the zoom lens system according to Embodiments 1 to 6 and 8 to 10, the second lens unit G2, in order from the object side to the image side, comprises a lens element having negative optical power, a lens element having negative optical power, a lens element having positive optical power, and a lens element having positive optical power. Therefore, it is possible to realize a very high variable magnification ratio while favorably compensating various aberrations, particularly, coma aberration at a wide-angle limit. Further, since two lens elements having positive optical power are used, the positive optical power can be reduced, and thus manufacturing sensitivity which is caused by deviation of the interval between the two lens elements having positive optical power can be reduced.

In the zoom lens system according to Embodiments 1 to 11, the third lens unit G3, in order from the object side to the image side, comprises a lens element having positive optical power, a lens element having positive optical power, a lens element having negative optical power, and a lens element having positive optical power. In addition, the optical power at each lens surface is weak, and hence an angle formed between the light beam incident on each lens surface and the normal line of the lens surface is decreased. Therefore, although the magnification ratio is very high, aberration variation at the time of magnification change, particularly spherical aberration and coma aberration, can be favorably suppressed, and thus high optical performance can be achieved over the entire zoom range. Furthermore, since the interval between the two lens elements having positive optical power is long, various aberrations, particularly spherical aberration, can be favorably compensated, and thus high optical performance can be achieved over the entire zoom range while having a very high variable magnification ratio.

In the zoom lens system according to Embodiments 1 to 11, any one of the lens units constituting the zoom lens system or a sub lens unit consisting of a part of each lens unit is moved in a direction perpendicular to the optical axis, whereby image point movement caused by vibration of the entire system can be compensated, that is, image blur caused by hand blurring, vibration and the like can be compensated optically.

When image point movement caused by vibration of the entire system is to be compensated, for example, the third lens unit G3 is moved in a direction perpendicular to the optical axis. Thereby, image blur is compensated in a state that size increase in the entire zoom lens system is suppressed to realize a compact construction and that excellent imaging characteristics such as small decentering coma aberration and small decentering astigmatism are satisfied.

Here, in a case that a lens unit is composed of a plurality of lens elements, the above-mentioned sub lens unit consisting of a part of a lens unit indicates any one lens element or alternatively a plurality of adjacent lens elements among the plurality of lens elements.

The following description is given for conditions preferred to be satisfied by a zoom lens system like the zoom lens system according to Embodiments 1 to 11. Here, a plurality of preferable conditions are set forth for the zoom lens system according to each embodiment. A construction that satisfies all the plural conditions is most desirable for the zoom lens system. However, when an individual condition is satisfied, a zoom lens system having the corresponding effect is obtained.

Among the zoom lens systems according to Embodiments 1 to 11, in a zoom lens system that, in order from the object side to the image side, comprises a first lens unit having positive optical power and comprising four lens elements, a second lens unit having negative optical power, and a third lens unit having positive optical power, wherein at least the first lens unit is moved along the optical axis during zooming from a wide-angle limit to a telephoto limit at the time of image taking so as to achieve variable magnification (this lens configuration is referred to as basic configuration I of the embodiment, hereinafter), it is preferable that the following conditions (1) and (a-1) are satisfied.

$$0.30 < f_1/f_T < 0.70 \tag{1}$$

$$Z = f_T/f_W > 20.5 \tag{a-1}$$

where,
$f_1$ is a composite focal length of the first lens unit,
$f_W$ is a focal length of the entire system at a wide-angle limit, and
$f_T$ is a focal length of the entire system at a telephoto limit.

Among the zoom lens systems according to Embodiments 1 to 11, in a zoom lens system that, in order from the object side to the image side, comprises a first lens unit having positive optical power, a second lens unit having negative optical power and comprising two lens elements having positive optical power and two lens elements having negative optical power, and a third lens unit having positive optical power, wherein at least the first lens unit is moved along the optical axis during zooming from a wide-angle limit to a telephoto limit at the time of image taking so as to achieve variable magnification (this lens configuration is referred to as basic configuration II of the embodiment, hereinafter), it is preferable that the following conditions (1) and (a-2) are satisfied.

$$0.30 < f_1/f_T < 0.70 \tag{1}$$

$$Z = f_T/f_W > 10.0 \tag{a-2}$$

where,
$f_1$ is a composite focal length of the first lens unit,
$f_W$ is a focal length of the entire system at a wide-angle limit, and
$f_T$ is a focal length of the entire system at a telephoto limit.

The condition (1) sets forth the ratio between the focal length of the first lens unit and the focal length of the entire system at a telephoto limit. When the value goes below the lower limit of the condition (1), the focal length of the first lens unit becomes excessively short, and aberration variation at the time of magnification change is increased, which causes difficulty in compensating the various aberrations. Further, the diameter of the first lens unit is increased, which causes difficulty in providing compact lens barrel, imaging device, and camera. Further, the error sensitivity with respect to the inclination of the first lens unit becomes excessively high, which may cause difficulty in assembling the optical system. When the value exceeds the upper limit of the condition (1), the focal length of the first lens unit become excessively long, and the amount of movement of the first lens unit, which is necessary for achieving a high magnification, becomes excessively large. This causes difficulty in providing compact lens barrel, imaging device, and camera.

In the zoom lens system having the basic configuration I or II, when at least one of the following conditions (1)' and (1)" is satisfied, the above-mentioned effect is achieved more successfully.

$$0.35 < f_1/f_T \tag{1}'$$

$$f_1/f_T < 0.60 \tag{1}''$$

In the zoom lens system having the basic configuration II, it is more preferable that the above-mentioned conditions (1), (1)', and (1)" are satisfied in the following condition (a-2)'.

$$Z = f_T/f_W > 20.5 \tag{a-2}'$$

Among the zoom lens systems according to Embodiments 1 to 11, in a zoom lens system that, in order from the object side to the image side, comprises a first lens unit having positive optical power, a second lens unit having negative optical power, and a third lens unit having positive optical power, wherein at least the first lens unit is moved along the optical axis during zooming from a wide-angle limit to a telephoto limit at the time of image taking so as to achieve variable magnification (this lens configuration is referred to as basic configuration III of the embodiment, hereinafter), it is preferable that the following conditions (2) and (a-3) are satisfied.

$$R_3/Ir > 3.0 \tag{2}$$

$$Z = f_T/f_W > 18.0 \tag{a-3}$$

where,
$R_3$ is a minimum value of an absolute value of a curvature radius of a lens surface included in the third lens unit,
Ir is a value represented by the following equation:

$$Ir = f_T \times \tan(\omega_T),$$

$f_W$ is a focal length of the entire system at a wide-angle limit,
$f_T$ is a focal length of the entire system at a telephoto limit, and
$\omega_T$ is a half value (°) of a maximum view angle at a telephoto limit.

The condition (2) sets forth the ratio between the minimum value of the absolute value of the curvature radius of the lens surface included in the third lens unit, and the maximum image height. When the condition (2) is not satisfied, the minimum value of the absolute value of the curvature radius of the lens surface included in the third lens unit becomes small, and an angle formed between the light beam incident on each lens surface and the normal line of the lens surface is increased, which causes difficulty in favorably suppressing spherical aberration and coma aberration. As a result, aberration variation at the time of magnification change is increased, which causes difficulty in achieving favorable performance over the entire zoom range.

When the following condition (2)' is satisfied, the above-mentioned effect is achieved more successfully.

$$R_3/Ir > 3.3 \tag{2}'$$

Further, it is more preferable that the above-mentioned conditions (2) and (2)' are satisfied in the following condition (a-3)'.

$$Z = f_T/f_W > 20.5 \tag{a-3}'$$

Among the zoom lens systems according to Embodiments 1 to 11, a zoom lens system having the basic configuration III preferably satisfies the following conditions (3) and (a-3).

$$D_3/Ir > 0.93 \tag{3}$$

$$Z = f_T/f_W > 18.0 \tag{a-3}$$

where,
$D_3$ is a maximum value of an air space in the third lens unit,
Ir is a value represented by the following equation:

$$Ir = f_T \times \tan(\omega_T),$$

$f_W$ is a focal length of the entire system at a wide-angle limit,
$f_T$ is a focal length of the entire system at a telephoto limit, and
$\omega_T$ is a half value (°) of a maximum view angle at a telephoto limit.

The condition (3) sets forth the ratio between the maximum value of the air space in the third lens unit, and the maximum image height. When the condition (3) is not satisfied, the maximum value of the air space in the third lens unit becomes small. This causes difficulty in favorably compensating various aberrations, particularly aspheric aberration, resulting in difficulty in achieving favorable performance over the entire zoom range.

When the following condition (3)' is satisfied, the above-mentioned effect is achieved more successfully.

$$D_3/Ir > 1.00 \tag{3}'$$

Further, it is more preferable that the above-mentioned conditions (3) and (3)' are satisfied in the following condition (a-3)'.

$$Z = f_T/f_W > 20.5 \tag{a-3}'$$

Among the zoom lens systems according to Embodiments 1 to 11, in a zoom lens system that, in order from the object side to the image side, comprises a first lens unit having positive optical power and comprising four lens elements, a second lens unit having negative optical power and comprising four or less lens elements, and a third lens unit having positive optical power, wherein the first lens unit includes at least one cemented lens element, and at least the first lens unit is moved along the optical axis during zooming from a wide-angle limit to a telephoto limit at the time of image taking so as to achieve variable magnification (this lens configuration is referred to as basic configuration IV of the embodiment, hereinafter), it is preferable that the following conditions (4), (a-3) and (b) are satisfied.

$$-0.0016 \times vd_{12} + 0.66 - PgF_{12} > 0.0 \tag{4}$$

$$Z = f_T/f_W > 18.0 \tag{a-3}$$

$$\omega_W > 32 \tag{b}$$

where,
$vd_{12}$ is an Abbe number of a most image side lens element constituting the cemented lens element in the first lens unit,
$PgF_{12}$ is a partial dispersion ratio of the most image side lens element constituting the cemented lens element in the first lens unit, represented by the following equation:

$$PgF_{12} = (ng - nF)/(nF - nC),$$

ng is a refractive index to the g-line,
nF is a refractive index to the F-line,
nC is a refractive index to the C-line,
$f_W$ is a focal length of the entire system at a wide-angle limit,
$f_T$ is a focal length of the entire system at a telephoto limit, and
$\omega_W$ is a half value (°) of a maximum view angle at a wide-angle limit.

The condition (4) sets forth the relation between the Abbe number of the most image side lens element constituting the cemented lens element in the first lens unit, and the partial dispersion ratio between the g line and the F line of the most image side lens element. A glass material which does not satisfy the condition (4) has a large linear expansion coefficient. If a most image side lens element comprising such glass material is cemented with an object side lens element, a cement between the lens elements comes off due to a difference in linear expansion coefficient between the glass material of the most image side lens element and a glass material of the object side lens element, resulting in disfigurement. In particular, the cemented lens element in the first lens unit has a large outer diameter, and if the first lens unit in a state where ink is applied to an outer circumference portion thereof is subjected to a drying-by-heating process, the cement comes off, resulting in considerable disfigurement. As a result, it becomes very difficult to manufacture a high-quality cemented lens element.

It is more preferable that the above-mentioned condition (4) is satisfied in the following condition (a-3)'.

$$Z = f_T/f_W > 20.5 \tag{a-3}'$$

Further, it is more preferable that the above-mentioned condition (4) is satisfied in the following condition (b)'.

$$\omega_W > 40 \tag{b}'$$

Among the zoom lens systems according to Embodiments 1 to 11, a zoom lens system having the basis configuration I, II or III preferably satisfies the following conditions (5) and (a-4).

$$-9.0 \leq f_1/f_2 \leq -6.0 \tag{5}$$

$$Z = f_T/f_W > 22.5 \tag{a-4}$$

where,
$f_1$ is a composite focal length of the first lens unit,
$f_2$ is a composite focal length of the second lens unit,
$f_W$ is a focal length of the entire system at a wide-angle limit, and
$f_T$ is a focal length of the entire system at a telephoto limit.

The condition (5) sets forth the ratio between the focal length of the first lens unit and the focal length of the second lens unit. When the value goes below the lower limit of the condition (5), the focal length of the second lens unit becomes excessively short, and aberration variation at the time of magnification change is increased, which causes difficulty in compensating various aberrations. Further, the focal length of the first lens unit becomes excessively long, and a very larger amount of movement of the first lens unit is required in order to achieve a high magnification ratio. As a result, it becomes difficult to provide compact lens barrel, imaging device, and camera. When the value exceeds the upper limit of the condition (5), the focal length of the first lens unit becomes excessively short, and aberration variation at the time of magnification change is increased, which causes difficulty in compensating various aberrations. Further, the diameter of the first lens unit is increased. As a result, it becomes difficult to provide compact lens barrel, imaging device, and camera. Further, the error sensitivity with respect to the inclination of the first lens unit becomes excessively high, which may cause difficulty in assembling the optical system.

When at least one of the following conditions (5)' and (5)" is satisfied, the above-mentioned effect is achieved more successfully.

$$-8.0 < f_1/f_2 \quad (5)'$$

$$f_1/f_2 < -7.0 \quad (5)''$$

Among the zoom lens systems according to Embodiments 1 to 11, a zoom lens system having the basis configuration III preferably satisfies the following conditions (6) and (a-3).

$$R_{3F}/Ir > 3.0 \quad (6)$$

$$Z = f_T/f_W > 18.0 \quad (a-3)$$

where, $R_{3F}$ is a curvature radius of a most object side lens surface in the third lens unit, Ir is a value represented by the following equation:

$$Ir = f_T \times \tan(\omega_T),$$

$f_W$ is a focal length of the entire system at a wide-angle limit, $f_T$ is a focal length of the entire system at a telephoto limit, and $\omega_T$ is a half value (°) of a maximum view angle at a telephoto limit.

The condition (6) sets forth the ratio between the curvature radius of the most object side lens surface in the third lens unit, and the maximum image height. When the condition (6) is not satisfied, the curvature radius of the most object side lens surface is reduced, and an angle formed between the light beam incident on the lens surface and the normal line of the lens surface is increased, which causes difficulty in favorably suppressing spherical aberration and coma aberration. As a result, aberration variation at the time of magnification change is increased, which causes difficulty in achieving favorable performance over the entire zoom range.

When the following condition (6)' is satisfied, the above-mentioned effect is achieved more successfully.

$$R_{3F}/Ir > 3.3 \quad (6)'$$

Further, it is more preferable that the above-mentioned conditions (6) and (6)' are satisfied in the following condition (a-3)'.

$$Z = f_T/f_W > 20.5 \quad (a-3)'$$

Among the zoom lens systems according to Embodiments 1 to 11, a zoom lens system having the basis configuration IV preferably satisfies the following conditions (7), (a-3), and (b).

$$vd_{12} > 60 \quad (7)$$

$$Z = f_T/f_W > 18.0 \quad (a-3)$$

$$\omega_W > 32 \quad (b)$$

where, $vd_{12}$ is an Abbe number of a most image side lens element constituting the cemented lens element in the first lens unit, $f_W$ is a focal length of the entire system at a wide-angle limit, $f_T$ is a focal length of the entire system at a telephoto limit, and $\omega_W$ is a half value (°) of a maximum view angle at a wide-angle limit.

The condition (7) sets forth the Abbe number of the most image side lens element constituting the cemented lens element in the first lens unit. When the condition (7) is not satisfied, a difference in Abbe number between the most image side lens element and an object side lens element constituting the cemented lens element becomes small, which causes difficulty in compensating various aberrations.

When the following condition (7)' is satisfied, the above-mentioned effect is achieved more successfully.

$$vd_{12} > 70 \quad (7)'$$

It is more preferable that the above-mentioned conditions (7) and (7)' are satisfied in the following condition (a-3)'.

$$Z = f_T/f_W > 20.5 \quad (a-3)'$$

Further, it is more preferable that the above-mentioned conditions (7) and (7)' are satisfied in the following condition (b)'.

$$\omega_W > 40 \quad (b)'$$

In a zoom lens system like the zoom lens system according to Embodiments 1 to 11, in which the third lens unit moves in a direction perpendicular to the optical axis, it is preferable that the entire system satisfies the following conditions (8) and (9).

$$Y_T > Y \quad (8)$$

$$1.5 < (Y/Y_T)/(f/f_T) < 3.0 \quad (9)$$

where, f is a focal length of the entire system, $f_T$ is a focal length of the entire system at a telephoto limit, Y is an amount of movement in a direction perpendicular to the optical axis at the time of maximum blur compensation in the third lens unit with a focal length f of the entire system, and $Y_T$ is an amount of movement in a direction perpendicular to the optical axis at the time of maximum blur compensation in the third lens unit with a focal length $f_T$ of the entire system at a telephoto limit.

The conditions (8) and (9) relate to the amount of movement at the time of maximum blur compensation in the third lens unit that moves in a direction perpendicular to the optical axis. In the case of a zoom lens system, when the compensation angle is constant over the entire zoom range, a larger zoom ratio requires a larger amount of movement of the lens unit or the lens element that moves in a direction perpendicular to the optical axis. On the contrary, a smaller zoom ratio requires merely a smaller amount of movement of the lens unit or the lens element that moves in a direction perpendicular to the optical axis. When the condition (8) is not satisfied, alternatively when the value exceeds the upper limit of the condition (9), blur compensation becomes excessive. This causes a possibility of enhanced degradation in the optical performance. In contrast, when the value goes below the lower limit of the condition (9), a possibility of insufficient blur compensation arises.

When at least one of the following conditions (9)' and (9)" is satisfied, the above-mentioned effect is achieved more successfully.

$$1.6 < (Y/Y_T)/(f/f_T) \quad (9)'$$

$$(Y/Y_T)/(f/f_T) < 2.2 \quad (9)''$$

Each lens unit constituting the zoom lens system according to Embodiments 1 to 11 is composed exclusively of refractive type lens elements that deflect the incident light by refraction (that is, lens elements of a type in which deflection is achieved at the interface between media each having a distinct refractive index). However, the present invention is not limited to this. For example, the lens units may employ diffractive type lens elements that deflect the incident light by diffraction; refractive-diffractive hybrid type lens elements that deflect the incident light by a combination of diffraction and refraction; or gradient index type lens elements that deflect the incident light by distribution of refractive index in the medium.

Moreover, in each embodiment, a configuration has been described that on the object side relative to the image surface S (that is, between the image surface S and the most image side lens surface of the fourth lens unit G4, or between the image surface S and the most image side lens surface of the fifth lens unit G5), a plane parallel plate P such as an optical low-pass filter and a face plate of an image sensor is provided. This low-pass filter may be: a birefringent type low-pass filter made of, for example, a crystal whose predetermined crystal orientation is adjusted; or a phase type low-pass filter that achieves required characteristics of optical cut-off frequency by diffraction.

Embodiment 12

Figure 34:
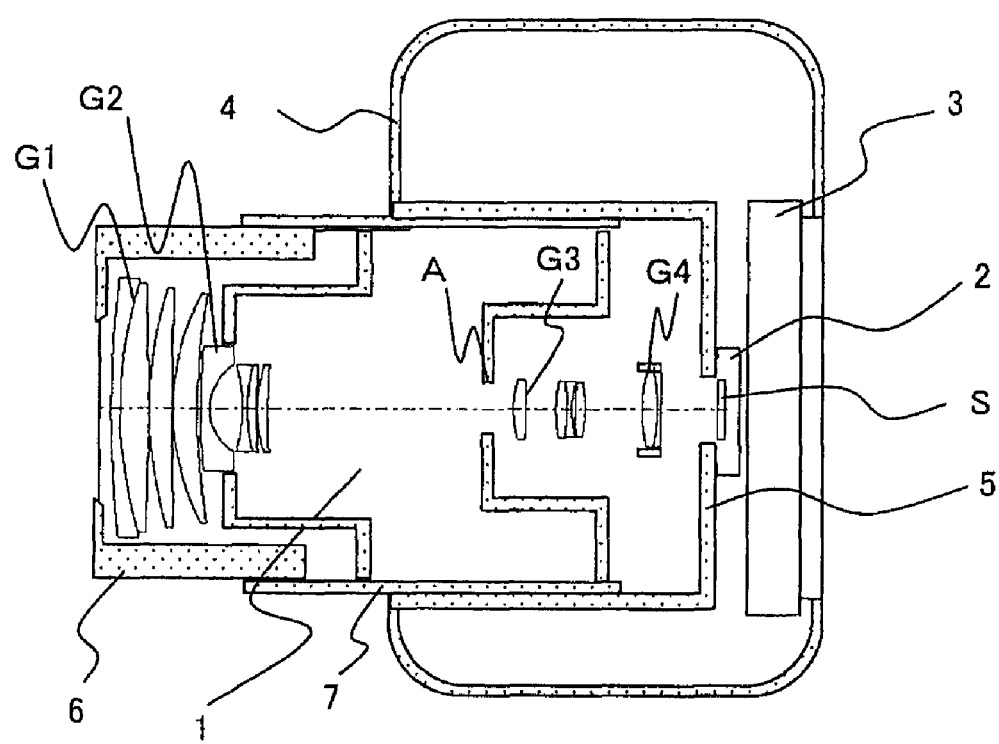
FIG. 34 is a schematic construction diagram of a digital still camera according to Embodiment 12.

FIG. 34 is a schematic construction diagram of a digital still camera according to Embodiment 12. In FIG. 34, the digital still camera comprises: an imaging device having a zoom lens system 1 and an image sensor 2 composed of a CCD; a liquid crystal display monitor 3; and a body 4. The employed zoom lens system 1 is a zoom lens system according to Embodiment 1. In FIG. 34, the zoom lens system 1 comprises a first lens unit G1, a second lens unit G2, an aperture diaphragm A, a third lens unit G3 and a fourth lens unit G4. In the body 4, the zoom lens system 1 is arranged on the front side, while the image sensor 2 is arranged on the rear side of the zoom lens system 1. On the rear side of the body 4, the liquid crystal display monitor 3 is arranged, while an optical image of a photographic object generated by the zoom lens system 1 is formed on an image surface S.

The lens barrel comprises a main barrel 5, a moving barrel 6 and a cylindrical cam 7. When the cylindrical cam 7 is rotated, the first lens unit G1, the second lens unit G2, the aperture diaphragm A, the third lens unit G3 and the fourth lens unit G4 move to predetermined positions relative to the image sensor 2, so that zooming from a wide-angle limit to a telephoto limit is achieved. The fourth lens unit G4 is movable in an optical axis direction by a motor for focus adjustment.

As such, when the zoom lens system according to Embodiment 1 is employed in a digital still camera, a small digital still camera is obtained that has a high resolution and high capability of compensating the curvature of field and that has a short overall length of lens system at the time of non-use. Here, in the digital still camera shown in FIG. 34, any one of the zoom lens systems according to Embodiments 2 to 11 may be employed in place of the zoom lens system according to Embodiment 1. Further, the optical system of the digital still camera shown in FIG. 34 is applicable also to a digital video camera for moving images. In this case, moving images with high resolution can be acquired in addition to still images.

Here, the digital still camera according to the present Embodiment 12 has been described for a case that the employed zoom lens system 1 is a zoom lens system according to Embodiments 1 to 11. However, in these zoom lens systems, the entire zooming range need not be used. That is, in accordance with a desired zooming range, a range where satisfactory optical performance is obtained may exclusively be used. Then, the zoom lens system may be used as one having a lower magnification than the zoom lens system described in Embodiments 1 to 11.

Further, Embodiment 12 has been described for a case that the zoom lens system is applied to a lens barrel of so-called barrel retraction construction. However, the present invention is not limited to this. For example, the zoom lens system may be applied to a lens barrel of so-called bending construction where a prism having an internal reflective surface or a front surface reflective mirror is arranged at an arbitrary position within the first lens unit G1 or the like. Further, in Embodiment 12, the zoom lens system may be applied to a so-called sliding lens barrel in which a part of the lens units constituting the zoom lens system like the entirety of the second lens unit G2, the entirety of the third lens unit G3, the entirety of the fourth lens unit G4, or alternatively a part of the third lens unit G3 is caused to escape from the optical axis at the time of retraction.

Further, an imaging device comprising a zoom lens system according to Embodiments 1 to 11 described above and an image sensor such as a CCD or a CMOS may be applied to a mobile telephone, a PDA (Personal Digital Assistance), a surveillance camera in a surveillance system, a Web camera, a vehicle-mounted camera or the like.

Numerical embodiments are described below in which the zoom lens systems according to Embodiments 1 to 11 are implemented respectively. In the numerical examples, the units of the length in the tables are all "mm", while the units of the view angle are all "°". Moreover, in the numerical examples, r is the radius of curvature, d is the axial distance, nd is the refractive index to the d-line, and vd is the Abbe number to the d-line. In the numerical examples, the surfaces marked with * are aspheric surfaces, and the aspheric surface configuration is defined by the following expression.

$$Z = \frac{h^2/r}{1 + \sqrt{1 - (1+\kappa)(h/r)^2}} + A4h^4 + A6h^6 + A8h^8 + A10h^{10} + A12h^{12} + A14h^{14} + A16h^{16}$$

Here, $\kappa$ is the conic constant, A4, A6, A8, A10, A12, A14 and A16 are a fourth-order, sixth-order, eighth-order, tenth-order, twelfth-order, fourteenth-order and sixteenth-order aspherical coefficients, respectively.

FIGS. 2, 5, 8, 11, 14, 17, 20, 23, 26, 29 and 32 are longitudinal aberration diagrams of the zoom lens systems according to Embodiments 1 to 11, respectively.

In each longitudinal aberration diagram, part (a) shows the aberration at a wide-angle limit, part (b) shows the aberration at a middle position, and part (c) shows the aberration at a telephoto limit. Each longitudinal aberration diagram, in order from the left-hand side, shows the spherical aberration (SA (mm)), the astigmatism (AST (mm)) and the distortion (DIS (%)). In each spherical aberration diagram, the vertical axis indicates the F-number (in each Fig., indicated as F), and the solid line, the short dash line and the long dash line indicate the characteristics to the d-line, the F-line and the C-line, respectively. In each astigmatism diagram, the vertical axis indicates the image height (in each Fig., indicated as H), and the solid line and the dash line indicate the characteristics to the sagittal plane (in each Fig., indicated as "s") and the meridional plane (in each Fig., indicated as "m"), respectively. In each distortion diagram, the vertical axis indicates the image height (in each Fig., indicated as H).

FIGS. 3, 6, 9, 12, 15, 18, 21, 24, 27, 30 and 33 are lateral aberration diagrams of the zoom lens systems at a telephoto limit according to Embodiments 1 to 11, respectively.

In each lateral aberration diagram, the aberration diagrams in the upper three parts correspond to a basic state where image blur compensation is not performed at a telephoto limit, while the aberration diagrams in the lower three parts correspond to an image blur compensation state where the entire third lens unit G3 is moved by a predetermined amount in a direction perpendicular to the optical axis at a telephoto limit. Among the lateral aberration diagrams of a basic state, the upper part shows the lateral aberration at an image point of 75% of the maximum image height, the middle part shows the lateral aberration at the axial image point, and the lower part shows the lateral aberration at an image point of −75% of the maximum image height. Among the lateral aberration diagrams of an image blur compensation state, the upper part shows the lateral aberration at an image point of 75% of the maximum image height, the middle part shows the lateral aberration at the axial image point, and the lower part shows the lateral aberration at an image point of −75% of the maximum image height. In each lateral aberration diagram, the horizontal axis indicates the distance from the principal ray on the pupil surface, and the solid line, the short dash line and the long dash line indicate the characteristics to the d-line, the F-line and the C-line, respectively. In each lateral aberration diagram, the meridional plane is adopted as the plane containing the optical axis of the first lens unit G1 and the optical axis of the third lens unit G3.

Here, in the zoom lens system according to each example, the amount of movement ($Y_T$) of the third lens unit G3 in a direction perpendicular to the optical axis in an image blur compensation state at a telephoto limit is as follows.

| Example | Amount of movement $Y_T$ (mm) |
|---|---|
| 1 | 0.285 |
| 2 | 0.285 |
| 3 | 0.318 |
| 4 | 0.392 |
| 5 | 0.285 |
| 6 | 0.285 |
| 7 | 0.283 |
| 8 | 0.278 |
| 9 | 0.275 |
| 10 | 0.276 |
| 11 | 0.288 |

Here, when the shooting distance is infinity, at a telephoto limit, the amount of image decentering in a case that the zoom lens system inclines by about 0.3° is equal to the amount of image decentering in a case that the entire third lens unit G3 displaces in parallel by each of the above-mentioned values in a direction perpendicular to the optical axis.

As seen from the lateral aberration diagrams, satisfactory symmetry is obtained in the lateral aberration at the axial image point. Further, when the lateral aberration at the +75% image point and the lateral aberration at the −75% image point are compared with each other in a basic state, all have a small degree of curvature and almost the same inclination in the aberration curve. Thus, decentering coma aberration and decentering astigmatism are small. This indicates that sufficient imaging performance is obtained even in an image blur compensation state. Further, when the image blur compensation angle of a zoom lens system is the same, the amount of parallel translation required for image blur compensation decreases with decreasing focal length of the entire zoom lens system. Thus, at arbitrary zoom positions, sufficient image blur compensation can be performed for image blur compensation angles up to about 0.3° without degrading the imaging characteristics.

Numerical Example 1

The zoom lens system of Numerical Example 1 corresponds to Embodiment 1 shown in FIG. 1. Table 1 shows the surface data of the zoom lens system of Numerical Example 1. Table 2 shows the aspherical data. Table 3 shows various data.

TABLE 1

(Surface data)

| Surface number | r | d | nd | vd |
|---|---|---|---|---|
| Object surface | ∞ | | | |
| 1 | 156.31700 | 1.25000 | 1.90366 | 31.3 |
| 2 | 58.66400 | 0.01000 | 1.56732 | 42.8 |
| 3 | 58.66400 | 4.10500 | 1.48749 | 70.4 |
| 4 | −372.71800 | 0.15000 | | |
| 5 | 59.13900 | 3.18100 | 1.49700 | 81.6 |
| 6 | 514.42900 | 0.15000 | | |
| 7 | 34.99500 | 3.43100 | 1.49700 | 81.6 |
| 8 | 95.59400 | Variable | | |
| 9* | 5000.00000 | 1.20000 | 1.80470 | 41.0 |
| 10* | 7.36200 | 4.63700 | | |
| 11 | −21.17200 | 0.70000 | 1.77250 | 49.6 |
| 12 | 25.97500 | 0.01000 | 1.56732 | 42.8 |
| 13 | 25.97500 | 1.22500 | 1.94595 | 18.0 |
| 14 | 72.48200 | 0.16000 | | |
| 15 | 20.66800 | 1.48400 | 1.92286 | 20.9 |
| 16 | 87.78800 | Variable | | |
| 17 (Diaphragm) | ∞ | Variable | | |
| 18 | ∞ | 1.20000 | | |
| 19* | 14.64500 | 1.77200 | 1.58332 | 59.1 |
| 20 | −54.55300 | 4.25400 | | |
| 21 | 20.58900 | 1.53600 | 1.60311 | 60.7 |
| 22 | −27.81900 | 0.01000 | 1.56732 | 42.8 |
| 23 | −27.81900 | 0.70000 | 1.80610 | 33.3 |
| 24 | 14.18800 | 0.55200 | | |
| 25 | 119.99400 | 1.37500 | 1.49700 | 81.6 |
| 26 | −17.32100 | Variable | | |
| 27 | 20.41100 | 2.16300 | 1.60311 | 60.7 |
| 28 | −25.37100 | 0.01000 | 1.56732 | 42.8 |
| 29 | −25.37100 | 0.60000 | 1.71736 | 29.5 |
| 30 | −143.24700 | Variable | | |
| 31 | ∞ | 0.90000 | 1.51680 | 64.2 |
| 32 | ∞ | (BF) | | |
| Image surface | ∞ | | | |

TABLE 2

(Aspherical data)

Surface No. 9

K = 0.00000E+00, A4 = 1.92281E−04, A6 = −4.38768E−06,
A8 = 6.19331E−08 A10 = −5.38323E−10, A12 = 1.99361E−12,
A14 = 0.00000E+00, A16 = 0.00000E+00

TABLE 2-continued (Aspherical data)

Surface No. 10

K = 5.81002E−02, A4 = 1.30724E−04, A6 = −3.47611E−07,
A8 = −2.18393E−07 A10 = 8.34604E−09, A12 = −1.51391E−10,
A14 = 0.00000E+00, A16 = 0.00000E+00

Surface No. 19

K = 0.00000E+00, A4 = −7.27276E−05, A6 = 2.36358E−07,
A8 = 5.49604E−09 A10 = −4.41183E−10, A12 = −8.74528E−12,
A14 = −1.14363E−13, A16 = 1.02006E−14

TABLE 3

(Various data)

Zooming ratio 22.91734

| | Wide-angle limit | Middle position | Telephoto limit |
|---|---|---|---|
| Focal length | 4.6380 | 22.0088 | 106.2908 |
| F-number | 2.90330 | 3.62516 | 5.40231 |
| View angle | 41.6646 | 10.0144 | 2.0889 |
| Image height | 3.7000 | 3.9000 | 3.9000 |
| Overall length of lens system | 87.6999 | 100.1865 | 122.7196 |
| BF | 0.90304 | 0.90118 | 0.86601 |
| d8 | 0.5323 | 24.3690 | 40.8201 |
| d16 | 30.5211 | 7.0845 | 2.0424 |
| d17 | 3.0000 | 1.9555 | 0.0000 |
| d26 | 8.0500 | 13.2546 | 33.9200 |
| d30 | 7.9285 | 15.8567 | 8.3061 |
| Entrance pupil position | 19.4690 | 84.4166 | 294.0880 |
| Exit pupil position | −76.4784 | −130.8178 | 129.1892 |
| Front principal points position | 23.8290 | 102.7479 | 488.4201 |
| Back principal points position | 83.0619 | 78.1777 | 16.4288 |

Single lens data

| Lens element | Initial surface number | Focal length |
|---|---|---|
| 1 | 1 | −104.5527 |
| 2 | 3 | 104.2993 |
| 3 | 5 | 134.1378 |
| 4 | 7 | 109.0259 |
| 5 | 9 | −9.1632 |
| 6 | 11 | −15.0025 |
| 7 | 13 | 42.2548 |
| 8 | 15 | 28.9842 |
| 9 | 19 | 19.9813 |
| 10 | 21 | 19.8554 |
| 11 | 23 | −11.5700 |
| 12 | 25 | 30.5567 |
| 13 | 27 | 19.0941 |
| 14 | 29 | −43.0710 |

Zoom lens unit data

| Lens unit | Initial surface No. | Focal length | Overall length of lens unit | Front principal points position | Back principal points position |
|---|---|---|---|---|---|
| 1 | 1 | 60.39003 | 12.27700 | 3.98674 | 8.15095 |
| 2 | 9 | −8.45757 | 9.41600 | 0.77846 | 2.87442 |
| 3 | 18 | 20.01853 | 11.39900 | 1.65454 | 3.40510 |
| 4 | 27 | 33.34560 | 2.77300 | 0.08121 | 1.14312 |

TABLE 3-continued (Various data)

Magnification of zoom lens unit

| Lens unit | Initial surface No. | Wide-angle limit | Middle position | Telephoto limit |
|---|---|---|---|---|
| 1 | 1 | 0.00000 | 0.00000 | 0.00000 |
| 2 | 9 | −0.18190 | −0.37326 | −1.36240 |
| 3 | 18 | −0.63160 | −2.26659 | −1.96257 |
| 4 | 27 | 0.66848 | 0.43078 | 0.65827 |

Numerical Example 2

The zoom lens system of Numerical Example 2 corresponds to Embodiment 2 shown in FIG. 4. Table 4 shows the surface data of the zoom lens system of Numerical Example 2. Table 5 shows the aspherical data. Table 6 shows various data.

TABLE 4

(Surface data)

| Surface number | r | d | nd | vd |
|---|---|---|---|---|
| Object surface | ∞ | | | |
| 1 | 107.23500 | 1.25000 | 1.90366 | 31.3 |
| 2 | 48.05300 | 0.01000 | 1.56732 | 42.8 |
| 3 | 48.05300 | 3.79800 | 1.49700 | 81.6 |
| 4 | 302.94800 | 0.15000 | | |
| 5 | 54.79100 | 3.65100 | 1.49700 | 81.6 |
| 6 | 1311.14800 | 0.15000 | | |
| 7 | 39.30700 | 3.01900 | 1.61800 | 63.4 |
| 8 | 99.99900 | Variable | | |
| 9* | 5000.00000 | 1.20000 | 1.80470 | 41.0 |
| 10* | 7.36200 | 4.63700 | | |
| 11 | −21.17200 | 0.70000 | 1.77250 | 49.6 |
| 12 | 25.97500 | 0.01000 | 1.56732 | 42.8 |
| 13 | 25.97500 | 1.22500 | 1.94595 | 18.0 |
| 14 | 72.48200 | 0.16000 | | |
| 15 | 20.66800 | 1.48400 | 1.92286 | 20.9 |
| 16 | 87.78800 | Variable | | |
| 17 (Diaphragm) | ∞ | Variable | | |
| 18 | ∞ | 1.20000 | | |
| 19* | 14.64500 | 1.77200 | 1.58332 | 59.1 |
| 20 | −54.55300 | 4.25400 | | |
| 21 | 20.58900 | 1.53600 | 1.60311 | 60.7 |
| 22 | −27.81900 | 0.01000 | 1.56732 | 42.8 |
| 23 | −27.81900 | 0.70000 | 1.80610 | 33.3 |
| 24 | 14.18800 | 0.55200 | | |
| 25 | 119.99400 | 1.37500 | 1.49700 | 81.6 |
| 26 | −17.32100 | Variable | | |
| 27 | 20.41100 | 2.16300 | 1.60311 | 60.7 |
| 28 | −25.37100 | 0.01000 | 1.56732 | 42.8 |
| 29 | −25.37100 | 0.60000 | 1.71736 | 29.5 |
| 30 | −143.24700 | Variable | | |
| 31 | ∞ | 0.90000 | 1.51680 | 64.2 |
| 32 | ∞ | (BF) | | |
| Image surface | ∞ | | | |

TABLE 5

(Aspherical data)

Surface No. 9

K = 0.00000E+00, A4 = 1.92281E−04, A6 = −4.38768E−06,
A8 = 6.19331E−08 A10 = −5.38323E−10, A12 = 1.99361E−12,
A14 = 0.00000E+00, A16 = 0.00000E+00

Surface No. 10

K = 5.81002E−02, A4 = 1.30724E−04, A6 = −3.47611E−07,
A8 = −2.18393E−07 A10 = 8.34604E−09, A12 = −1.51391E−10,
A14 = 0.00000E+00, A16 = 0.00000E+00

TABLE 5-continued (Aspherical data)

Surface No. 19

K = 0.00000E+00, A4 = −7.27276E−05, A6 = 2.36358E−07,
A8 = 5.49604E−09 A10 = −4.41183E−10, A12 = −8.74528E−12,
A14 = −1.14363E−13, A16 = 1.02006E−14

TABLE 6

(Various data)

Zooming ratio 22.90280

|  | Wide-angle limit | Middle position | Telephoto limit |
|---|---|---|---|
| Focal length | 4.6354 | 21.9723 | 106.167 |
| F-number | 2.90109 | 3.62194 | 5.39936 |
| View angle | 42.2474 | 10.0323 | 2.0911 |
| Image height | 3.7000 | 3.9000 | 3.9000 |
| Overall length of lens system | 87.4264 | 99.9719 | 122.4670 |
| BF | 0.90296 | 0.90121 | 0.85835 |
| d8 | 0.5323 | 24.3690 | 40.8201 |
| d16 | 30.4721 | 7.0851 | 2.0424 |
| d17 | 3.0000 | 1.9555 | 0.0000 |
| d26 | 8.0784 | 13.2978 | 33.9457 |
| d30 | 7.9246 | 15.8473 | 8.2845 |
| Entrance pupil position | 19.1005 | 83.7617 | 292.5899 |
| Exit pupil position | −76.7289 | −131.6422 | 128.9499 |
| Front principal points position | 23.4591 | 102.0916 | 486.7433 |
| Back principal points position | 82.7910 | 77.9996 | 16.3033 |

Single lens data

| Lens element | Initial surface number | Focal length |
|---|---|---|
| 1 | 1 | −97.3284 |
| 2 | 3 | 114.3484 |
| 3 | 5 | 114.9410 |
| 4 | 7 | 102.8426 |
| 5 | 9 | −9.1632 |
| 6 | 11 | −15.0025 |
| 7 | 13 | 42.2548 |
| 8 | 15 | 28.9842 |
| 9 | 19 | 19.9813 |
| 10 | 21 | 19.8554 |
| 11 | 23 | −11.5700 |
| 12 | 25 | 30.5567 |
| 13 | 27 | 19.0941 |
| 14 | 29 | −43.0710 |

Zoom lens unit data

| Lens unit | Initial surface No. | Focal length | Overall length of lens unit | Front principal points position | Back principal points position |
|---|---|---|---|---|---|
| 1 | 1 | 60.24484 | 12.02800 | 3.83093 | 8.04131 |
| 2 | 9 | −8.45757 | 9.41600 | 0.77846 | 2.87442 |
| 3 | 18 | 20.01853 | 11.39900 | 1.65454 | 3.40510 |
| 4 | 27 | 33.34560 | 2.77300 | 0.08121 | 1.14312 |

Magnification of zoom lens unit

| Lens unit | Initial surface No. | Wide-angle limit | Middle position | Telephoto limit |
|---|---|---|---|---|
| 1 | 1 | 0.00000 | 0.00000 | 0.00000 |
| 2 | 9 | −0.18192 | −0.37335 | −1.36368 |
| 3 | 18 | −0.63258 | −2.26623 | −1.96049 |
| 4 | 27 | 0.66860 | 0.43106 | 0.65914 |

Numerical Example 3

The zoom lens system of Numerical Example 3 corresponds to Embodiment 3 shown in FIG. 7. Table 7 shows the surface data of the zoom lens system of Numerical Example 3. Table 8 shows the aspherical data. Table 9 shows various data.

TABLE 7

(Surface data)

| Surface number | r | d | nd | vd |
|---|---|---|---|---|
| Object surface | ∞ |  |  |  |
| 1 | 113.04500 | 1.25000 | 1.84666 | 23.8 |
| 2 | 58.96400 | 0.01000 | 1.56732 | 42.8 |
| 3 | 58.96400 | 3.01700 | 1.48749 | 70.4 |
| 4 | 365.26800 | 0.15000 |  |  |
| 5 | 70.63000 | 2.85500 | 1.49700 | 81.6 |
| 6 | −1906.80800 | 0.15000 |  |  |
| 7 | 40.29400 | 2.41800 | 1.60311 | 60.7 |
| 8 | 86.00300 | Variable |  |  |
| 9* | 7105.29000 | 1.20000 | 1.80470 | 41.0 |
| 10* | 7.62200 | 4.76600 |  |  |
| 11 | −21.52000 | 0.70000 | 1.80420 | 46.5 |
| 12 | 23.99800 | 0.01000 | 1.56732 | 42.8 |
| 13 | 23.99800 | 1.23900 | 1.94595 | 18.0 |
| 14 | 69.27700 | 0.15000 |  |  |
| 15 | 20.26700 | 1.42300 | 1.92286 | 20.9 |
| 16 | 84.53100 | Variable |  |  |
| 17 (Diaphragm) | ∞ | Variable |  |  |
| 18 | ∞ | 1.20000 |  |  |
| 19* | 14.49200 | 1.68900 | 1.58332 | 59.1 |
| 20 | −56.29200 | 4.11500 |  |  |
| 21 | 21.10400 | 1.46800 | 1.60311 | 60.7 |
| 22 | −29.32200 | 0.01000 | 1.56732 | 42.8 |
| 23 | −29.32200 | 0.70000 | 1.80610 | 33.3 |
| 24 | 14.10100 | 0.71700 |  |  |
| 25 | 208.73500 | 1.38500 | 1.49700 | 81.6 |
| 26 | −16.42600 | Variable |  |  |
| 27 | 22.38700 | 1.91400 | 1.60311 | 60.7 |
| 28 | −40.00700 | 0.01000 | 1.56732 | 42.8 |
| 29 | −40.00700 | 0.60000 | 1.71736 | 29.5 |
| 30 | −1568.87500 | Variable |  |  |
| 31 | ∞ | 0.90000 | 1.51680 | 64.2 |
| 32 | ∞ | (BF) |  |  |
| Image surface | ∞ |  |  |  |

TABLE 8

(Aspherical data)

Surface No. 9

K = −1.58027E+06, A4 = 2.32838E−04, A6 = −4.96964E−06,
A8 = 7.39225E−08 A10 = −7.11133E−10, A12 = 2.94909E−12,
A14 = 1.76121E−15, A16 = −2.81543E−17

Surface No. 10

K = −5.50006E−03, A4 = 2.23488E−04, A6 = −1.14647E−07,
A8 = −1.47148E−07 A10 = 7.89097E−09, A12 = −1.45562E−10,
A14 = 1.95815E−13, A16 = −4.69388E−17

Surface No. 19

K = 0.00000E+00, A4 = −7.27236E−05, A6 = −7.85554E−08,
A8 = 1.05470E−08 A10 = 1.71459E−10, A12 = −2.50985E−11,
A14 = 0.00000E+00, A16 = 0.00000E+00

TABLE 9

(Various data)

Zooming ratio 28.47445

|  | Wide-angle limit | Middle position | Telephoto limit |
|---|---|---|---|
| Focal length | 4.6352 | 24.7190 | 131.9861 |
| F-number | 2.91051 | 3.83626 | 5.74370 |
| View angle | 42.2270 | 8.9267 | 1.6814 |
| Image height | 3.7000 | 3.9020 | 3.9020 |
| Overall length of lens system | 88.0569 | 103.6410 | 128.1503 |
| BF | 0.89549 | 0.90991 | 0.91436 |
| d8 | 0.4634 | 27.2351 | 46.0997 |
| d16 | 32.7163 | 7.0706 | 2.0016 |
| d17 | 3.0000 | 1.9555 | 0.0000 |
| d26 | 8.3736 | 13.4977 | 37.6116 |
| d30 | 8.5621 | 18.9262 | 7.4770 |
| Entrance pupil position | 17.4542 | 88.2495 | 349.6938 |
| Exit pupil position | −60.7248 | −92.2902 | 276.1474 |
| Front principal points position | 21.7408 | 106.4125 | 544.9728 |
| Back principal points position | 83.4216 | 78.9220 | −3.8358 |

Single lens data

| Lens element | Initial surface number | Focal length |
|---|---|---|
| 1 | 1 | −147.1328 |
| 2 | 3 | 143.7742 |
| 3 | 5 | 137.1032 |
| 4 | 7 | 123.2528 |
| 5 | 9 | −9.4827 |
| 6 | 11 | −14.0121 |
| 7 | 13 | 38.3056 |
| 8 | 15 | 28.5832 |
| 9 | 19 | 19.9328 |
| 10 | 21 | 20.5726 |
| 11 | 23 | −11.7279 |
| 12 | 25 | 30.7021 |
| 13 | 27 | 24.0787 |
| 14 | 29 | −57.2385 |

Zoom lens unit data

| Lens unit | Initial surface No. | Focal length | Overall length of lens unit | Front principal points position | Back principal points position |
|---|---|---|---|---|---|
| 1 | 1 | 65.15474 | 9.85000 | 2.80316 | 6.21741 |
| 2 | 9 | −8.52111 | 9.48800 | 0.86544 | 2.99307 |
| 3 | 18 | 20.33308 | 11.28400 | 1.74413 | 3.33879 |
| 4 | 27 | 40.62462 | 2.52400 | −0.11067 | 0.86697 |

Magnification of zoom lens unit

| Lens unit | Initial surface No. | Wide-angle limit | Middle position | Telephoto limit |
|---|---|---|---|---|
| 1 | 1 | 0.00000 | 0.00000 | 0.00000 |
| 2 | 9 | −0.16491 | −0.34221 | −1.41174 |
| 3 | 18 | −0.60608 | −2.42952 | −1.94421 |
| 4 | 27 | 0.71180 | 0.45633 | 0.73805 |

Numerical Example 4

The zoom lens system of Numerical Example 4 corresponds to Embodiment 4 shown in FIG. 10. Table 10 shows the surface data of the zoom lens system of Numerical Example 4. Table 11 shows the aspherical data. Table 12 shows the various data.

TABLE 10

(Surface data)

| Surface number | r | d | nd | vd |
|---|---|---|---|---|
| Object surface | ∞ | | | |
| 1 | 109.53300 | 1.25000 | 1.85026 | 32.3 |
| 2 | 47.16100 | 0.01000 | 1.56732 | 42.8 |
| 3 | 47.16100 | 3.53900 | 1.49700 | 81.6 |
| 4 | 256.15000 | 0.15000 | | |
| 5 | 56.40500 | 3.45100 | 1.49700 | 81.6 |
| 6 | −1968.13000 | 0.15000 | | |
| 7 | 40.44300 | 2.47200 | 1.61800 | 63.3 |
| 8 | 91.89600 | Variable | | |
| 9* | 982.47800 | 1.20000 | 1.80470 | 41.0 |
| 10* | 7.77300 | 4.63600 | | |
| 11 | −19.80800 | 0.70000 | 1.80420 | 46.5 |
| 12 | 19.26500 | 0.01000 | 1.56732 | 42.8 |
| 13 | 19.26500 | 1.36600 | 1.92286 | 20.9 |
| 14 | 71.21600 | 0.15000 | | |
| 15 | 21.25900 | 1.40900 | 1.92286 | 20.9 |
| 16 | 93.16000 | Variable | | |
| 17 (Diaphragm) | ∞ | Variable | | |
| 18 | ∞ | 1.20000 | | |
| 19* | 14.06300 | 1.77900 | 1.58332 | 59.1 |
| 20 | −62.97900 | 3.97400 | | |
| 21 | 22.99000 | 1.38500 | 1.60311 | 60.7 |
| 22 | −32.57200 | 0.01000 | 1.56732 | 42.8 |
| 23 | −32.57200 | 0.70000 | 1.80610 | 33.3 |
| 24 | 14.20000 | 0.64800 | | |
| 25 | 291.32900 | 1.34800 | 1.49700 | 81.6 |
| 26 | −16.75700 | Variable | | |
| 27* | 23.03500 | 2.04400 | 1.60602 | 57.4 |
| 28 | −29.52000 | 0.01000 | 1.56732 | 42.8 |
| 29 | −29.52000 | 0.60000 | 1.71736 | 29.5 |
| 30 | −144.35200 | Variable | | |
| 31 | ∞ | 0.90000 | 1.51680 | 64.2 |
| 32 | ∞ | (BF) | | |
| Image surface | ∞ | | | |

TABLE 11

(Aspherical data)

Surface No. 9

K = 0.00000E+00, A4 = 1.86712E−04, A6 = −4.24505E−06,
A8 = 7.40316E−08 A10 = −7.95536E−10, A12 = 3.30152E−12

Surface No. 10

K = 0.00000E+00, A4 = 1.81554E−04, A6 = −7.75409E−07,
A8 = −1.18559E−07 A10 = 9.97285E−09, A12 = −1.88872E−10

Surface No. 19

K = 0.00000E+00, A4 = −7.74497E−05, A6 = 8.13240E−08,
A8 = 1.67999E−09 A10 = 0.00000E+00, A12 = 0.00000E+00

Surface No. 27

K = 0.00000E+00, A4 = 1.88527E−06, A6 = 4.48423E−08,
A8 = −7.98155E−10 A10 = 0.00000E+00, A12 = 0.00000E+00

TABLE 12

(Various data)

Zooming ratio 36.95533

|  | Wide-angle limit | Middle position | Telephoto limit |
|---|---|---|---|
| Focal length | 4.6001 | 24.7213 | 169.9977 |
| F-number | 2.93660 | 3.72365 | 6.30451 |
| View angle | 43.5354 | 8.9679 | 1.3020 |
| Image height | 3.7000 | 3.9000 | 3.9000 |
| Overall length of lens system | 90.6746 | 104.9486 | 125.5890 |

TABLE 12-continued (Various data)

| | | | |
|---|---|---|---|
| BF | 0.88159 | 0.87858 | 0.94354 |
| d8 | 0.4162 | 27.0211 | 45.3610 |
| d16 | 33.5559 | 7.5227 | 2.0021 |
| d17 | 3.0000 | 2.0000 | 0.0000 |
| d26 | 8.8581 | 13.0528 | 41.1415 |
| d30 | 8.8718 | 19.3824 | 1.0499 |
| Entrance pupil position | 18.3241 | 92.9561 | 402.1464 |
| Exit pupil position | −69.4818 | −102.5788 | 126.7285 |
| Front principal points position | 22.6234 | 111.7702 | 801.8949 |
| Back principal points position | 86.0745 | 80.2273 | −44.4086 |

Single lens data

| Lens element | Initial surface number | Focal length |
|---|---|---|
| 1 | 1 | −98.3116 |
| 2 | 3 | 115.6552 |
| 3 | 5 | 110.3921 |
| 4 | 7 | 114.7740 |
| 5 | 9 | −9.7419 |
| 6 | 11 | −12.0480 |
| 7 | 13 | 28.2599 |
| 8 | 15 | 29.5690 |
| 9 | 19 | 19.8770 |
| 10 | 21 | 22.5580 |
| 11 | 23 | −12.1862 |
| 12 | 25 | 31.9290 |
| 13 | 27 | 21.6683 |
| 14 | 29 | −51.8427 |

Zoom lens unit data

| Lens unit | Initial surface No. | Focal length | Overall length of lens unit | Front principal points position | Back principal points position |
|---|---|---|---|---|---|
| 1 | 1 | 62.59525 | 11.02200 | 3.60322 | 7.42795 |
| 2 | 9 | −8.39998 | 9.47100 | 0.97025 | 3.17950 |
| 3 | 18 | 21.06330 | 11.04400 | 1.38556 | 3.09868 |
| 4 | 27 | 36.46034 | 2.65400 | 0.11917 | 1.13807 |

Magnification of zoom lens unit

| Lens unit | Initial surface No. | Wide-angle limit | Middle position | Telephoto limit |
|---|---|---|---|---|
| 1 | 1 | 0.00000 | 0.00000 | 0.00000 |
| 2 | 9 | −0.17068 | −0.37152 | −1.96723 |
| 3 | 18 | −0.63822 | −2.75079 | −1.55558 |
| 4 | 27 | 0.67464 | 0.38645 | 0.88747 |

Numerical Example 5

The zoom lens system of Numerical Example 5 corresponds to Embodiment 5 shown in FIG. 13. Table 13 shows the surface data of the zoom lens system of Numerical Example 5. Table 14 shows the aspherical data. Table 15 shows various data.

TABLE 13

(Surface data)

| Surface number | r | d | nd | vd |
|---|---|---|---|---|
| Object surface | ∞ | | | |
| 1 | 156.41700 | 1.25000 | 1.90366 | 31.3 |
| 2 | 58.76800 | 0.01000 | 1.56732 | 42.8 |
| 3 | 58.76800 | 4.09700 | 1.48749 | 70.4 |

TABLE 13-continued (Surface data)

| Surface number | r | d | nd | vd |
|---|---|---|---|---|
| 4 | −373.32600 | 0.15000 | | |
| 5 | 59.44300 | 3.20600 | 1.49700 | 81.6 |
| 6 | 546.96400 | 0.15000 | | |
| 7 | 35.10200 | 3.44400 | 1.49700 | 81.6 |
| 8 | 95.81900 | Variable | | |
| 9* | 5000.00000 | 1.20000 | 1.80470 | 41.0 |
| 10* | 7.35900 | 4.63700 | | |
| 11 | −21.16200 | 0.70000 | 1.77250 | 49.6 |
| 12 | 25.73700 | 0.01000 | 1.56732 | 42.8 |
| 13 | 25.73700 | 1.22500 | 1.94595 | 18.0 |
| 14 | 74.25200 | 0.16000 | | |
| 15 | 20.62500 | 1.48400 | 1.92286 | 20.9 |
| 16 | 84.47600 | Variable | | |
| 17 (Diaphragm) | ∞ | 1.20000 | | |
| 18* | 14.60800 | 1.77200 | 1.58332 | 59.1 |
| 19 | −54.74100 | 4.25400 | | |
| 20 | 20.62400 | 1.53600 | 1.60311 | 60.7 |
| 21 | −27.84500 | 0.01000 | 1.56732 | 42.8 |
| 22 | −27.84500 | 0.70000 | 1.80610 | 33.3 |
| 23 | 14.19600 | 0.55200 | | |
| 24 | 131.70600 | 1.37500 | 1.49700 | 81.6 |
| 25 | −17.08300 | Variable | | |
| 26 | 20.38800 | 2.16300 | 1.60311 | 60.7 |
| 27 | −25.57000 | 0.01000 | 1.56732 | 42.8 |
| 28 | −25.57000 | 0.60000 | 1.71736 | 29.5 |
| 29 | −140.69100 | Variable | | |
| 30* | 241.96900 | 1.28000 | 1.51680 | 64.2 |
| 31 | 69.18000 | 0.50000 | | |
| 32 | ∞ | 0.50000 | 1.51680 | 64.2 |
| 33 | ∞ | (BF) | | |
| Image surface | ∞ | | | |

TABLE 14

(Aspherical data)

Surface No. 9

K = 0.00000E+00, A4 = 1.92281E−04, A6 = −4.38768E−06,
A8 = 6.19331E−08 A10 = −5.38323E−10, A12 = 1.99361E−12,
A14 = 0.00000E+00, A16 = 0.00000E+00

Surface No. 10

K = 5.81002E−02, A4 = 1.31353E−04, A6 = −3.76307E−07,
A8 = −2.12284E−07 A10 = 8.32103E−09, A12 = −1.51984E−10,
A14 = 0.00000E+00, A16 = 0.00000E+00

Surface No. 18

K = 0.00000E+00, A4 = −7.13421E−05, A6 = 2.82399E−08,
A8 = 6.52635E−09 A10 = −6.61170E−11, A12 = 4.26966E−12,
A14 = −2.39792E−13, A16 = −4.42031E−14

Surface No. 30

K = 0.00000E+00, A4 = 2.32128E−05, A6 = 1.75846E−06,
A8 = 8.39016E−09 A10 = 0.00000E+00, A12 = 0.00000E+00,
A14 = 0.00000E+00, A16 = 0.00000E+00

TABLE 15

(Various data)

Zooming ratio 22.88062

| | Wide-angle limit | Middle position | Telephoto limit |
|---|---|---|---|
| Focal length | 4.6361 | 22.0631 | 106.0758 |
| F-number | 2.91195 | 3.88567 | 5.40696 |
| View angle | 41.9027 | 10.0339 | 2.1038 |
| Image height | 3.7000 | 3.9000 | 3.9000 |
| Overall length of lens system | 88.1993 | 100.0846 | 122.9798 |

TABLE 15-continued

(Various data)

| BF | 0.40002 | 0.40555 | 0.37983 |
|---|---|---|---|
| d8 | 0.5323 | 24.4244 | 40.8105 |
| d16 | 33.7145 | 8.9172 | 2.0424 |
| d25 | 8.1474 | 12.7980 | 33.8268 |
| d29 | 7.2301 | 15.3645 | 7.7453 |
| Entrance pupil position | 19.6588 | 86.1059 | 293.3612 |
| Exit pupil position | −39.7318 | −61.3480 | 391.0088 |
| Front principal points position | 23.7593 | 100.2863 | 428.2421 |
| Back principal points position | 83.5633 | 78.0215 | 16.9040 |

Single lens data

| Lens element | Initial surface number | Focal length |
|---|---|---|
| 1 | 1 | −104.8093 |
| 2 | 3 | 104.4810 |
| 3 | 5 | 133.8952 |
| 4 | 7 | 109.3999 |
| 5 | 9 | −9.1595 |
| 6 | 11 | −14.9361 |
| 7 | 13 | 41.1364 |
| 8 | 15 | 29.2419 |
| 9 | 18 | 19.9556 |
| 10 | 20 | 19.8824 |
| 11 | 22 | −11.5781 |
| 12 | 24 | 30.5196 |
| 13 | 26 | 19.1472 |
| 14 | 28 | −43.6568 |
| 15 | 30 | −187.9320 |

Zoom lens unit data

| Lens unit | Initial surface No. | Focal length | Overall length of lens unit | Front principal points position | Back principal points position |
|---|---|---|---|---|---|
| 1 | 1 | 60.43141 | 12.30700 | 3.99032 | 8.16447 |
| 2 | 9 | −8.45575 | 9.41600 | 0.77982 | 2.87922 |
| 3 | 17 | 19.99232 | 11.39900 | 1.66747 | 3.40962 |
| 4 | 26 | 33.17594 | 2.77300 | 0.08753 | 1.14913 |
| 5 | 30 | −187.93197 | 2.28000 | 1.18474 | 1.78908 |

Magnification of zoom lens unit

| Lens unit | Initial surface No. | Wide-angle limit | Middle position | Telephoto limit |
|---|---|---|---|---|
| 1 | 1 | 0.00000 | 0.00000 | 0.00000 |
| 2 | 9 | −0.18176 | −0.37367 | −1.35448 |
| 3 | 17 | −0.62634 | −2.28626 | −1.96713 |
| 4 | 26 | 0.67068 | 0.42533 | 0.65576 |
| 5 | 30 | 1.00474 | 1.00477 | 1.00463 |

Numerical Example 6

The zoom lens system of Numerical Example 6 corresponds to Embodiment 6 shown in FIG. 16. Table 16 shows the surface data of the zoom lens system of Numerical Example 6. Table 17 shows the aspherical data. Table 18 shows various data.

TABLE 16

(Surface data)

| Surface number | r | d | nd | vd |
|---|---|---|---|---|
| Object surface | ∞ | | | |
| 1 | 104.61900 | 1.25000 | 1.90366 | 31.3 |
| 2 | 47.61200 | 0.15000 | | |
| 3 | 49.44700 | 4.17300 | 1.49700 | 81.6 |
| 4 | 338.85600 | 0.15000 | | |
| 5 | 48.88100 | 3.73500 | 1.49700 | 81.6 |
| 6 | 398.15600 | 0.15000 | | |
| 7 | 41.86800 | 3.01900 | 1.61800 | 63.4 |
| 8 | 115.23900 | Variable | | |
| 9* | 5000.00000 | 1.20000 | 1.80470 | 41.0 |
| 10* | 7.36200 | 4.63700 | | |
| 11 | −21.17200 | 0.70000 | 1.77250 | 49.6 |
| 12 | 25.97500 | 0.01000 | 1.56732 | 42.8 |
| 13 | 25.97500 | 1.22500 | 1.94595 | 18.0 |
| 14 | 72.48200 | 0.16000 | | |
| 15 | 20.66800 | 1.48400 | 1.92286 | 20.9 |
| 16 | 87.78800 | Variable | | |
| 17 (Diaphragm) | ∞ | Variable | | |
| 18 | ∞ | 1.20000 | | |
| 19* | 14.64500 | 1.77200 | 1.58332 | 59.1 |
| 20 | −54.55300 | 4.25400 | | |
| 21 | 20.58900 | 1.53600 | 1.60311 | 60.7 |
| 22 | −27.81900 | 0.01000 | 1.56732 | 42.8 |
| 23 | −27.81900 | 0.70000 | 1.80610 | 33.3 |
| 24 | 14.18800 | 0.55200 | | |
| 25 | 119.99400 | 1.37500 | 1.49700 | 81.6 |
| 26 | −17.32100 | Variable | | |
| 27 | 20.41100 | 2.16300 | 1.60311 | 60.7 |
| 28 | −25.37100 | 0.01000 | 1.56732 | 42.8 |
| 29 | −25.37100 | 0.60000 | 1.71736 | 29.5 |
| 30 | −143.24700 | Variable | | |
| 31 | ∞ | 0.90000 | 1.51680 | 64.2 |
| 32 | ∞ | (BF) | | |
| Image surface | ∞ | | | |

TABLE 17

(Aspherical data)

Surface No. 9

$K = 0.00000E+00$, $A4 = 1.92281E-04$, $A6 = -4.38768E-06$,
$A8 = 6.19331E-08$ $A10 = -5.38323E-10$, $A12 = 1.99361E-12$,
$A14 = 0.00000E+00$, $A16 = 0.00000E+00$

Surface No. 10

$K = 5.81002E-02$, $A4 = 1.30724E-04$, $A6 = -3.47611E-07$,
$A8 = -2.18393E-07$ $A10 = 8.34604E-09$, $A12 = -1.51391E-10$,
$A14 = 0.00000E+00$, $A16 = 0.00000E+00$

Surface Np. 19

$K = 0.00000E+00$, $A4 = -7.27276E-05$, $A6 = 2.36358E-07$,
$A8 = 5.49604E-09$ $A10 = -4.41183E-10$, $A12 = -8.74528E-12$,
$A14 = -1.14363E-13$, $A16 = 1.02006E-14$

TABLE 18

(Various data)

Zooming ratio 22.89781

| | Wide-angle limit | Middle position | Telephoto limit |
|---|---|---|---|
| Focal length | 4.6333 | 21.9607 | 106.0913 |
| F-number | 2.90109 | 3.62191 | 5.39869 |
| View angle | 42.2842 | 10.0382 | 2.0923 |
| Image height | 3.7000 | 3.9000 | 3.9000 |
| Overall length of lens system | 88.0254 | 100.5710 | 123.0811 |
| BF | 0.90298 | 0.90127 | 0.85940 |
| d8 | 0.5323 | 24.3690 | 40.8201 |
| d16 | 30.4721 | 7.0851 | 2.0424 |
| d17 | 3.0000 | 1.9555 | 0.0000 |

TABLE 18-continued (Various data)

| | | | |
|---|---|---|---|
| d26 | 8.0784 | 13.2973 | 33.9527 |
| d30 | 7.9246 | 15.8478 | 8.2915 |
| Entrance pupil position | 19.5348 | 84.1319 | 292.6968 |
| Exit pupil position | −76.7289 | −131.6330 | 128.8721 |
| Front principal points position | 23.8915 | 102.4537 | 486.7120 |
| Back principal points position | 83.3921 | 78.6103 | 16.9898 |

Single lens data

| Lens element | Initial surface number | Focal length |
|---|---|---|
| 1 | 1 | −97.7099 |
| 2 | 3 | 115.9351 |
| 3 | 5 | 111.7205 |
| 4 | 7 | 104.7606 |
| 5 | 9 | −9.1632 |
| 6 | 11 | −15.0025 |
| 7 | 13 | 42.2548 |
| 8 | 15 | 28.9842 |
| 9 | 19 | 19.9813 |
| 10 | 21 | 19.8554 |
| 11 | 23 | −11.5700 |
| 12 | 25 | 30.5567 |
| 13 | 27 | 19.0941 |
| 14 | 29 | −43.0710 |

Zoom lens unit data

| Lens unit | Initial surface No. | Focal length | Overall length of lens unit | Front principal points position | Back principal points position |
|---|---|---|---|---|---|
| 1 | 1 | 60.22134 | 12.62700 | 4.30622 | 8.66737 |
| 2 | 9 | −8.45757 | 9.41600 | 0.77846 | 2.87442 |
| 3 | 18 | 20.01853 | 11.39900 | 1.65454 | 3.40510 |
| 4 | 27 | 33.34560 | 2.77300 | 0.08121 | 1.14312 |

Magnification of zoom lens unit

| Lens unit | Initial surface No. | Wide-angle limit | Middle position | Telephoto limit |
|---|---|---|---|---|
| 1 | 1 | 0.00000 | 0.00000 | 0.00000 |
| 2 | 9 | −0.18191 | −0.37329 | −1.36290 |
| 3 | 18 | −0.63258 | −2.26636 | −1.96176 |
| 4 | 27 | 0.66860 | 0.43104 | 0.65890 |

Numerical Example 7

The zoom lens system of Numerical Example 7 corresponds to Embodiment 7 shown in FIG. 19. Table 19 shows the surface data of the zoom lens system of Numerical Example 7. Table 20 shows the aspherical data. Table 21 shows various data.

TABLE 19

(Surface data)

| Surface number | r | d | nd | vd |
|---|---|---|---|---|
| Object surface | ∞ | | | |
| 1 | 107.15200 | 1.25000 | 1.90366 | 31.3 |
| 2 | 48.42800 | 0.01000 | 1.56732 | 42.8 |
| 3 | 48.42800 | 3.79800 | 1.49700 | 81.6 |
| 4 | 311.17900 | 0.15000 | | |
| 5 | 54.08300 | 3.65100 | 1.49700 | 81.6 |
| 6 | 934.64400 | 0.15000 | | |
| 7 | 39.31700 | 3.01900 | 1.61800 | 63.4 |

TABLE 19-continued (Surface data)

| Surface number | r | d | nd | vd |
|---|---|---|---|---|
| 8 | 98.25900 | Variable | | |
| 9* | 5000.00000 | 1.20000 | 1.80470 | 41.0 |
| 10* | 7.11300 | 4.63700 | | |
| 11 | −24.91200 | 0.70000 | 1.77250 | 49.6 |
| 12 | 23.17600 | 0.10300 | | |
| 13 | 16.09900 | 2.11200 | 1.92286 | 20.9 |
| 14 | −388.78300 | Variable | | |
| 15 (Diaphragm) | ∞ | Variable | | |
| 16 | ∞ | 1.20000 | | |
| 17* | 14.53200 | 1.77200 | 1.58332 | 59.1 |
| 18 | −54.34400 | 4.25400 | | |
| 19 | 20.88000 | 1.53600 | 1.60311 | 60.7 |
| 20 | −28.07900 | 0.01000 | 1.56732 | 42.8 |
| 21 | −28.07900 | 0.70000 | 1.80610 | 33.3 |
| 22 | 14.14300 | 0.55200 | | |
| 23 | 119.27700 | 1.37500 | 1.49700 | 81.6 |
| 24 | −17.01800 | Variable | | |
| 25 | 20.05000 | 2.16300 | 1.60311 | 60.7 |
| 26 | −24.43400 | 0.01000 | 1.56732 | 42.8 |
| 27 | −24.43400 | 0.60000 | 1.71736 | 29.5 |
| 28 | −146.69200 | Variable | | |
| 29 | ∞ | 0.90000 | 1.51680 | 64.2 |
| 30 | ∞ | (BF) | | |
| Image surface | ∞ | | | |

TABLE 20

(Aspherical data)

Surface No. 9

K = 0.00000E+00, A4 = 1.59193E−04, A6 = −3.81840E−06,
A8 = 5.83992E−08 A10 = −5.32862E−10, A12 = 1.96699E−12,
A14 = 0.00000E+00, A16 = 0.00000E+00

Surface No. 10

K = −2.39582E−01, A4 = 1.91906E−04, A6 = 2.11530E−06,
A8 = −2.54312E−07 A10 = 1.07548E−08, A12 = −1.55202E−10,
A14 = 0.00000E+00, A16 = 0.00000E+00

Surface No. 17

K = 0.00000E+00, A4 = −6.95929E−05, A6 = 5.03545E−07,
A8 = −1.06117E−07 A10 = 5.80529E−09, A12 = 1.06580E−10,
A14 = −1.81560E−11, A16 = 3.92363E−13

TABLE 21

(Various data)

Zooming ratio 22.89878

| | Wide-angle limit | Middle position | Telephoto limit |
|---|---|---|---|
| Focal length | 4.6352 | 22.0851 | 106.1415 |
| F-number | 2.90149 | 3.56092 | 5.39910 |
| View angle | 42.2938 | 9.9964 | 2.0897 |
| Image height | 3.7000 | 3.9000 | 3.9000 |
| Overall length of lens system | 87.2697 | 98.1923 | 121.0461 |
| BF | 0.91469 | 0.90666 | 0.87891 |
| d8 | 0.5323 | 24.3690 | 40.8201 |
| d14 | 31.0706 | 6.7854 | 2.0424 |
| d15 | 3.0000 | 1.9555 | 0.0000 |
| d24 | 8.4185 | 12.3842 | 33.8505 |
| d28 | 7.4816 | 15.9395 | 7.6022 |
| Entrance pupil position | 19.0708 | 83.0059 | 287.4201 |
| Exit pupil position | −81.0564 | −118.8008 | 125.6596 |
| Front principal points position | 23.4439 | 101.0165 | 483.8481 |

TABLE 21-continued (Various data)

| | | | |
|---|---|---|---|
| Back principal points position | 82.6344 | 76.1071 | 14.9046 |

Single lens data

| Lens element | Initial surface number | Focal length |
|---|---|---|
| 1 | 1 | −98.7842 |
| 2 | 3 | 114.8495 |
| 3 | 5 | 115.3443 |
| 4 | 7 | 104.0223 |
| 5 | 9 | −8.8529 |
| 6 | 11 | −15.4442 |
| 7 | 13 | 16.7931 |
| 8 | 17 | 19.8444 |
| 9 | 19 | 20.0927 |
| 10 | 21 | −11.5823 |
| 11 | 23 | 30.0669 |
| 12 | 25 | 18.6006 |
| 13 | 27 | −40.9522 |

Zoom lens unit data

| Lens unit | Initial surface No. | Focal length | Overall length of lens unit | Front principal points position | Back principal points position |
|---|---|---|---|---|---|
| 1 | 1 | 60.35382 | 12.02800 | 3.76744 | 7.97948 |
| 2 | 9 | −8.56611 | 8.75200 | 0.65651 | 2.39886 |
| 3 | 16 | 19.90096 | 11.39900 | 1.68319 | 3.41457 |
| 4 | 25 | 33.06596 | 2.77300 | 0.06616 | 1.12866 |

Magnification of zoom lens unit

| Lens unit | Initial surface No. | Wide-angle limit | Middle position | Telephoto limit |
|---|---|---|---|---|
| 1 | 1 | 0.00000 | 0.00000 | 0.00000 |
| 2 | 9 | −0.18402 | −0.37713 | −1.36782 |
| 3 | 16 | −0.61521 | −2.29460 | −1.90243 |
| 4 | 25 | 0.67840 | 0.42285 | 0.67584 |

Numerical Example 8

The zoom lens system of Numerical Example 8 corresponds to Embodiment 8 shown in FIG. 22. Table 22 shows the surface data of the zoom lens system of Numerical Example 8. Table 23 shows the aspherical data. Table 24 shows various data.

TABLE 22

(Surface data)

| Surface number | r | d | nd | vd |
|---|---|---|---|---|
| Object surface | ∞ | | | |
| 1 | 155.96400 | 1.25000 | 1.90366 | 31.3 |
| 2 | 58.97000 | 0.01000 | 1.56732 | 42.8 |
| 3 | 58.97000 | 4.09700 | 1.48749 | 70.4 |
| 4 | −384.48300 | 0.15000 | | |
| 5 | 58.83600 | 3.20600 | 1.49700 | 81.6 |
| 6 | 484.12800 | 0.15000 | | |
| 7 | 34.50500 | 3.44400 | 1.49700 | 81.6 |
| 8 | 91.19800 | Variable | | |
| 9* | 5000.00000 | 1.20000 | 1.80470 | 41.0 |
| 10* | 7.40700 | 4.63700 | | |
| 11 | −20.99100 | 0.70000 | 1.77250 | 49.6 |
| 12 | 25.05900 | 0.01000 | 1.56732 | 42.8 |
| 13 | 25.05900 | 1.22500 | 1.94595 | 18.0 |
| 14 | 71.58700 | 0.16000 | | |
| 15 | 20.55600 | 1.48400 | 1.92286 | 20.9 |
| 16 | 83.83100 | Variable | | |

TABLE 22-continued (Surface data)

| Surface number | r | d | nd | vd |
|---|---|---|---|---|
| 17 (Diaphragm) | ∞ | 1.20000 | | |
| 18* | 14.40000 | 1.77200 | 1.58332 | 59.1 |
| 19 | −56.81900 | 3.65300 | | |
| 20 | 20.56900 | 1.53600 | 1.60311 | 60.7 |
| 21 | −28.25000 | 0.01000 | 1.56732 | 42.8 |
| 22 | −28.25000 | 0.70000 | 1.80610 | 33.3 |
| 23 | 14.20000 | 0.55200 | | |
| 24 | 203.51700 | 1.37500 | 1.49700 | 81.6 |
| 25 | −16.39400 | Variable | | |
| 26 | 20.74700 | 2.16300 | 1.60311 | 60.7 |
| 27 | −24.83200 | 0.01000 | 1.56732 | 42.8 |
| 28 | −24.83200 | 0.60000 | 1.71736 | 29.5 |
| 29 | −132.33500 | Variable | | |
| 30 | ∞ | 0.78000 | 1.51680 | 64.2 |
| 31 | ∞ | (BF) | | |
| Image surface | ∞ | | | |

TABLE 23

(Aspherical data)

Surface No. 9

K = 0.00000E+00, A4 = 1.92281E−04, A6 = −4.38768E−06,
A8 = 6.19331E−08 A10 = −5.38323E−10, A12 = 1.99361E−12,
A14 = 0.00000E+00, A16 = 0.00000E+00

Surface No. 10

K = 5.81002E−02, A4 = 1.42092E−04, A6 = −6.20390E−07,
A8 = −1.89571E−07 A10 = 7.66126E−09, A12 = −1.41926E−10,
A14 = 0.00000E+00, A16 = 0.00000E+00

Surface No. 18

K = 0.00000E+00, A4 = −7.37751E−05, A6 = −1.80497E−07,
A8 = 7.21600E−09 A10 = 2.49759E−10, A12 = 1.93501E−11,
A14 = 2.16158E−14, A16 = −1.01692E−13

TABLE 24

(Various data)

Zooming ratio 22.89578

| | Wide-angle limit | Middle position | Telephoto limit |
|---|---|---|---|
| Focal length | 4.6338 | 22.0471 | 106.0956 |
| F-number | 2.89777 | 3.84034 | 5.48947 |
| View angle | 42.0388 | 10.0328 | 2.0942 |
| Image height | 3.7000 | 3.9000 | 3.9000 |
| Overall length of lens system | 87.6153 | 99.0527 | 123.3491 |
| BF | 0.90075 | 0.90140 | 0.88723 |
| d8 | 0.5323 | 24.5469 | 40.6658 |
| d16 | 33.5403 | 8.7735 | 2.0424 |
| d25 | 8.6948 | 12.4808 | 35.3910 |
| d29 | 7.8732 | 16.2761 | 8.2887 |
| Entrance pupil position | 19.6987 | 86.8104 | 288.1402 |
| Exit pupil position | −48.9053 | −80.6629 | 123.9126 |
| Front principal points position | 23.9014 | 102.8981 | 485.7313 |
| Back principal points position | 82.9815 | 77.0056 | 17.2536 |

Single lens data

| Lens element | Initial surface number | Focal length |
|---|---|---|
| 1 | 1 | −105.5775 |
| 2 | 3 | 105.1992 |

TABLE 24-continued (Various data)

| | | |
|---|---|---|
| 3 | 5 | 134.4239 |
| 4 | 7 | 109.4743 |
| 5 | 9 | −9.2193 |
| 6 | 11 | −14.6893 |
| 7 | 13 | 40.2434 |
| 8 | 15 | 29.1819 |
| 9 | 18 | 19.8771 |
| 10 | 20 | 19.9718 |
| 11 | 22 | −11.6374 |
| 12 | 24 | 30.5905 |
| 13 | 26 | 19.0822 |
| 14 | 28 | −42.7113 |

Zoom lens unit data

| Lens unit | Initial surface No. | Focal length | Overall length of lens unit | Front principal points position | Back principal points position |
|---|---|---|---|---|---|
| 1 | 1 | 60.54860 | 12.30700 | 3.93100 | 8.10866 |
| 2 | 9 | −8.44718 | 9.41600 | 0.80378 | 2.91809 |
| 3 | 17 | 19.88603 | 10.79800 | 1.68831 | 3.42499 |
| 4 | 26 | 33.54470 | 2.77300 | 0.10090 | 1.16188 |

Magnification of zoom lens unit

| Lens unit | Initial surface No. | Wide-angle limit | Middle position | Telephoto limit |
|---|---|---|---|---|
| 1 | 1 | 0.00000 | 0.00000 | 0.00000 |
| 2 | 9 | −0.18140 | −0.37456 | −1.31300 |
| 3 | 17 | −0.62495 | −2.28974 | −2.01257 |
| 4 | 26 | 0.67508 | 0.42456 | 0.66310 |

Numerical Example 9

The zoom lens system of Numerical Example 9 corresponds to Embodiment 9 shown in FIG. 25. Table 25 shows the surface data of the zoom lens system of Numerical Example 9. Table 26 shows the aspherical data. Table 27 shows various data.

TABLE 25

(Surface data)

| Surface number | r | d | nd | vd |
|---|---|---|---|---|
| Object surface | ∞ | | | |
| 1 | 85.07870 | 1.25000 | 1.85026 | 32.3 |
| 2 | 41.00590 | 0.01000 | 1.56732 | 42.8 |
| 3 | 41.00590 | 5.42800 | 1.49700 | 81.6 |
| 4 | −328.62180 | 0.15000 | | |
| 5 | 37.67390 | 3.38380 | 1.61800 | 63.3 |
| 6 | 148.14250 | Variable | | |
| 7* | 144.20950 | 1.20000 | 1.80470 | 41.0 |
| 8* | 6.98270 | 4.71520 | | |
| 9 | −20.40630 | 0.70000 | 1.80420 | 46.5 |
| 10 | 22.39200 | 0.01000 | 1.56732 | 42.8 |
| 11 | 22.39200 | 1.48800 | 1.92286 | 20.9 |
| 12 | 284.04750 | 0.15000 | | |
| 13 | 19.83400 | 1.26970 | 1.92286 | 20.9 |
| 14 | 50.26500 | Variable | | |
| 15 (Diaphragm) | ∞ | Variable | | |
| 16 | ∞ | 1.20000 | | |
| 17* | 13.16500 | 1.78470 | 1.58332 | 59.1 |
| 18 | −95.97400 | 4.17500 | | |
| 19 | 25.78230 | 1.25600 | 1.62299 | 58.1 |
| 20 | −41.39910 | 0.01000 | 1.56732 | 42.8 |
| 21 | −41.39910 | 0.70000 | 1.80610 | 33.3 |
| 22 | 12.98770 | 0.50030 | | |
| 23 | 32.25670 | 1.55680 | 1.49700 | 81.6 |
| 24 | −19.02050 | Variable | | |
| 25* | 20.57810 | 2.17340 | 1.60602 | 57.4 |

TABLE 25-continued (Surface data)

| Surface number | r | d | nd | vd |
|---|---|---|---|---|
| 26 | −27.60800 | 0.01000 | 1.56732 | 42.8 |
| 27 | −27.60800 | 0.60000 | 1.71736 | 29.5 |
| 28 | −537.51790 | Variable | | |
| 29 | ∞ | 0.90000 | 1.51680 | 64.2 |
| 30 | ∞ | (BF) | | |
| Image surface | ∞ | | | |

TABLE 26

(Aspherical data)

Surafce No. 7

$K = 0.00000E+00, A4 = 1.26112E-04, A6 = -2.71189E-06,$
$A8 = 4.34753E-08\ A10 = -5.03943E-10, A12 = 2.35625E-12$

Surface No. 8

$K = 0.00000E+00, A4 = 8.02387E-05, A6 = -4.12155E-06,$
$A8 = 7.28579E-08\ A10 = 1.69321E-09, A12 = -1.30855E-10$

Surface No. 17

$K = 0.00000E+00, A4 = -7.67770E-05, A6 = 1.28170E-07,$
$A8 = -5.38040E-09\ A10 = 0.00000E+00, A12 = 0.00000E+00$

Surface No. 25

$K = 0.00000E+00, A4 = 4.78494E-06, A6 = -9.75613E-08,$
$A8 = 2.23885E-09\ A10 = 0.00000E+00, A12 = 0.00000E+00$

TABLE 27

(Various data)

Zooming ratio 27.01766

| | Wide-angle limit | Middle position | Telephoto limit |
|---|---|---|---|
| Focal length | 4.6013 | 23.9175 | 124.3159 |
| F-number | 2.90078 | 4.03218 | 6.10179 |
| View angle | 42.2179 | 9.2416 | 1.7832 |
| Image height | 3.7000 | 3.9000 | 3.9000 |
| Overall length of lens system | 87.8570 | 106.8325 | 133.9636 |
| BF | 0.89068 | 0.87548 | 0.83660 |
| d6 | 0.2360 | 24.9248 | 45.8360 |
| d14 | 31.7890 | 6.0540 | 2.1719 |
| d15 | 3.0000 | 2.0000 | 0.0000 |
| d24 | 10.3343 | 21.4906 | 43.6032 |
| d28 | 6.9861 | 16.8667 | 6.8950 |
| Entrance pupil position | 16.9423 | 74.4790 | 315.4150 |
| Exit pupil position | −80.8651 | −407.6236 | 114.1388 |
| Front principal points position | 21.2847 | 96.9961 | 576.1314 |
| Back principal points position | 83.2557 | 82.9150 | 9.6477 |

Single lens data

| Lens element | Initial surface number | Focal length |
|---|---|---|
| 1 | 1 | −94.3284 |
| 2 | 3 | 73.7134 |
| 3 | 5 | 80.8056 |
| 4 | 7 | −9.1546 |
| 5 | 9 | −13.1799 |
| 6 | 11 | 26.2684 |
| 7 | 13 | 34.8027 |
| 8 | 17 | 19.9670 |

TABLE 27-continued (Various data)

| | | |
|---|---|---|
| 9 | 19 | 25.6866 |
| 10 | 21 | −12.1942 |
| 11 | 23 | 24.3200 |
| 12 | 25 | 19.7919 |
| 13 | 27 | −40.5892 |

Zoom lens unit data

| Lens unit | Initial surface No. | Focal length | Overall length of lens unit | Front principal points position | Back principal points position |
|---|---|---|---|---|---|
| 1 | 1 | 65.88241 | 10.22180 | 3.12458 | 6.76741 |
| 2 | 7 | −8.45031 | 9.53290 | 0.80527 | 2.91143 |
| 3 | 16 | 20.02995 | 11.18280 | 1.94797 | 3.48394 |
| 4 | 25 | 37.24691 | 2.78340 | −0.11952 | 0.95879 |

Magnification of zoom lens unit

| Lens unit | Initial surface No. | Wide-angle limit | Middle position | Telephoto limit |
|---|---|---|---|---|
| 1 | 1 | 0.00000 | 0.00000 | 0.00000 |
| 2 | 7 | −0.15963 | −0.29915 | −1.15183 |
| 3 | 16 | −0.60463 | −2.64536 | −2.25182 |
| 4 | 25 | 0.72361 | 0.45874 | 0.72751 |

Numerical Example 10

The zoom lens system of Numerical Example 10 corresponds to Embodiment 10 shown in FIG. 28. Table 28 shows the surface data of the zoom lens system of Numerical Example 10. Table 29 shows the aspherical data. Table 30 shows various data.

TABLE 28

(Surface data)

| Surface number | r | d | nd | vd |
|---|---|---|---|---|
| Object surface | ∞ | | | |
| 1 | 84.78900 | 1.25000 | 1.85026 | 32.3 |
| 2 | 40.90700 | 0.44000 | | |
| 3 | 41.19200 | 5.42800 | 1.49700 | 81.6 |
| 4 | −318.81500 | 0.15000 | | |
| 5 | 37.55500 | 3.38400 | 1.61800 | 63.3 |
| 6 | 145.93000 | Variable | | |
| 7* | 192.24100 | 1.20000 | 1.80470 | 41.0 |
| 8* | 7.08800 | 4.71500 | | |
| 9 | −20.46600 | 0.70000 | 1.80420 | 46.5 |
| 10 | 22.64200 | 0.01000 | 1.56732 | 42.8 |
| 11 | 22.64200 | 1.48800 | 1.92286 | 20.9 |
| 12 | 297.56200 | 0.15000 | | |
| 13 | 20.01400 | 1.27000 | 1.92286 | 20.9 |
| 14 | 50.67700 | Variable | | |
| 15 (Diaphragm) | ∞ | Variable | | |
| 16 | ∞ | 1.20000 | | |
| 17* | 13.16700 | 1.78500 | 1.58332 | 59.1 |
| 18 | −96.02100 | 4.17500 | | |
| 19 | 25.75900 | 1.25600 | 1.62299 | 58.1 |
| 20 | −41.29900 | 0.01000 | 1.56732 | 42.8 |
| 21 | −41.29900 | 0.70000 | 1.80610 | 33.3 |
| 22 | 12.98300 | 0.50000 | | |
| 23 | 30.87100 | 1.55700 | 1.49700 | 81.6 |
| 24 | −19.55700 | Variable | | |
| 25* | 20.52300 | 2.17300 | 1.60602 | 57.4 |
| 26 | −27.46700 | 0.01000 | 1.56732 | 42.8 |
| 27 | −27.46700 | 0.60000 | 1.71736 | 29.5 |
| 28 | −447.82400 | Variable | | |
| 29 | ∞ | 0.90000 | 1.51680 | 64.2 |
| 30 | ∞ | (BF) | | |
| Image surface | ∞ | | | |

TABLE 29

(Aspherical data)

Surface No. 7

K = 0.00000E+00, A4 = 1.22132E−04, A6 = −2.75188E−06,
A8 = 4.30462E−08 A10 = −5.07521E−10, A12 = 2.38412E−12
Surface No. 8

K = 0.00000E+00, A4 = 7.78501E−05, A6 = −3.68569E−06,
A8 = 5.45056E−08 A10 = 1.51117E−09, A12 = −1.25842E−10
Surface No. 17

K = 0.00000E+00, A4 = −7.71179E−05, A6 = 1.26485E−07,
A8 = −3.07776E−09 A10 = 0.00000E+00, A12 = 0.00000E+00
Surface No. 25

K = 0.00000E+00, A4 = 3.06600E−06, A6 = −4.34242E−08,
A8 = 2.31791E−09 A10 = 0.00000E+00, A12 = 0.00000E+00

TABLE 30

(Various data)

Zooming ratio 27.02966

| | Wide-angle limit | Middle position | Telephoto limit |
|---|---|---|---|
| Focal length | 4.5997 | 23.9200 | 124.3283 |
| F-number | 2.89948 | 3.92751 | 6.08852 |
| View angle | 43.3785 | 9.2546 | 1.7833 |
| Image height | 3.7000 | 3.9000 | 3.9000 |
| Overall length of lens system | 88.1372 | 106.9576 | 134.0428 |
| BF | 0.87936 | 0.87402 | 0.85955 |
| d6 | 0.2360 | 25.3951 | 45.8431 |
| d14 | 31.5951 | 5.9834 | 2.1719 |
| d15 | 3.0000 | 2.0000 | 0.0000 |
| d24 | 10.3872 | 20.6588 | 43.4677 |
| d28 | 6.9885 | 16.9953 | 6.6496 |
| Entrance pupil position | 17.2213 | 76.3258 | 314.9490 |
| Exit pupil position | −82.8083 | −351.6128 | 110.4927 |
| Front principal points position | 21.5682 | 98.6226 | 580.2705 |
| Back principal points position | 83.5375 | 83.0376 | 9.7146 |

Single lens data

| Lens element | Initial surface number | Focal length |
|---|---|---|
| 1 | 1 | −94.1936 |
| 2 | 3 | 73.7677 |
| 3 | 5 | 80.8622 |
| 4 | 7 | −9.1720 |
| 5 | 9 | −13.2707 |
| 6 | 11 | 26.4864 |
| 7 | 13 | 35.1436 |
| 8 | 17 | 19.9708 |
| 9 | 19 | 25.6488 |
| 10 | 21 | −12.1837 |
| 11 | 23 | 24.3390 |
| 12 | 25 | 19.7196 |
| 13 | 27 | −40.8152 |

Zoom lens unit data

| Lens unit | Initial surface No. | Focal length | Overall length of lens unit | Front principal points position | Back principal points position |
|---|---|---|---|---|---|
| 1 | 1 | 65.49301 | 10.65200 | 3.84303 | 7.50332 |
| 2 | 7 | −8.45515 | 9.53300 | 0.80095 | 2.91091 |

TABLE 30-continued (Various data)

| 3 | 16 | 20.03702 | 11.18300 | 1.92268 | 3.47326 |
| 4 | 25 | 36.81685 | 2.78300 | −0.10232 | 0.97500 |

Magnification of zoom lens unit

| Lens unit | Initial surface No. | Wide-angle limit | Middle position | Telephoto limit |
|---|---|---|---|---|
| 1 | 1 | 0.00000 | 0.00000 | 0.00000 |
| 2 | 7 | −0.15998 | −0.30532 | −1.16701 |
| 3 | 16 | −0.60883 | −2.66174 | −2.22583 |
| 4 | 25 | 0.72107 | 0.44942 | 0.73082 |

Numerical Example 11

The zoom lens system of Numerical Example 11 corresponds to Embodiment 11 shown in FIG. 31. Table 31 shows the surface data of the zoom lens system of Numerical Example 11. Table 32 shows the aspherical data. Table 33 shows various data.

TABLE 31

(Surface data)

| Surface number | r | d | nd | vd |
|---|---|---|---|---|
| Object surface | ∞ | | | |
| 1 | 109.64000 | 1.25000 | 1.90366 | 31.3 |
| 2 | 46.69500 | 0.01000 | 1.56732 | 42.8 |
| 3 | 46.69500 | 3.90100 | 1.48749 | 70.4 |
| 4 | 304.54100 | 0.15000 | | |
| 5 | 53.09700 | 3.65100 | 1.49700 | 81.6 |
| 6 | ∞ | 0.15000 | | |
| 7 | 39.66000 | 3.01900 | 1.61800 | 63.4 |
| 8 | 101.97500 | Variable | | |
| 9* | 5000.00000 | 1.20000 | 1.80470 | 41.0 |
| 10* | 7.12800 | 4.63700 | | |
| 11 | −23.77900 | 0.70000 | 1.77250 | 49.6 |
| 12 | 24.25200 | 0.08500 | | |
| 13 | 16.49600 | 2.09000 | 1.92286 | 20.9 |
| 14 | −244.76600 | Variable | | |
| 15 (Diaphragm) | ∞ | Variable | | |
| 16 | ∞ | 1.20000 | | |
| 17* | 14.16500 | 1.77200 | 1.58332 | 59.1 |
| 18 | −64.37600 | 4.25400 | | |
| 19 | 21.59200 | 1.53600 | 1.60311 | 60.7 |
| 20 | −29.17000 | 0.01000 | 1.56732 | 42.8 |
| 21 | −29.17000 | 0.70000 | 1.80610 | 33.3 |
| 22 | 14.09100 | 0.55200 | | |
| 23 | 94.80000 | 1.37500 | 1.49700 | 81.6 |
| 24 | −16.81300 | Variable | | |
| 25 | 20.20200 | 2.16300 | 1.60311 | 60.7 |
| 26 | −24.28400 | 0.01000 | 1.56732 | 42.8 |
| 27 | −24.28400 | 0.60000 | 1.71736 | 29.5 |
| 28 | −131.65100 | Variable | | |
| 29 | ∞ | 0.90000 | 1.51680 | 64.2 |
| 30 | ∞ | (BF) | | |
| Image surface | ∞ | | | |

TABLE 32

(Aspherical data)

Surface No. 9

K = 0.00000E+00, A4 = 1.52329E−04, A6 = −3.63781E−06,
A8 = 5.69081E−08 A10 = −5.40762E−10, A12 = 2.06397E−12,
A14 = 0.00000E+00, A16 = 0.00000E+00

Surface No. 10

K = −1.21767E−01, A4 = 1.44503E−04, A6 = 5.94662E−07,
A8 = −2.13992E−07 A10 = 9.91029E−09, A12 = −1.64082E−10,
A14 = 0.00000E+00, A16 = 0.00000E+00

TABLE 32-continued (Aspherical data)

Surface No. 17

K = 0.00000E+00, A4 = −6.59273E−05, A6 = 3.95252E−08,
A8 = −1.12415E−07 A10 = 6.62729E−09, A12 = 1.50793E−10,
A14 = −1.79226E−11, A16 = 2.59787E−13

TABLE 33

(Various data)

Zooming ratio 23.19790

| | Wide-angle limit | Middle position | Telephoto limit |
|---|---|---|---|
| Focal length | 4.6372 | 22.1319 | 107.5734 |
| F-number | 2.90309 | 3.53224 | 5.41392 |
| View angle | 42.2149 | 9.9460 | 2.0590 |
| Image height | 3.7000 | 3.9000 | 3.9000 |
| Overall length of lens system | 87.5034 | 98.0566 | 120.9621 |
| BF | 0.91668 | 0.91053 | 0.47108 |
| d8 | 0.5323 | 24.3690 | 40.8201 |
| d14 | 31.0530 | 6.5733 | 2.0424 |
| d15 | 3.0000 | 1.9555 | 0.0000 |
| d24 | 8.5033 | 12.0958 | 34.1437 |
| d28 | 7.5831 | 16.2375 | 7.5698 |
| Entrance pupil position | 19.0563 | 82.5555 | 288.6094 |
| Exit pupil position | −84.7929 | −119.0057 | 117.4687 |
| Front principal points position | 23.4426 | 100.6027 | 495.0911 |
| Back principal points position | 82.8662 | 75.9248 | 13.3887 |

Single lens data

| Lens element | Initial surface number | Focal length |
|---|---|---|
| 1 | 1 | −90.8631 |
| 2 | 3 | 112.5751 |
| 3 | 5 | 106.8356 |
| 4 | 7 | 103.1107 |
| 5 | 9 | −8.8716 |
| 6 | 11 | −15.4444 |
| 7 | 13 | 16.8108 |
| 8 | 17 | 20.0707 |
| 9 | 19 | 20.8097 |
| 10 | 21 | −11.7022 |
| 11 | 23 | 28.8513 |
| 12 | 25 | 18.6257 |
| 13 | 27 | −41.6056 |

Zoom lens unit data

| Lens unit | Initial surface No. | Focal length | Overall length of lens unit | Front principal points position | Back principal points position |
|---|---|---|---|---|---|
| 1 | 1 | 59.96048 | 12.13100 | 4.08706 | 8.31921 |
| 2 | 9 | −8.59155 | 8.71200 | 0.64817 | 2.36851 |
| 3 | 16 | 20.03633 | 11.39900 | 1.76436 | 3.44532 |
| 4 | 25 | 32.76519 | 2.77300 | 0.09552 | 1.15659 |

Magnification of zoom lens unit

| Lens unit | Initial surface No. | Wide-angle limit | Middle position | Telephoto limit |
|---|---|---|---|---|
| 1 | 1 | 0.00000 | 0.00000 | 0.00000 |
| 2 | 9 | −0.18526 | −0.38117 | −1.41103 |
| 3 | 16 | −0.62017 | −2.36648 | −1.85035 |
| 4 | 25 | 0.67314 | 0.40920 | 0.68715 |

The following Table 34 shows the corresponding values to the individual conditions in the zoom lens systems of the numerical examples. Here, in Table 34, $Y_W$ is an amount of movement in a direction perpendicular to the optical axis at the time of maximum blur compensation in the third lens unit with a focal length $f_W$ of the entire system at a wide-angle limit, and in a state that the zoom lens system is at a wide-angle limit, a corresponding value $(Y_W/Y_T)/(f_W/f_T)$ at the time of $Y=Y_W$ ($f=f_W$) in the condition formula (9) is obtained.

TABLE 34

(Corresponding values to conditions)

| | | Example | | | | | |
|---|---|---|---|---|---|---|---|
| | Condition | 1 | 2 | 3 | 4 | 5 | 6 |
| (1) | $f_1/f_T$ | 0.57 | 0.57 | 0.49 | 0.37 | 0.57 | 0.57 |
| (2) | $R_3/Ir$ | 3.66 | 3.66 | 3.64 | 3.64 | 3.64 | 3.66 |
| (3) | $D_3/Ir$ | 1.10 | 1.10 | 1.06 | 1.03 | 1.09 | 1.10 |
| (4) | $-0.0016 \times vd_{12} + 0.66 - PgF_{12}$ | 0.02 | −0.01 | 0.02 | −0.01 | 0.02 | −0.01 |
| (5) | $f_1/f_2$ | −7.14 | −7.12 | −7.65 | −7.45 | −7.15 | −7.12 |
| (6) | $R_{3F}/Ir$ | 3.78 | 3.78 | 3.74 | 3.64 | 3.75 | 3.78 |
| (7) | $vd_{12}$ | 70.4 | 81.6 | 70.4 | 81.6 | 70.4 | 81.6 |
| (9) | $(Y_W/Y_T)/(f_W/f_T)$ | 1.79 | 1.79 | 1.90 | 2.05 | 1.78 | 1.79 |
| | $f_T/f_W$ | 22.92 | 22.90 | 28.47 | 36.96 | 22.88 | 22.90 |
| | $\omega_W$ | 41.66 | 42.25 | 42.23 | 43.54 | 41.90 | 42.28 |
| | $PgF_{12}$ | 0.5306 | 0.5388 | 0.5306 | 0.5388 | 0.5306 | 0.5388 |
| | $Y_W$ | 0.022 | 0.022 | 0.021 | 0.022 | 0.022 | 0.022 |
| | $Y_T$ | 0.285 | 0.285 | 0.318 | 0.392 | 0.285 | 0.285 |

| | | Example | | | | |
|---|---|---|---|---|---|---|
| | Condition | 7 | 8 | 9 | 10 | 11 |
| (1) | $f_1/f_T$ | 0.57 | 0.57 | 0.53 | 0.53 | 0.56 |
| (2) | $R_3/Ir$ | 3.65 | 3.66 | 3.36 | 3.35 | 3.64 |
| (3) | $D_3/Ir$ | 1.10 | 0.94 | 1.08 | 1.08 | 1.10 |
| (4) | $-0.0016 \times vd_{12} + 0.66 - PgF_{12}$ | −0.01 | 0.02 | −0.01 | −0.01 | 0.02 |
| (5) | $f_1/f_2$ | −7.05 | −7.17 | −7.80 | −7.75 | −6.98 |
| (6) | $R_{3F}/Ir$ | 3.75 | 3.71 | 3.40 | 3.40 | 3.66 |
| (7) | $vd_{12}$ | 81.6 | 70.4 | 81.6 | 81.6 | 70.4 |
| (9) | $(Y_W/Y_T)/(f_W/f_T)$ | 1.79 | 1.82 | 2.04 | 2.03 | 1.80 |
| | $f_T/f_W$ | 22.90 | 22.90 | 27.02 | 27.03 | 23.20 |
| | $\omega_W$ | 42.29 | 42.04 | 42.22 | 43.38 | 42.21 |
| | $PgF_{12}$ | 0.5388 | 0.5306 | 0.5388 | 0.5388 | 0.5306 |
| | $Y_W$ | 0.022 | 0.022 | 0.021 | 0.021 | 0.022 |
| | $Y_T$ | 0.283 | 0.278 | 0.275 | 0.276 | 0.288 |

The zoom lens system according to the present invention is applicable to a digital input device such as a digital camera, a mobile telephone, a PDA (Personal Digital Assistance), a surveillance camera in a surveillance system, a Web camera or a vehicle-mounted camera. In particular, the zoom lens system according to the present invention is suitable for a photographing optical system where high image quality is required like in a digital camera.

Although the present invention has been fully described by way of example with reference to the accompanying drawings, it is to be understood that various changes and modifications will be apparent to those skilled in the art. Therefore, unless otherwise such changes and modification depart from the scope of the present invention, they should be construed as being included therein.

What is claimed is:

1. A zoom lens system comprising a plurality of lens units each composed of at least one lens element, wherein
the zoom lens system, in order from the object side to the image side, comprises:
a first lens unit having positive optical power and comprising four lens elements;
a second lens unit having negative optical power; and
a third lens unit having positive optical power; wherein
in zooming from a wide-angle limit to a telephoto limit at the time of image taking, at least the first lens unit is moved along an optical axis direction so as to achieve variable magnification, and wherein
the following conditions (1) and (a-1) are satisfied:

$$0.30 < f_1/f_T < 0.70 \tag{1}$$

$$Z = f_T/f_W > 20.5 \tag{a-1}$$

where,
$f_1$ is a composite focal length of the first lens unit,
$f_W$ is a focal length of the entire system at a wide-angle limit, and
$f_T$ is a focal length of the entire system at a telephoto limit.

2. The zoom lens system as claimed in claim 1, wherein a fourth lens unit having positive optical power is provided on the image side relative to the third lens unit, and
in zooming from a wide-angle limit to a telephoto limit at the time of image taking, the respective lens units are moved individually along an optical axis such that an interval between the third lens unit and the fourth lens unit should increase, so as to achieve variable magnification.

3. The zoom lens system as claimed in claim 1, wherein a fourth lens unit having positive optical power and a fifth lens unit are provided on the image side relative to the third lens unit, and
in zooming from a wide-angle limit to a telephoto limit at the time of image taking, the respective lens units are moved individually along an optical axis such that an interval between the third lens unit and the fourth lens unit should increase, so as to achieve variable magnification.

4. The zoom lens system as claimed in claim 1, wherein the third lens unit is moved in a direction perpendicular to an optical axis.

5. An imaging device capable of outputting an optical image of an object as an electric image signal, comprising:
a zoom lens system that forms the optical image of the object; and
an image sensor that converts the optical image formed by the zoom lens system into the electric image signal, wherein
the zoom lens system is a zoom lens system as claimed in claim 1.

6. A camera for converting an optical image of an object into an electric image signal and then performing at least one of displaying and storing of the converted image signal, comprising:
an imaging device including a zoom lens system that forms the optical image of the object, and an image sensor that converts the optical image formed by the zoom lens system into the electric image signal, wherein
the zoom lens system is a zoom lens system as claimed in claim 1.

* * * * *